United States Patent [19]

Murakoshi et al.

[11] Patent Number: 5,698,783

[45] Date of Patent: Dec. 16, 1997

[54] ACCELERATION-DETECTION TYPE GYRO

[75] Inventors: Takao Murakoshi, Ogawa-machi; Takeshi Hojo, Kuroiso; Takafumi Nakaishi, Kuroiso; Shigeru Nakamura, Kuroiso, all of Japan

[73] Assignee: Tokimec Inc., Tokyo, Japan

[21] Appl. No.: 651,780

[22] Filed: May 22, 1996

[30] Foreign Application Priority Data

May 24, 1995 [JP] Japan .................... 7-125358

[51] Int. Cl.[6] .................................. G01P 15/14
[52] U.S. Cl. ........................ 73/504.03; 73/504.08
[58] Field of Search .................. 73/504.03, 504.08, 73/504.12, 514.17, 514.18, 514.32, 510

[56] References Cited

U.S. PATENT DOCUMENTS 3,902,374  9/1975  Hoffman et al. ............... 73/504.08
5,377,544  1/1995  Dunn ............................. 73/504.08

*Primary Examiner*—John E. Chapman
*Attorney, Agent, or Firm*—Bauer & Schaffer

[57] ABSTRACT

An electrostatic supporting type acceleration detecting gyro apparatus is formed as an active type so as to be able to positively cancel a displacement of a gyro rotor. Control DC voltages for generating electrostatic supporting forces and displacement detection AC voltages for detecting a displacement of gyro rotor are applied to electrostatic supporting electrodes, and mechanism control circuits detect displacement indicating voltage signals ($P_{1A}$) through ($P_{4B}$). A displacement of the gyro rotor and the control DC voltages applied to the electrostatic supporting electrodes are computed based on the displacement detection voltages ($P_{1A}$) through ($P_{4B}$) outputted from the mechanism control circuits.

19 Claims, 30 Drawing Sheets

F I G. 14
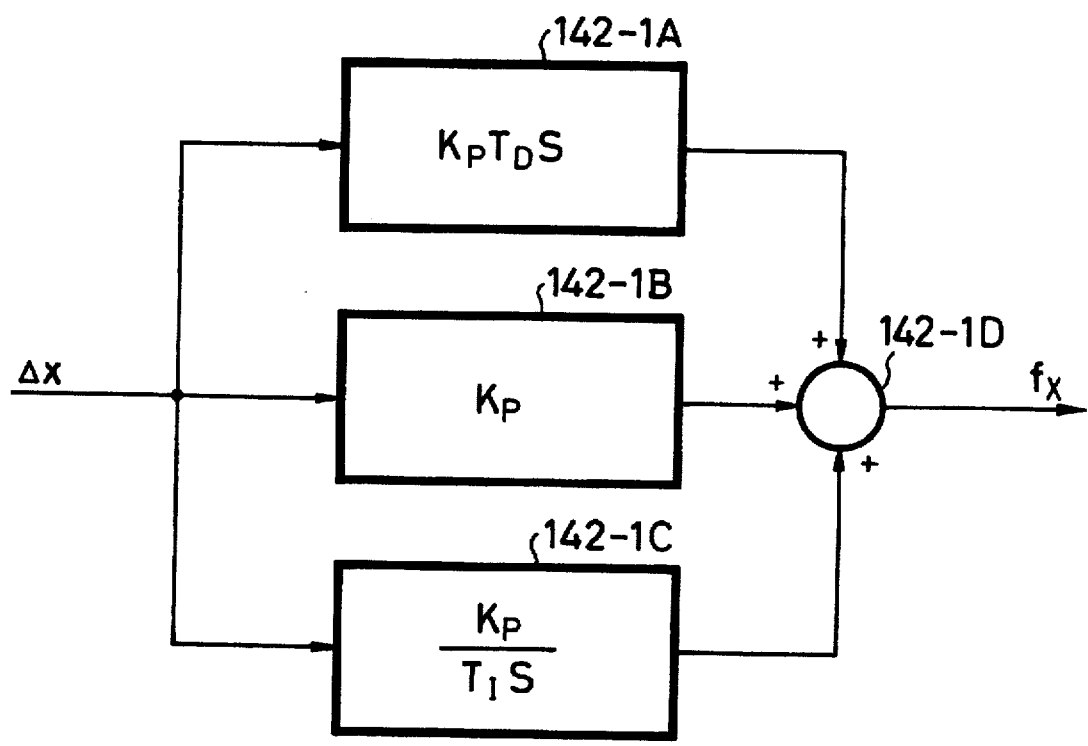

FIG. 15A
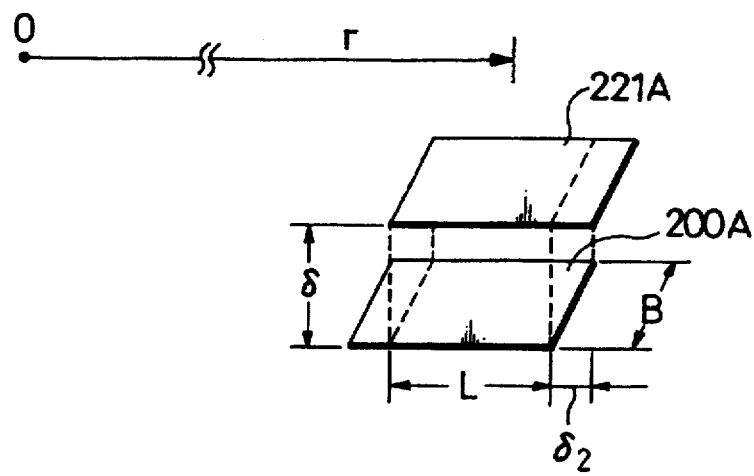
FIG. 15B
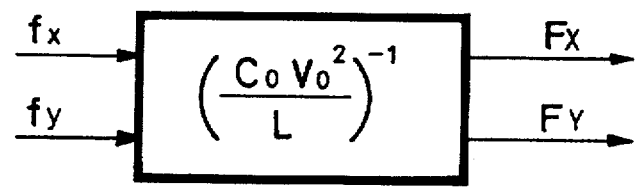
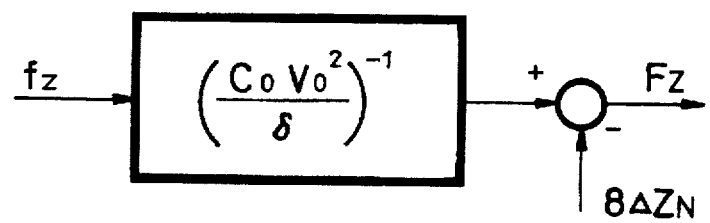
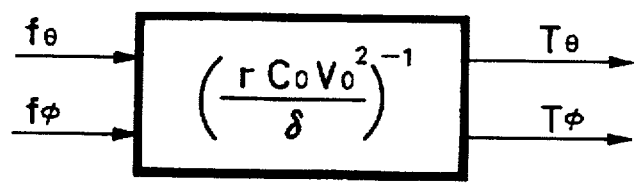

$$\begin{bmatrix} \Delta V_{1A} \\ \Delta V_{1B} \\ \Delta V_{3A} \\ \Delta V_{3B} \end{bmatrix} = V_0 \begin{bmatrix} \frac{1-2\Delta z_N - 2\Delta\theta_N}{4} & \frac{1-\Delta x_N - \Delta\theta_N}{4} & \frac{1-\Delta x_N - \Delta z_N}{4} \\ \frac{1+2\Delta z_N + 2\Delta\theta_N}{4} & \frac{1-\Delta x_N + \Delta\theta_N}{4} & -\frac{1-\Delta x_N + \Delta z_N}{4} \\ \frac{1-2\Delta z_N + 2\Delta\theta_N}{4} & \frac{1+\Delta x_N + \Delta\theta_N}{4} & \frac{1+\Delta x_N - \Delta z_N}{4} \\ \frac{1+2\Delta z_N - 2\Delta\theta_N}{4} & \frac{1+\Delta x_N - \Delta\theta_N}{4} & -\frac{1+\Delta x_N + \Delta z_N}{4} \end{bmatrix} \begin{bmatrix} F_x \\ \frac{F_z}{2} \\ T_\Theta \end{bmatrix}$$

$$\begin{bmatrix} \Delta V_{2A} \\ \Delta V_{2B} \\ \Delta V_{4A} \\ \Delta V_{4B} \end{bmatrix} = V_0 \begin{bmatrix} \frac{1-2\Delta z_N - 2\Delta\phi_N}{4} & \frac{1-\Delta y_N - \Delta\phi_N}{4} & \frac{1-\Delta y_N - \Delta z_N}{4} \\ \frac{1+2\Delta z_N + 2\Delta\phi_N}{4} & \frac{1-\Delta y_N + \Delta\phi_N}{4} & -\frac{1-\Delta y_N + \Delta z_N}{4} \\ \frac{1-2\Delta z_N + 2\Delta\phi_N}{4} & \frac{1+\Delta y_N + \Delta\phi_N}{4} & \frac{1+\Delta y_N - \Delta z_N}{4} \\ \frac{1+2\Delta z_N - 2\Delta\phi_N}{4} & \frac{1+\Delta y_N - \Delta\phi_N}{4} & -\frac{1+\Delta y_N + \Delta z_N}{4} \end{bmatrix} \begin{bmatrix} F_y \\ \frac{F_z}{2} \\ T_\Theta \end{bmatrix}$$

FIG. 16

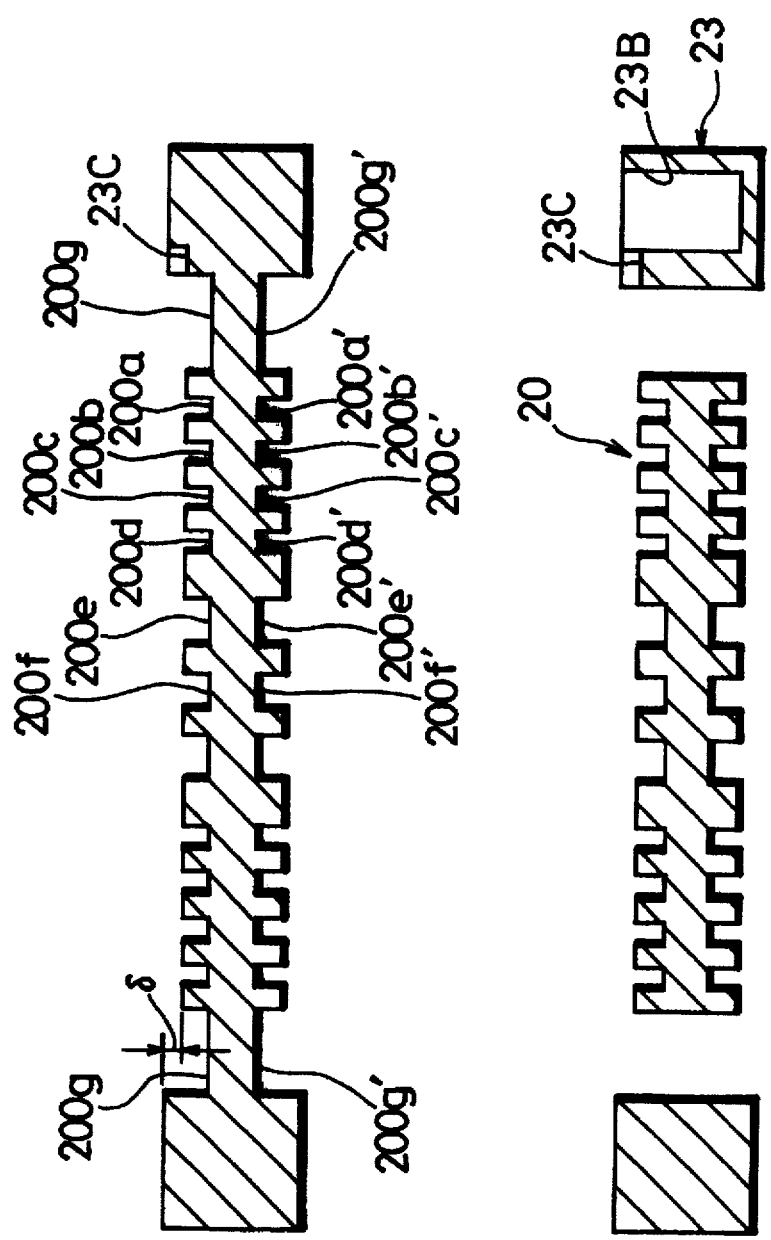

F I G. 27
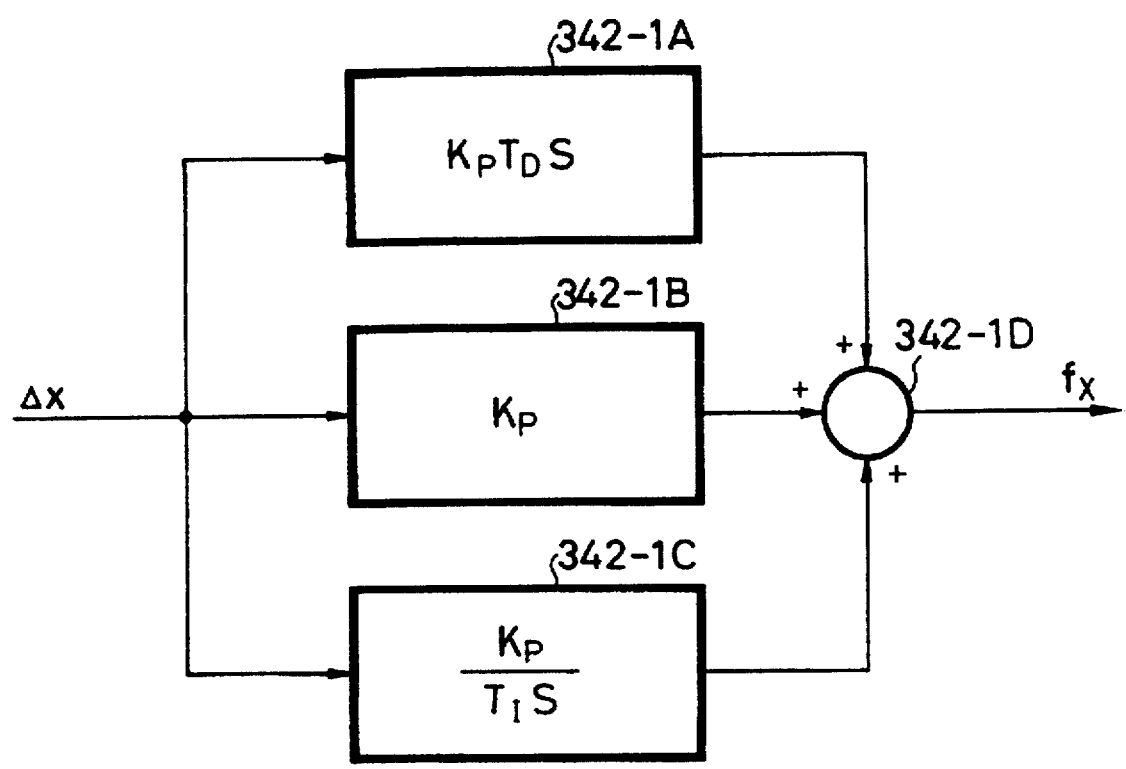

FIG. 28A
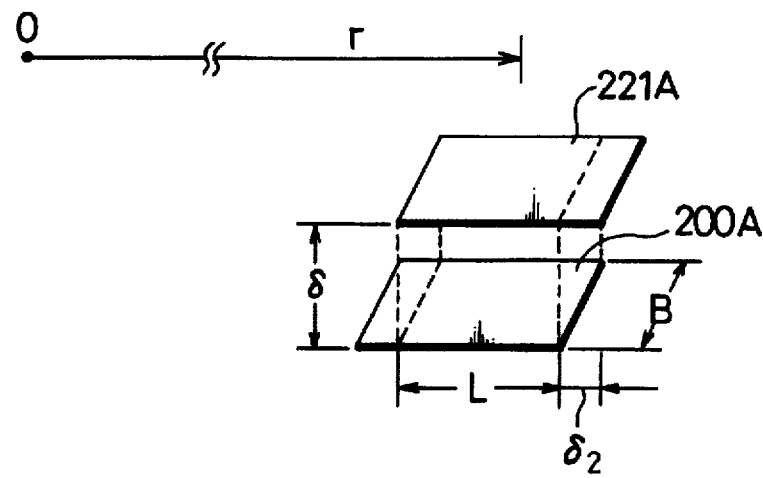
FIG. 28B
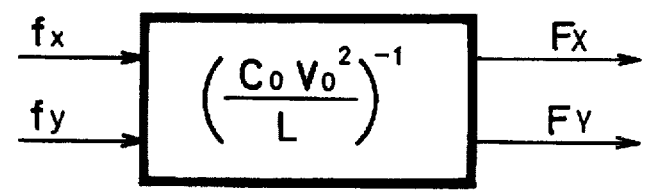
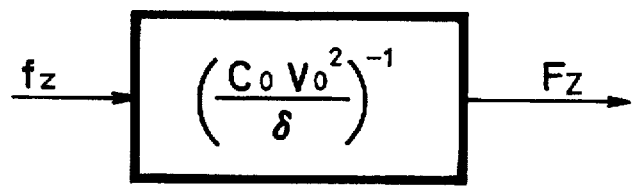
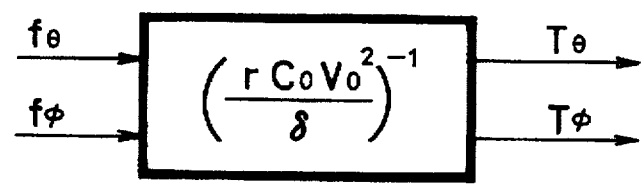

ACCELERATION-DETECTION TYPE GYRO

BACKGROUND OF THE INVENTION

1. Field of the Invention

The present invention relates to an acceleration-detecting type gyro apparatus for use with navigation object, such as automobiles, ships or airplanes and which is used to detect angular velocity or angular change and acceleration relative to inertial space, and more particularly to a micro-acceleration-detecting type gyro apparatus in which a gyro rotor is floated and supported by an electrostatic supporting force.

2. Description of the Related Art

A gyro apparatus will be described with reference to FIGS. 1A, 1B through FIG. 7. Japanese patent application No. 6-136074, which had been filed on Jun. 17, 1994 by the same assignee of the present application, describes this type of gyro apparatus.

A structure of this gyro apparatus will be described with reference to FIGS. 1A, 1B. This gyro apparatus is referred to as an "electrostatic gyro", and includes a disk-like gyro rotor 20 floated and supported by an electrostatic supporting force, and a gyro case 21 with the gyro rotor 20 housed therein as shown in FIGS. 1A, 1B.

XYZ coordinates are set in this gyro apparatus as shown in FIGS. 1A, 1B. The Z axis is set upwardly along a central axis of the gyro apparatus, and the X axis and the Y axis are set at a right angle of the Z axis. A spin axis of the gyro rotor 20 is disposed along the Z axis.

The gyro case 21 comprises an upper bottom member 22, a lower bottom member 24, and a spacer 23 for coupling the upper and lower bottom members 22, 24. The upper and lower bottom members 22, 24 are connected by some suitable coupling means, such as small screws 25. In this manner, a disk-shaped rotor cavity 26 in which the gyro rotor 20 is housed is formed within the gyro case 21.

As shown in FIG. 1A, holes 22A, 22A' communicating with the rotor cavity 26 are defined on the upper bottom member 22 and the lower bottom member 24. A cap 32 is fitted into the hole 22A of the upper bottom member 22, and the cap 32 houses a getter 33 which is used in order to keep the rotor cavity 26 at high vacuum for a long period of time. A pipe 34 is connected to the hole 22A' of the lower bottom member 24, and the rotor cavity 26 is evacuated and kept vacuum through such pipe 34.

The gyro rotor 20 is made of a conductive material, and should preferably include, as shown in FIG. 1A, a thin central portion 20B, and a thick annular electrode portion 20C formed outside the thin central portion 20B. The central portion 20B has a through-hole 20A defined along the central axis.

The gyro apparatus includes a displacement detecting device for detecting a displacement of the gyro rotor 20 relative to the gyro case 21, and the displacement detecting device detects a radial displacement of the gyro rotor 20. The displacement detecting device includes a light-emitting device 27 and a light-receiving device 28 which are respectively disposed on the upper and lower surfaces of the inside of the rotor cavity 26 of the gyro case 21 as shown in FIG. 1A. The light-receiving device 28 is so-called quadrant light-receiving device composed of four segments 28-1, 28-2, 28-3, 28-4 as shown in FIG. 1B.

The light-emitting device 27 and the light-receiving device 28 are disposed at both sides of the through-hole 20A of the gyro rotor 20 in such a manner that a light path passes the through-hole 20A. When the gyro rotor 20 is displaced radially, the position of the through-hole 20A is deviated from the light path so that an amount of light received by the four segments 28-1 through 28-4 of the light-receiving device 28 from the light-emitting device 27 is changed. Changed amounts of light received by the four segments 28-1, 28-2, 28-3, 28-4 of the light-receiving device 28 are different, each segments being differentially wired. Hence, there can be obtained magnitude and direction of the radial displacement of the gyro rotor 20.

Electrostatic supporting electrodes 29-1 through 29-4 and rotor rotation driving coils 30-1 through 30-4 are concentrically disposed on the inner surface of the upper bottom member 22. Similarly, electrostatic supporting electrodes 29'-1 through 29'-4 and rotor rotation driving coils 30'-1 through 30'-4 are concentrically disposed on the inner surface of the lower bottom member 24. The electrostatic supporting electrodes 29-1 through 29-4 and 29'-1 through 29'-4 and the rotor rotation driving coils 30-1 through 30-4 and 30'-1 through 30'-4 are disposed in opposing relation to the electrode portion 20C of the gyro rotor 20 with a predetermined spacing between them and the electrode portion 20C. A positional relationship between the electrostatic supporting electrodes 29-1 through 29-4 and 29'-1 through 29'4 and the electrode portion 20C of the gyro rotor 20 will be described later on in detail.

As shown in FIG. 1B, the first electrostatic supporting electrode pair 29-1, 29'-1 and the third electrostatic supporting electrode pair 29-3, 29'-3 are disposed along the X axis, and the second electrostatic supporting electrode pair 29-2, 29'-2 and the fourth electrostatic supporting electrode pair 29-4, 29'-4 are disposed along the Y axis. The electrostatic supporting electrodes 29-1 through 29-4, and 29'-1 through 29'-4 are disposed among the rotor rotation driving coils 30-1 through 30-4 and 30'-1 through 30'-4. The electrostatic supporting electrodes 29-1 through 29-4, and 29'-1 through 29'-4 may be fan-shaped as shown in FIG. 1B.

The gyro rotor 20 is rotated at high speed about the Z axis on application of a drive AC voltage to the rotor rotation driving coils 30-1 through 30-4 and 30'-1 through 30'-4. Although the AC voltage is cut off when the rotational speed of the gyro rotor 20 reaches a desired rotational speed, the gyro rotor 20 is kept rotating by the force of inertia. Since the gyro rotor 20 is not in contact with and supported within the rotor cavity portion 26 of the gyro case 21 maintained at high vacuum, the gyro rotor 20 can keep rotating for several months or longer.

Because no extraneous torque acts on the gyro rotor 20, regardless of any movement of the gyro case 21, the spin axis direction of the gyro rotor 21 can be maintained in the constant direction relative to the inertial space.

Arrangements and operations of a Z-slaving control system, an XY-slaving control system and a rotor driving system mounted on the gyro apparatus will be described with reference to FIG. 2. The Z-slaving control system functions to slave a manner in which the gyro rotor 20 is displaced in the Z axis direction. Specifically, the Z-slaving control system functions to float and keep the gyro rotor 20 at a predetermined position. The XY-slaving control system functions to slave a manner in which the gyro rotor 20 is displaced in the XY-axis direction, and the rotor driving system 100 functions to rotate the gyro rotor 20 about the spin axis.

A first portion $P_1$ assumes the electrode portion 20C of the gyro rotor 20 at its portion opposing the first electrostatic supporting electrode pair 29-1, 29'-1; a second portion $P_2$ assumes the electrode portion 20C of the gyro rotor 20 at its portion opposing the second electrostatic supporting electrode pair 29-2, 29'-2; a third portion P3 assumes the electrode portion 20C of the gyro rotor 20 at its portion opposing the third electrostatic supporting electrode pair 29-3, 29'-3; and a fourth portion P4 assumes the electrode portion 20C of the gyro rotor 20 at its portion opposing the fourth electrostatic supporting electrode pair 29-4, 29'4.

Initially, arrangement and operation of the Z-slave control system will be described below. The Z-slave control system is of the electrostatic type, and therefore, the gyro rotor 20 is floated, supported, and slaved by an electrostatic force generated between the gyro rotor 20 and the electrostatic supporting electrodes.

The Z-slave control system includes the electrode portion 20C (portions $P_1$, $P_3$ in FIG. 2) of the gyro rotor 20, four pairs of electrostatic supporting electrodes 29-1, 29'-1, 29-2, 29'-2, 29-3, 29'-3, 29-4, 29'-4 (only the electrostatic supporting electrodes 29-1, 29'-1, 29-3, 29'-3 are shown in FIG. 2) disposed on both sides of the gyro rotor 20 and four transformers 41, 42, 43, 44 (only the transformers 41, 43 are shown in FIG. 2) connected to the electrostatic supporting electrodes 29-1, 29'-1, 29-2, 29'-2, 29-3, 29'-3, 29-4, 29'-4.

For the sake of simplicity, let it now be assumed that an X axis direction displacement $\Delta x$ of the gyro rotor 20 and a Y axis direction displacement $\Delta y$ of the gyro rotor 20 are both zero. As shown in FIG. 2, although an AC voltage $(1 \pm K_1 \Delta x) V_{TX}$ corrected by the displacement $\Delta x$ is applied to junctions T1, T4 of the first and third transformers 41, 43, such coefficient is expressed by $(1 \pm K_1 \Delta x) = 1$. Accordingly, the AC voltage $V_{TX}$ with a reference frequency $f_0$ is applied to the junctions T1, T4. Output terminals T2, T3 of the first transformer 41 is connected to the electrostatic supporting electrodes 29-1, 29'-1, and output terminals T5, T6 of the third transformer 43 are connected to the electrostatic supporting electrodes 29-3, 29'-3.

The first electrostatic supporting electrode pair 29-1, 29'-1 and the first portion $P_1$ of the electrode portion 20C of the gyro rotor 20 constitute a capacitor (C is an electrostatic capacity), and such capacitor and the first transformer 41 (L is an inductance) constitute a resonance circuit. A resonance frequency $f_a$ [$=\frac{1}{2\pi}\sqrt{LC}$] of such resonance circuit is set to a value smaller than the reference frequency $f_0$ of the AC voltage $V_{TX}$ applied to the first transformer 41.

Operation of the Z-slaving control system of the gyro apparatus will be described with reference to FIG. 3. FIG. 3 is a graph of a resonance curve, and to which reference will be made in explaining operation of the resonance circuit including the first transformer 41 and the electrostatic supporting electrodes 29-1, 29'-1 connected to the first transformer 41. In FIG. 3, the vertical axis represents an electrode voltage $V_T$ of one electrode, e.g., the electrostatic supporting electrode 29-1 disposed on the upper side of the gyro rotor 20, and the horizontal axis represents a frequency ratio $(f_0/f_a)$ wherein $f_0$ is the reference frequency of the AC voltage $V_{TX}$, and $f_a$ is the resonance frequency $f_a$ [$\frac{1}{2\pi}\sqrt{LC}$] of the resonance circuit.

As described above, at the operation point, the resonance frequency $f_a$ of the resonance circuit is smaller than the reference frequency $f_0$ of the AC voltage and the frequency ratio $(f_0/f_a)$ is larger than 1. Accordingly, as shown in FIG. 3, the electrode voltage $V_T$ is a decreasing function at the position near the operation point.

Let us consider the case that the first portion $P_1$ of the electrode portion 20C of the gyro rotor 20 is displaced in the upper direction. In this case, a distance between the first portion $P_1$ and the electrostatic supporting electrode 29-1 disposed above the first portion $P_1$ is decreased, and hence the electrostatic capacity C between the first portion $P_1$ and the electrostatic supporting electrode 29-1 is increased. Accordingly, the resonance frequency $f_a$ [$=\frac{1}{2\pi}\sqrt{LC}$] is decreased, and the frequency ratio $(f_0/f_a)$ is increased. As a consequence, as illustrated in FIG. 3, the electrode voltage $V_T$ of the electrostatic supporting electrode 29-1 becomes smaller than the operation voltage $V_{TO}$. In this manner, an attraction generated between the upper electrostatic supporting electrode 29-1 and the first portion $P_1$ of the gyro rotor 20 is decreased.

A relationship between the first portion $P_1$ of the gyro rotor 20 and the electrostatic supporting electrode 29'-1 disposed under the first portion $P_1$ becomes exactly opposite to the above-mentioned relationship. Specifically, the distance between the first portion $P_1$ and the electrostatic supporting electrode 29'-1 disposed under the first portion $P_1$ is increased, and the electrostatic capacity C between the first portion $P_1$ and the electrostatic supporting electrode 29'-1 is decreased. Accordingly, the resonance frequency $f_a$ [$\frac{1}{2\pi}\sqrt{LC}$] is increased, and hence the frequency ratio $(f_0/f_a)$ is decreased. As a result, the electrode voltage $V_T$ of the electrostatic supporting voltage 29'-1 becomes larger than the operation voltage $V_{TO}$. In this manner, an attraction generated between the lower electrostatic supporting electrode 29'-1 and the first portion $P_1$ of the gyro rotor 20 is increased.

When the first portion $P_1$ of the gyro rotor 20 is displaced in the upper direction, a displacement force for displacing the first portion $P_1$ in the upper direction is decreased, and a displacement force for displacing the first portion $P_1$ of the gyro rotor 20 in the lower direction is increased. Therefore, the first portion $P_1$ is displaced in the lower direction relatively, and operated so as to be returned to the original position.

According to the Z-slaving control system, the first resonance circuit including the first transformer 41 and the first electrostatic supporting electrode pair 29-1, 29'-1 constantly maintains the displacement of the Z axis direction of the first portion $P_1$ of the electrode portion 20C of the gyro rotor 20 at zero, and the third resonance circuit including the third transformer 43 and the third electrostatic supporting electrodes 29-3, 29'-3 constantly maintains the displacement of the Z axis direction of the third portion $P_3$ of the electrode portion 20C of the gyro rotor 20 at zero. Similarly, the second and fourth resonance circuits constantly maintains the displacements of the Z axis direction of the second and fourth portions $P_2, P_4$ of the electrode portion 20C of the gyro rotor 20 at zero.

A force Fz1 received at the first portion $P_1$ of the gyro rotor 20 from the gyro case 21 is proportional to a difference between voltages $A_1$ and $B_1$ applied to the electrostatic supporting electrodes 29-1, 29'-1. Operation of the third portion $P_3$ of the electrode portion 20C of the gyro rotor 20, and operations of the second and fourth portions $P_2, P_4$ are also similar to the operation of the first portion $P_1$.

$$Fz1=K(A_1-B_1)$$

$$Fz2=K(A_2-B_2)$$

$$Fz3=K(A_3-B_3)$$

$$Fz4=K(A_4-B_4) \text{tm (1)}$$

Arrangement and operation of the rotor driving system 100 will be described with reference to FIG. 2.

As shown in FIG. 2, the rotor driving system includes the gyro rotor 20, the driving AC power supply 101, and four pairs of coils (only lower coils 30'-1, 30'-2, 30'-3, 30'-4 are illustrated in FIG. 2) connected to the driving AC power supply 101. A fundamental phase V0 of the 2-phase AC voltage is connected to the two coils 30'-1, 30'-3 connected in series, and a 90°-phase $V_{90}$ is connected to the two coils 30'-2, 30'-4 connected in series.

When an alternating voltage is applied to the four pairs of coils 30-1, 30'-1, 30-2, 30'-2, 30-3, 30'-3, 30-4, 30'4, a rotation magnetic field proportional to the frequency of the driving AC power supply 101 is generated in the rotor cavity 26 of the gyro case 21, and the gyro rotor 20 is rotated by an interaction caused by the above magnetic field and an eddy current generated within the gyro rotor 20.

Arrangement and operation of the XY slaving control system of the gyro apparatus will be described with reference to FIGS. 4A, 4B. The XY slaving control system includes the displacement detecting apparatus comprising the electrode portion 20C of the gyro rotor 20, the electrostatic supporting electrodes 29-1 through 29-4, 29'-1 through 29'-4, the lightemitting device 27 and the light-receiving device 28, and X and Y control systems 50, 60 for receiving an output signal from the displacement detecting apparatus. The positions of the X axis and Y axis directions of the gyro rotor 20 are controlled in such a fashion that the spin axis is aligned with the central axis, i.e., Z axis of the gyro apparatus even when the gyro rotor 20 is displaced in the X-axis and Y-axis directions.

As shown in FIG. 4A, the X control system comprises an AC power supply 50-1 for supplying an AC voltage $V_T$ with a frequency $f_0$, a $V_{TX}$ computing unit 50-2, and two multipliers 50-3, 50-4. The $V_{TX}$ computing unit 50-2 receives a signal indicative of a displacement $\Delta x$ of the X axis direction of the gyro rotor 20 supplied from the light-receiving device 28 of the displacement detecting apparatus, and calculates a coefficient $1 \pm K_1 \Delta x$ ($K_1$ is a constant). One end of the AC power supply 50-1 is grounded and another end is connected to the two multipliers 50-3, 50-4. Therefore, the two multipliers 50-3, 50-4 output an AC voltage $V_T$ $(1 \pm K_1 \Delta x)$ corrected by the coefficient $1 \pm K_1 \Delta x$. As shown in FIG. 4B, arrangement of the Y control system 60 is similar to that of the X control system.

A positional relationship between the electrode portion 20C of the gyro rotor 20 and the electrostatic supporting electrodes 29-1 through 29-4 and 29'-1 through 29'-4 will be described below. Although the electrode portion 20C of the gyro rotor 20 is concentrically disposed relative to the electrostatic supporting electrodes 29-1 through 29-4 and 29'-1 through 29'-4, it is radially inwardly or outwardly displaced at the same time.

A manner in which the electrode portion 20 of the gyro rotor 20 is radially inwardly displaced from the electrostatic supporting electrodes 29-1 through 29-4 and 29'-1 through 29'-4 as shown in FIGS. 1A, 1B and FIG. 2 will be described. As illustrated, the outer diameters of the electrostatic supporting electrodes 29-1 through 29-4 and 29'-1 through 29'-4 are made larger than the outer diameter of the electrode portion 20C of the gyro rotor 20, and the electrostatic supporting electrodes 29-1 through 29-4 and 29'-1 through 29'-4 are radially outwardly protruded from the gyro rotor 20 by a length $\delta_2$.

Further, the inner diameters of the electrostatic supporting electrodes 29-1 through 29-4 and 29'-1 through 29'-4 are made larger than the inner diameter of the electrode portion 20C of the gyro rotor 20, and the electrode portion 20C of the gyro rotor 20 is radially inwardly protruded from the electrostatic supporting electrodes 29-1 through 29-4 and 29'-1 through 29'-4 by a length $\delta_1$.

The electrode portion 20C of the gyro rotor 20 is radially inwardly displaced from the electrostatic supporting electrodes 29-1 through 29-4 and 29'-1 through 29'-4, whereby the first electrostatic supporting electrode pair 29-1, 29'1 cause a force Fx1 to act radially outwardly on the gyro rotor 20 (positive direction of X axis), and the third electrostatic supporting electrode pair 29-3, 29'-3 cause a force Fx3 to act radially outwardly on the gyro rotor 20 (negative direction of X axis). These forces Fx1, Fx3 are changed in magnitude depending on the magnitudes of the AC voltages applied to the junctions T1, T4 of the first and fourth transformers 41, 44. As long as such AC voltages are equal, the two forces Fx1, Fx3 are balanced equally.

When an X-axis direction acceleration $\alpha_x$ acts on the gyro rotor 20, the gyro rotor 20 is displaced from the gyro case 21 by $\Delta x$ in the positive direction of X axis. The above displacement $\Delta x$ is outputted from the light-receiving device 28 as a voltage signal. The voltage signal is supplied to the $V_{TX}$ computing unit 50-2 of the X control system 50 and thereby the signal indicative of the coefficient $1 \pm K_1 \Delta x$ is generated. Thus, two multipliers 50-3, 50-4 generate different voltage signals $(1 - K_1 \Delta x) V_T$, $(1 + K_1 \Delta x) V_T$.

The voltage signals $(1 \pm K_1 \Delta x) V_T$ are applied to the junctions T1, T4 of the two transformers 41, 43, whereby the first electrostatic supporting electrode pair 29-1, 29'-1 generate the force Fx1 and the third electrostatic supporting electrode pair 29-3, 29'-3 generate the force Fx3. The force Fx1 acting on the gyro rotor 20 in the positive direction of X axis and the force Fx3 acting on the gyro rotor 20 in the negative direction of X axis are expressed by the equation (2) below:

$$Fx1 = k_1(1 - K_1 \Delta x) V_T$$
$$Fx3 = k_1(1 + K_1 \Delta x) V_T \quad (2)$$

where $k_1$ is the constant. A resultant force of X-axis direction forces acting on the gyro rotor 20 is expressed by the following equation (3):

$$Fx1 - Fx3 = -2k_1 K_1 V_T \Delta x \quad (3)$$

The gyro rotor 20 is pulled in the negative direction of X axis by the force proportional to the displacement $\Delta x$ as expressed by the equation (3), and thereby the displacement of the gyro rotor 20 is canceled out. This is also true when the gyro rotor 20 is displaced in the Y axis direction. In this manner, even when the gyro rotor 20 is displaced in the X-axis and Y-axis directions by the XY slaving control system, the displacement amounts $\Delta x$ and $\Delta y$ are constantly held at zero. Specifically, the spin axis of the gyro rotor 20 is constantly aligned with the central axis, i.e., Z axis of the gyro apparatus.

Although it was assumed that the changed amounts of the voltages applied to the junctions T1, T4 of the two transformers 41, 43 are proportional to the displacement $\Delta x$, the voltages actually applied to the two junctions T1, T4 contain a term $K_D$ $(d\Delta x/dt) V_T$ caused by damping in addition to the term $K_1 \Delta x V_T$ proportional to the displacement $\Delta x$.

While a manner in which the electrode portion 20C of the gyro rotor 20 is radially inwardly displaced from the electrostatic supporting electrodes 29-1 through 29-4 and 29'-1 through 29'-4 has been described so far with reference to FIGS. 1A, 1B and FIG. 2, if the electrode portion 20C of the gyro rotor 20 is radially outwardly displaced from the electrostatic supporting electrodes 29-1 through 29-4 and 29'-1 through 29'-4, then similar operation is carried out. However in that case, the directions of the forces Fx1, Fx3 acting on the gyro rotor 20 are reversed. Furthermore, this is also true when the acceleration αy of the Y-axis direction acts on the gyro rotor 20 so that the gyro rotor 20 is displaced from the gyro case by Δy in the Y-axis direction.

Arrangements and operations of a gyro computing unit 5 and an acceleration computing unit will be described with reference to FIGS. 5A, 5B through FIG. 7. A gyro computing unit includes an X gyro computing unit for computing an angular velocity dφ/dt around X axis and a Y gyro computing unit 61 for computing an angular velocity dθ/dt around Y axis. An acceleration computing unit includes an X acceleration computing unit 53 for computing an X-axis direction acceleration, a Y acceleration computing unit 63 for computing a Y-axis direction acceleration, and a Z acceleration computing unit 73 for computing a Z-axis direction acceleration.

Arrangements and operations of the X gyro computing unit 51 and the X acceleration computing unit 53 will be described with reference to FIGS. 5A, 5B. As shown in FIG. 5A, the X gyro computing unit 51 includes four voltage-dividing units 51-1 through 51-4, four rectifying units 51-5 through 51-8 connected to each of the voltage-dividing units 51-1 through 51-4, two subtraction units 51-9, 51-10 connected to two pairs of rectifying units 51-5, 51-6 and 51-7, 51-8, and third computing units 51-11, 51-12 connected to the two subtraction units 51-9, 51-10.

The X gyro computing unit 51 receives terminal outputs $A_1$, $B_1$ and $A_3$, $B_3$ outputted from the output terminals T2, T3, T5, T6 of the two transformers 41, 43 through input terminals 51a, 51b and 51c, 51d. Because the terminal outputs $A_1$, $B_1$ and $A_3$, $B_3$ developed at the output terminals T2, T3 and T5, T6 of the two transformers 41, 43 are generally high voltages higher than 1000V, such voltages are divided to low voltages by the four voltage-dividing units 51-1 through 51-4, and rectified as DC voltages by the four rectifying units 51-5 through 51-8. The DC voltage signals are subtracted by the subtraction units 51-9, 51-10, 51-11, and hence a gyro signal indicative of a rotation angular velocity dφ/dt around X axis of the gyro rotor 20 is outputted from the output terminal of the computing unit 51-12.

Operation of the X gyro computing unit 51 will be described in detail. Let us consider that the angular velocity dφ/dt is inputted around the X axis. An angular momentum vector H obtained by the spin motion of the gyro rotor 20 is oriented in the upper direction along the Z axis as shown in FIG. 2. The spin axis of the gyro rotor 20 is caused to keep being disposed along the Z axis direction due to law of inertia. When on the other hand the gyro case 21 is displaced around the X axis at the angular velocity dφ/dt, the second electrostatic supporting electrode pair 29-2, 29'-2 and the fourth electrostatic supporting electrode pair 29-4, 29'-4 generate differences in the clearances between the second and fourth portions $P_2$, $P_4$ of the gyro rotor 20 and the upper and lower electrodes. Such differences between the upper and lower clearances are canceled out by the operation of the Y control system 60. At that very time, the two opposite forces Fz2, Fz4 are caused to act on the second and fourth portions $P_2$, $P_4$ of the gyro rotor 20 along the Z axis, whereby a torque $T_X$ expressed by the following equation (4) is generated.

$$T_X = (Fz2 - Fz4) \cdot r \qquad (4)$$

where r is the distance from the spin axis to a point at which force acts on the gyro rotor 20.

The torque $T_X$ causes the spin axis of the gyro rotor 20 to make a precession around the Y axis at a small angle. The precession of the spin axis causes the clearances between the first electrostatic supporting electrode pair 29-1, 29'-1, the third electrostatic supporting electrode pair 29-3, 29'-3 and the first and third portions $P_1$, $P_3$ of the gyro rotor 20 to be changed, i.e., a difference is generated between the upper and lower clearances.

Similarly, the differences between the upper and lower clearances are canceled by the operation of the X control system 50. At that very time, the two opposite forces Fz1, Fz3 act on the first and third portions $P_1$, $P_3$ of the gyro rotor 20 thereby to generate a torque $T_Y$ expressed by the following equation (5):

$$T_Y = (Fz1 - Fz3) \cdot r \qquad (5)$$

The torque $T_Y$ causes the spin axis of the gyro rotor 20 to make a precession around the X axis at a small angle. Such precession becomes the same motion caused by the input angular velocity dφ/dt. As a consequence, the spin axis and the gyro case 21 are rotated around the X axis at the angular velocity dφ/dt in unison with each other.

Establishing an angular momentum equation based on the equations (4), (5) and using the equation (1), then we have:

$$\begin{aligned} H(d\phi/dt) &= (Fz3 - Fz1) \cdot r \\ &= [(A_3 - B_3) - (A_1 - B_1)] \cdot r \cdot K \\ H(d\theta/dt) &= (Fz4 - Fz2) \cdot r \\ &= [(A_4 - B_4) - (A_2 - B_2)] \cdot r \cdot K \end{aligned} \qquad (7)$$

where H is the angular momentum amount of the gyro rotor 20. Thus, we have:

$$d\phi/dt = [(A_3-B_3)-(A_1-B_1)] \cdot Kr/H$$

$$d\theta/dt = [(A_4-B_4)-(A_2-B_2)] \cdot Kr/H \qquad (7)$$

In this manner, the X gyro computing unit 51 and the Y gyro computing unit 53 receive the terminal outputs $A_1$, $B_1$, $A_2$, $B_2$, $A_3$, $B_3$, $A_4$, $B_4$ of the four transformers, and output the X gyro signal dφ/dt and the Y gyro signal dθ/dr.

Arrangement and operation of the X acceleration computing unit 53 will be described below. The X acceleration computing unit 53 includes an adding unit 53-1 for receiving output signal $a_1$, $b_1$ of the first pair of rectifying units 51-5, 51-6 of the X gyro computing unit 51, an adding unit 53-2 for receiving output signals $a_3$, $b_3$ of the second pair of rectifying units 51-7, 51-8 and a subtraction unit 53-3 connected to the above-mentioned two adding units 53-1, 53-2.

The adding units 53-1, 53-2 calculate sums $a_1+b_1$, $a_3+b_3$ of the inside outputs of the X gyro computing unit 51, and the above sums correspond to sums $A_1+B_1$, $A_3+B_3$ of the voltages applied to the respective electrodes. Therefore, the outputs of the adding units 53-1, 53-2 correspond to the forces Fx1, Fx3 of the X axis direction.

The subtraction unit 53-3 calculates a difference $(a_1+b_1) -(a_3+b_3)$ of outputs $a_1+b_1$, $a_3+b_3$ of the adding units 53-1, 53-2, and such difference corresponds to $(A_1+B_1)-(A_3+B_3)$. Therefore, the output of the subtracting unit 53-3 corresponds to a difference between the force Fx1 of positive direction of X axis and a force Fx3 of negative direction of X axis.

In this manner, the subtraction unit 53-3 outputs the signal indicative of the displacement Δx expressed by the equation (3), and thereby the acceleration αx is obtained.

Arrangements and operations of the Y gyro computing unit 61 and the Y acceleration computing unit 63 shown in FIGS. 6A, 6B are similar to those of the X gyro computing unit 51 and the X acceleration computing unit 53 shown in FIGS. 5A, 5B, and therefore need not be described.

Arrangement and operation of the Z acceleration computing unit 73 will be described with reference to FIG. 7. The Z acceleration computing unit 73 receives the internal signals $a_1$, $b_1$, $a_3$, $b_3$ of the X gyro computing unit 51 and the internal signals $a_2$, $b_2$, $a_4$, $b_4$ of the Y gyro computing unit 61, and calculates the acceleration of Z axis direction.

Operation of the Z acceleration computing unit 73 will be described. Although the acceleration is calculated under the assumption that the mass of the gyro rotor 20 is zero as described above, the mass of the gyro rotor 20 is not zero in actual practice. Accordingly, m assumes the mass of the gyro rotor 20, and divided into four portions. Assuming now that an acceleration $\alpha_z$ acts in the Z axis direction, then forces Fz1, Fz3 acting on the first and third portion $P_1$, $P_3$ of the gyro rotor 20 are expressed by the following equation (8):

$$Fz1 = m\alpha_z/4 - (H/r)(d\phi/dt)$$

$$Fz3 = m\alpha_z/4 + (H/r)(d\phi/dt) \qquad (8)$$

Computing sums of the above two equations, we can compute the acceleration $\alpha_z$ of Z axis direction as:

$$\begin{aligned}\alpha_z &= (Fz1 + Fz3) \cdot 2/m \\ &= [(A_3 - B_3) + (A_1 - B_1)] \cdot 2K/m\end{aligned} \qquad (7)$$

Incidentally, the acceleration $\alpha_z$ of Z axis direction can also be obtained by forces Fz2, Fz4 acting on the second and fourth portions $P_2$ and $P_4$ of the gyro rotor 20. Therefore, the Z acceleration computing unit 73 computes the acceleration $\alpha_z$ of Z axis direction from the four forces Fz1, Fz2, Fz3, Fz4 acting on the respective portions of the gyro rotor 20.

As earlier noted with reference to FIGS. 2, 3, and FIGS. 4A, 4B, the Z slaving control system and the XY slaving control system of the gyro apparatus constantly maintain the displacements of the gyro rotor 20 in the Z axis direction and XY axis direction at zero byuse of the LC resonance circuit. In the first portion $P_1$ of the electrode portion 20C of the gyro rotor 20, for example, the system including the AC power supply 50-1 of the X slaving control system 50, the transformer 41 and the first electrostatic supporting electrode pair 29-1, 29'-1 constructs the LC resonance circuit.

The Z slaving control contrm and the XY slaving control system using the LC resonance circuit unavoidably generate various errors in the path from the power supply to the gyro rotor 20, and in the path from the AC power supply 50-1 to the gyro rotor 20 through the transformer 41 and the first electrostatic supporting electrodes 29-1, 29'-1. One of such errors is a stray capacity caused by large size of coils and interconnections.

Further, in the Z, XY slaving control systems, when a floating force or restoration force for the gyro rotor 20 is adjusted, the coefficient $1 \pm K_1 \Delta x$ of the $V_{TX}$ computing unit 50-2 has to be changed, and hence the operation therefor becomes cumbersome. In particular, it is difficult to float the gyro rotor 20 when the gyro apparatus starts up.

SUMMARY OF THE INVENTION

In view of the aforesaid aspects, it is an object of the present invention to provide a gyro apparatus having a slaving control system which is easy to control.

It is another object of the present invention to provide an active slaving control system instead of the conventional passive slaving control system.

According to an aspect of the present invention, there is provided an acceleration detection-type gyro apparatus including a gyro case having a Z axis extended along a central axis direction, and an X axis and a Y axis extended in the directions perpendicular to the Z axis, a disk-like gyro rotor being supported within the gyro case by an electrostatic supporting force such that it does not contact with the gyro case, the disk-like gyro rotor having a spin axis extended in the central axis direction, electrode portions formed on both surfaces of the gyro rotor, at least three pairs of electrostatic supporting electrodes disposed in inner surfaces of the gyro case such that the electrostatic supporting electrodes are opposed to and spaced apart from the electrode portions formed on both surfaces of the gyro rotor, the electrostatic supporting electrodes being spaced apart from each other with an equal central angle, and a rotor driving system for rotating the gyro rotor about the spin axis at high speed. This gyro apparatus is characterized by the electrode portions of the gyro rotor having a plurality of annular portions disposed concentrically at a predetermined radial pitch, each of the annular portions having the same radial width, each of the electrostatic supporting electrodes having a pair of comb-shaped portions spaced apart from each other, each of the comb-shaped portions including a plurality of circumference portions extended in the circumferential direction and concentrically disposed at the same pitch as the predetermined radial pitch, each of the circumference portions having the same radial width, and connecting portions for connecting the circumference portions, the circumference portions of the pair of comb-shaped portions being arranged alternately, each of the circumference portions of the comb-shaped portions of the electrostatic supporting electrodes having a radial width equal to each radial width of the annular portions of the electrode portions of the gyro rotor, each of the circumference portions of the comb-shaped portions of the electrostatic supporting electrodes having a radius of curvature which is larger or smaller than the radius of the corresponding electrode portion of the gyro rotor (e.g., $r_1-r_2=L/2=p/4$ where $r_1$ is a radius of curvature of the electrode portions and $r_2$ is a radius of the corresponding electrode of the gyro rotor), mechanism control circuits for outputting displacement indication signals for indicating X axis direction, Y axis direction and Z axis direction linear displacements and Y axis and X axis rotational displacements by applying control DC voltages for generating electrostatic supporting forces and displacement detection AC voltages for detecting displacements of the gyro rotor to at least the three pairs of electrostatic supporting electrodes under the condition that the control DC voltages and the displacement detection AC voltages are superimposed upon each other, a control computing unit for receiving the displacement indicating signals outputted from the mechanism control circuits, computing correction amounts of the control DC voltages such that linear displacements and rotational displacements of the gyro rotor are canceled out, and feeding the computed correction amounts back to the mechanism control circuits, and a gyro/acceleration output computing unit for computing a gyro output based on an output signal supplied thereto from the control computing unit.

According to another aspect of the present invention, there is provided a method of fabricating gyro apparatus including a gyro case and a disk-like gyro rotor supported within the gyro case by electrostatic supporting force such that the gyro rotor is not in contact with the gyro case. This method is comprised the steps of forming protruded portions by forming grooves on both surfaces of a plate member made of a conductive material, separating a circular portion from the plate member to provide the disk-like gyro rotor and an outside spacer for surrounding the gyro rotor, and bonding an upper bottom member and a lower bottom member to both surfaces of the spacer.

According to the present invention, the gyro apparatus includes electrode portions formed on the upper and lower surfaces of a gyro rotor, and four pairs of electrostatic supporting electrodes formed on the inner surface of the gyro case in correspondence with the electrode portions. The four pairs of electrostatic supporting electrodes of the gyro case are designed to be radially inwardly or outwardly deviated from the electrode portions of the gyro rotor. The gyro apparatus further includes a slaving control system for floating the gyro rotor at a predetermined position by electrostatic forces.

Control DC voltages for generating electrostatic supporting forces and displacement detection AC voltages for detecting displacements of the gyro rotor are applied to the four pairs of electrostatic supporting electrodes. Displacement detection currents are generated on the electrostatic supporting electrodes formed on the inner surface of the gyro case, and the above displacement detection currents are detected by mechanism control circuits.

The displacement detection voltage signals outputted from the mechanism control circuits include all displacements of the gyro rotor, i.e., X axis direction, Y axis direction, Z axis direction linear displacements ΔX, ΔY, ΔZ, and Y axis and X axis rotational displacements Aθ, aφ. A control computing unit receives the displacement detection voltages outputted from the mechanism control circuits, and computes displacements of the gyro rotor, and control DC voltages applied to the four pairs of electrostatic supporting electrodes. The control computing unit feeds the control DC voltages back to the mechanism control circuits, and the mechanism control circuits apply the control DC voltages and the displacement detection AC voltages to the four pairs of electrostatic supporting electrodes. The gyro rotor displacements detected by the mechanism control circuits are fed back to the control DC voltages, and the displacements of the gyro rotor are actively held at zero.

The control computing unit further obtains X axis direction, Y axis direction, and Z axis direction accelerations fx, fy, fz and Y axis and X axis rotational moments fθ, fφ to thereby obtain X axis direction, Y axis direction, and Z axis direction forces Fx, Fy, Fz and Y axis and X axis torques Tθ, Tφ.

Each of the four pairs of electrostatic supporting electrodes includes a pair of comb-shaped portions spaced apart from each other, and the comb-shaped portions include a plurality of circumference portions extended in the circumferential direction, and a radial portion for connecting the circumference portions. The circumference portions of the two comb-shaped portions are disposed alternately.

A potential of the gyro rotor is constantly held at zero on application of control DC voltages with the equal absolute value but with opposite symbols to each pair of comb-shaped portions.

An upper bottom member and a lower bottom member of the gyro case are made of an insulating material such as glass, and the gyro rotor and the spacer surrounding the gyro rotor are made of a conductive material such as single crystal silicon. The gyro rotor and the spacer are manufactured by the same material.

According to the present invention, the gyro apparatus includes electrode portions formed on upper and lower surfaces of a gyro rotor, and at least three pairs, e.g., four pairs of electrostatic supporting electrodes formed on the inner surface of the gyro case in correspondence with the electrode portions. The four pairs of electrostatic supporting electrodes of the gyro case are radially inwardly or outwardly deviated from the electrode portions of the gyro rotor. The gyro apparatus further includes a slaving control system for floating the gyro rotor at a predetermined position by electrostatic forces.

Displacement detection electrode portions and displacement detection electrodes are provided on both surfaces of the gyro rotor and the corresponding inner surface of the gyro case, and rotor driving electrode portions and rotor driving electrodes for rotating the gyro rotor are provided.

Control DC voltages for generating electrostatic supporting forces and displacement detection AC voltages for detecting displacements of the gyro rotor are applied to the electrostatic supporting electrodes. Displacement detection currents are generated in the displacement detection electrodes formed on the inner surface of the gyro case, and the displacement detection currents are detected by a displacement detection circuit.

The displacement detection voltage signal outputted from the displacement detection circuit includes all displacements of the gyro rotor, i.e., X axis direction, Y axis direction, Z axis direction linear displacements ΔX, ΔY, ΔZ and Y axis and X axis rotational displacements Δθ, Δφ. The control computing unit receives the displacement detection voltages outputted from the displacement detection circuit, and computes the displacements of the gyro rotor, and the control DC voltages that should be applied to the four pairs of electrostatic supporting electrodes. The gyro rotor displacements detected by the displacement detection circuit are fed back to the control DC voltage thereby to maintain the gyro rotor displacement at zero actively.

The control computing unit further obtains X axis direction, Y axis direction, and X axis direction accelerations fx, fz, fy, and Y axis and X axis rotational moments fθ, fφ applied to the gyro rotor thereby to obtain X axis direction, Y axis direction, and Z axis direction forces Fx, Fy, Fz and Y axis and X axis torques Tθ, Tφ that should be applied to the gyro rotor. Thus, the control computing unit computes a gyro output.

Each of electrostatic supporting electrodes includes a pair of comb-shaped portions spaced apart from each other, and the comb-shaped portions include a plurality of circumference portions elongated in the circumferential direction, and a radial portion for connecting the circumference portions. The circumference portions of the two comb-shaped portions are disposed alternately.

A potential of the gyro rotor is constantly held at zero on application of control DC voltages with the equal absolute value but with opposite symbols to each pair of comb-shaped portions.

An upper bottom member and a lower bottom member of the gyro case are made of an insulating material such as a glass, and the gyro rotor and a spacer surrounding the gyro rotor are made of a conductive material such as single crystal silicon. The gyro rotor and the spacer are manufactured by the same material.

BRIEF DESCRIPTION OF THE DRAWINGS

FIG. 14 is a block diagram showing a PID computing unit of the gyro apparatus according to the present invention;

FIGS. 15A, 15B are schematic diagrams used to explain operation of a control voltage computing unit of the gyro apparatus according to the present invention;

FIG. 16 is a diagram used to explain an example of ACM (actuator compensating matrix) used in the control voltage computing unit of the gyro apparatus according to the present invention;

FIGS. 18A, 18B are schematic diagrams used to explain a method of fabricating a gyro rotor and a spacer of the gyro apparatus according to the present invention;

FIG. 27 is a block diagram showing a PID computing unit of the gyro apparatus according to the second embodiment of the present invention;

FIGS. 28A, 28B are schematic diagrams used to explain operation of the control voltage computing unit of the gyro apparatus according to the second embodiment of the present invention;

DETAILED DESCRIPTION OF THE PREFERRED EMBODIMENTS

The present invention will now be described with reference to the drawings.

Figure 1A:
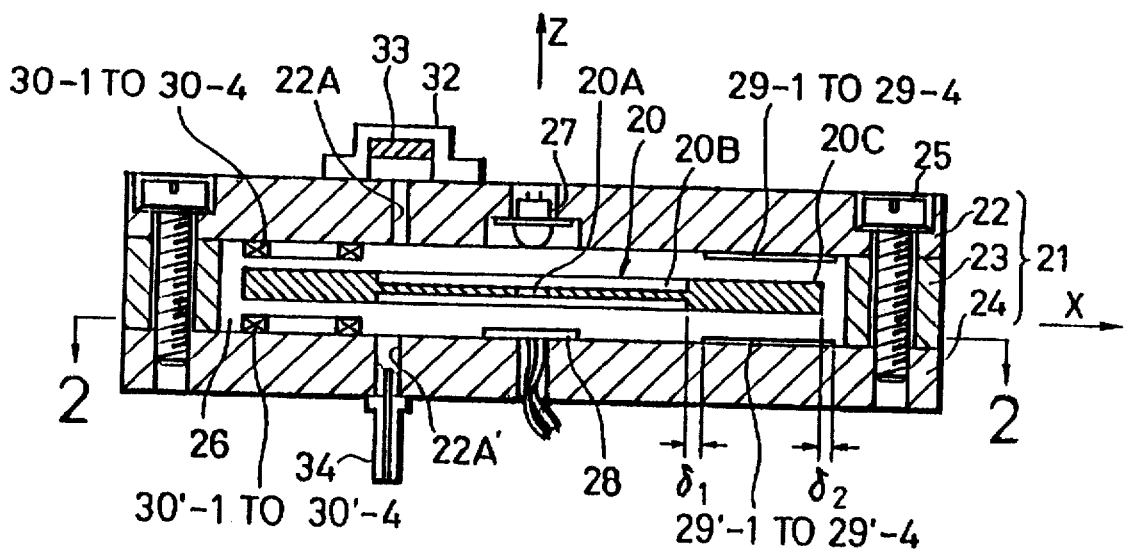
FIG. 1A is a cross-sectional side view illustrating a conventional gyro apparatus taken along line 1—1 of FIG. 1B.
Figure 1B:
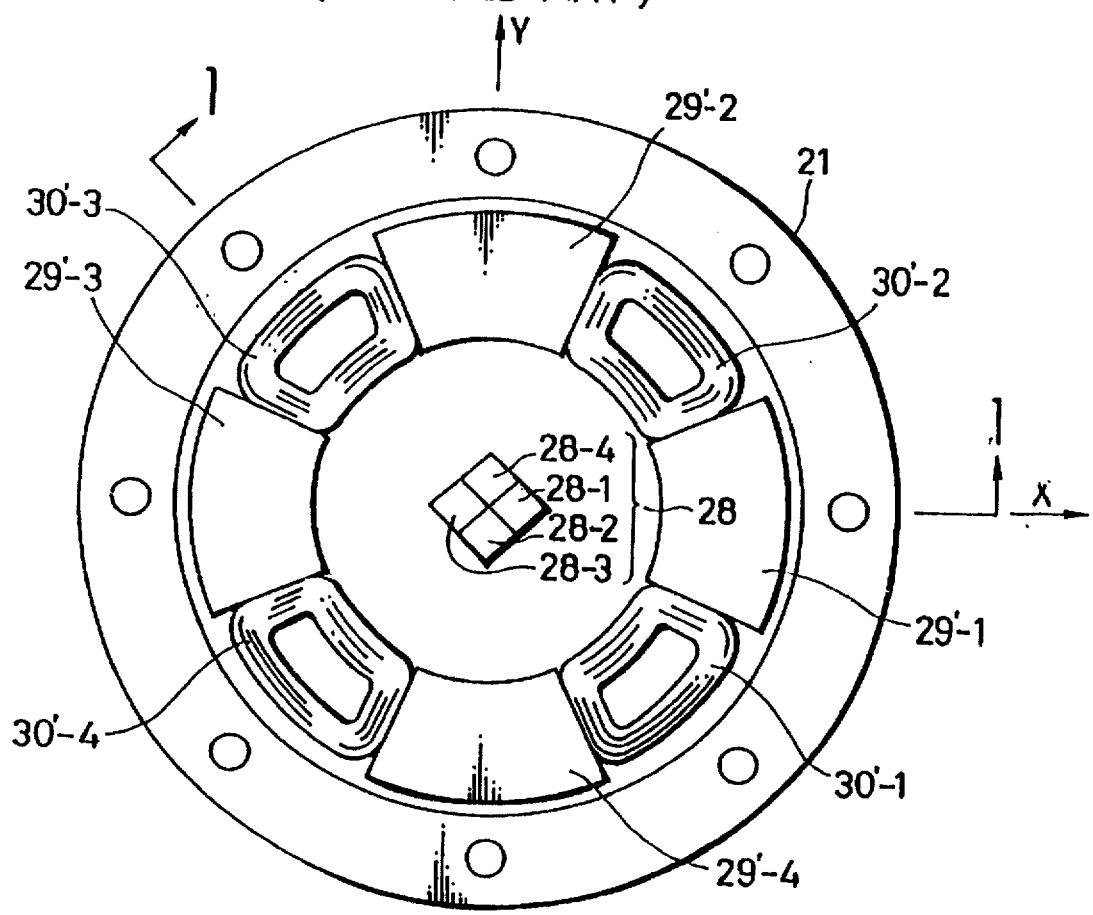
FIG. 1B is a cross-sectional plan view taken along the line 2—2 in FIG. 1A.
Figure 2:
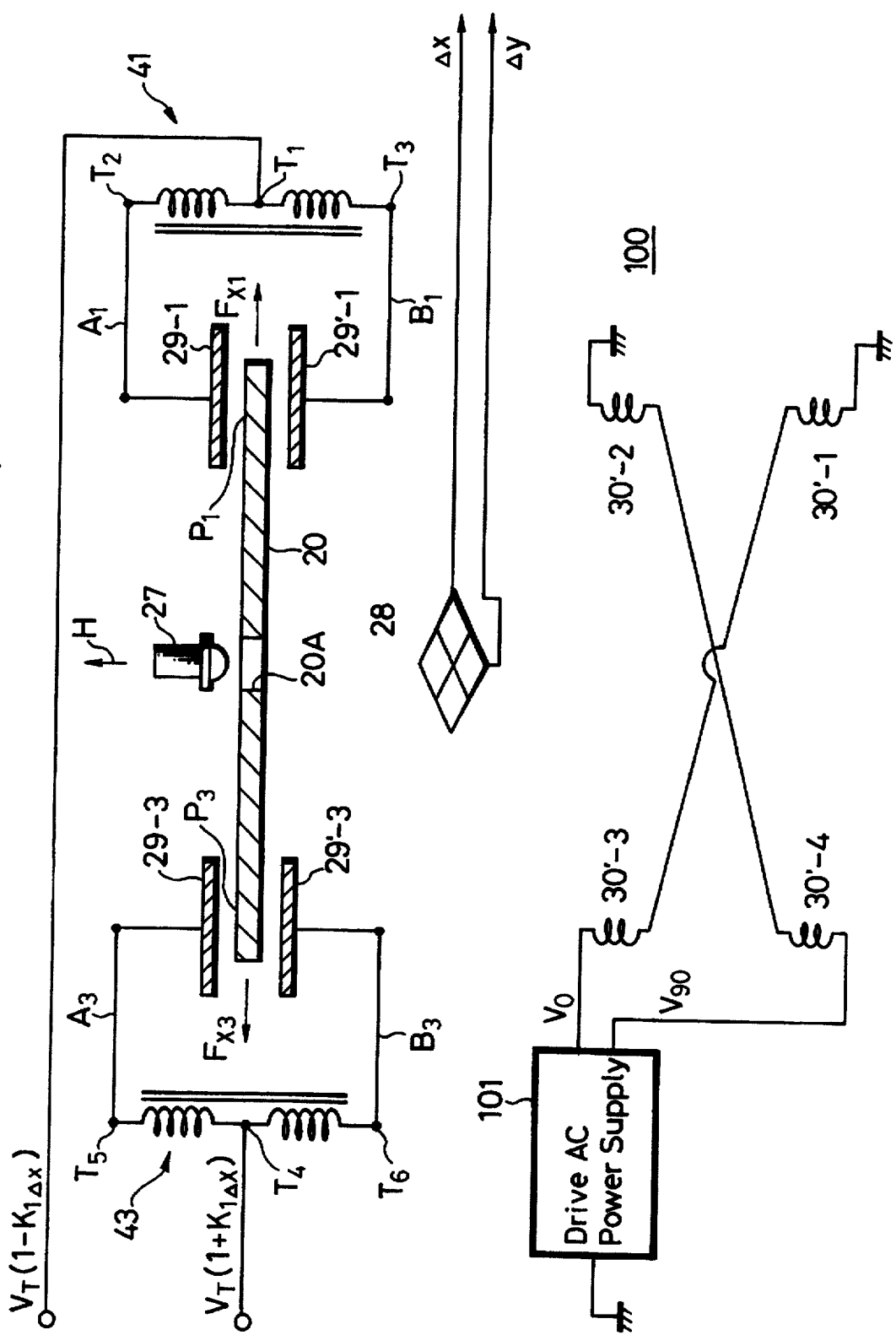
FIG. 2 is a diagram, partly in block form, used to explain operations of a slaving control system and a rotor driving system of the conventional gyro apparatus.
Figure 3:
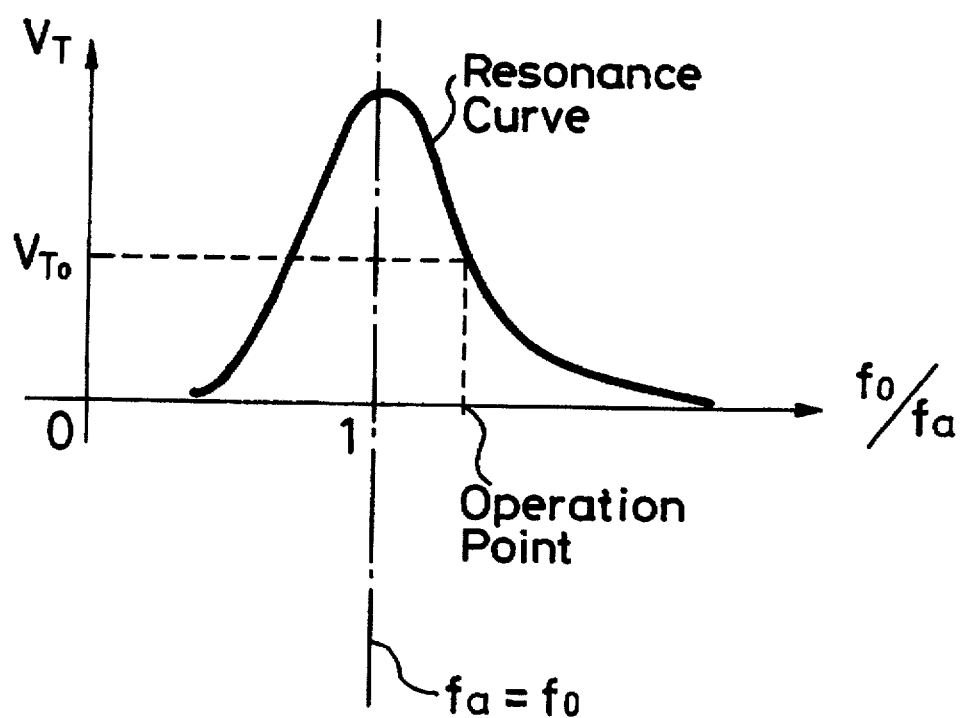
FIG. 3 is a graph of a resonance curve, and to which reference will be made in explaining an operation of a Z control system of the conventional gyro apparatus.
Figure 4A:
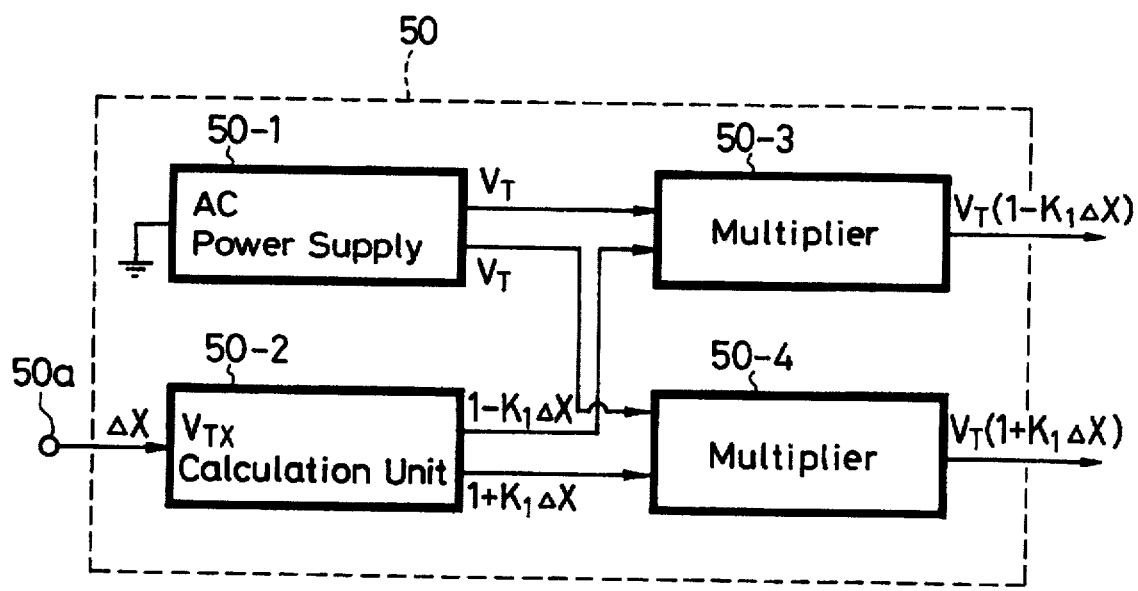
FIGS. 4A, 4B are block diagrams showing XY control systems of the conventional gyro apparatus.
Figure 4B:
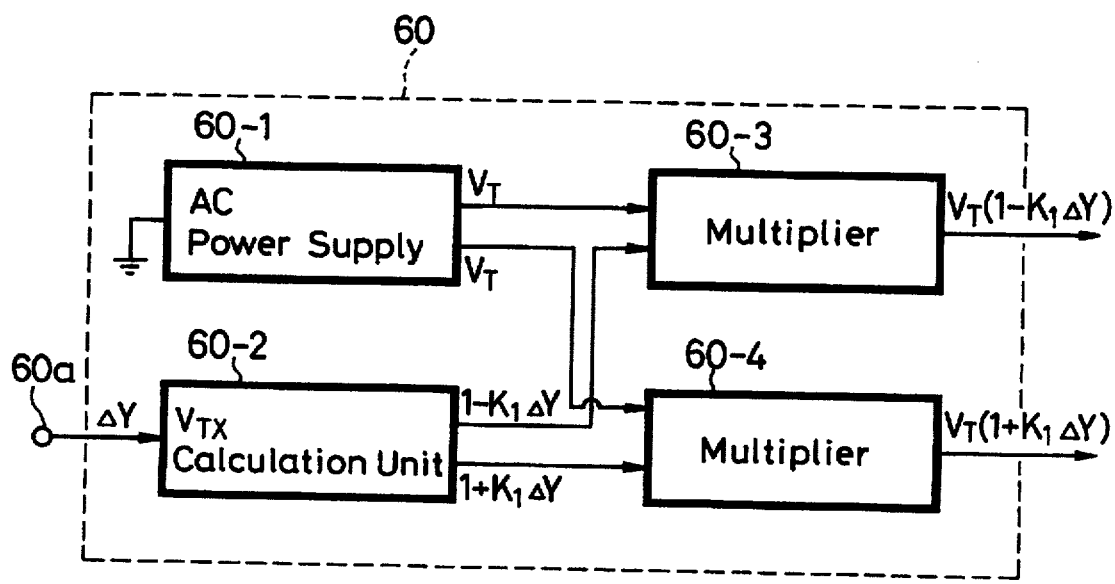
Figure 5A:
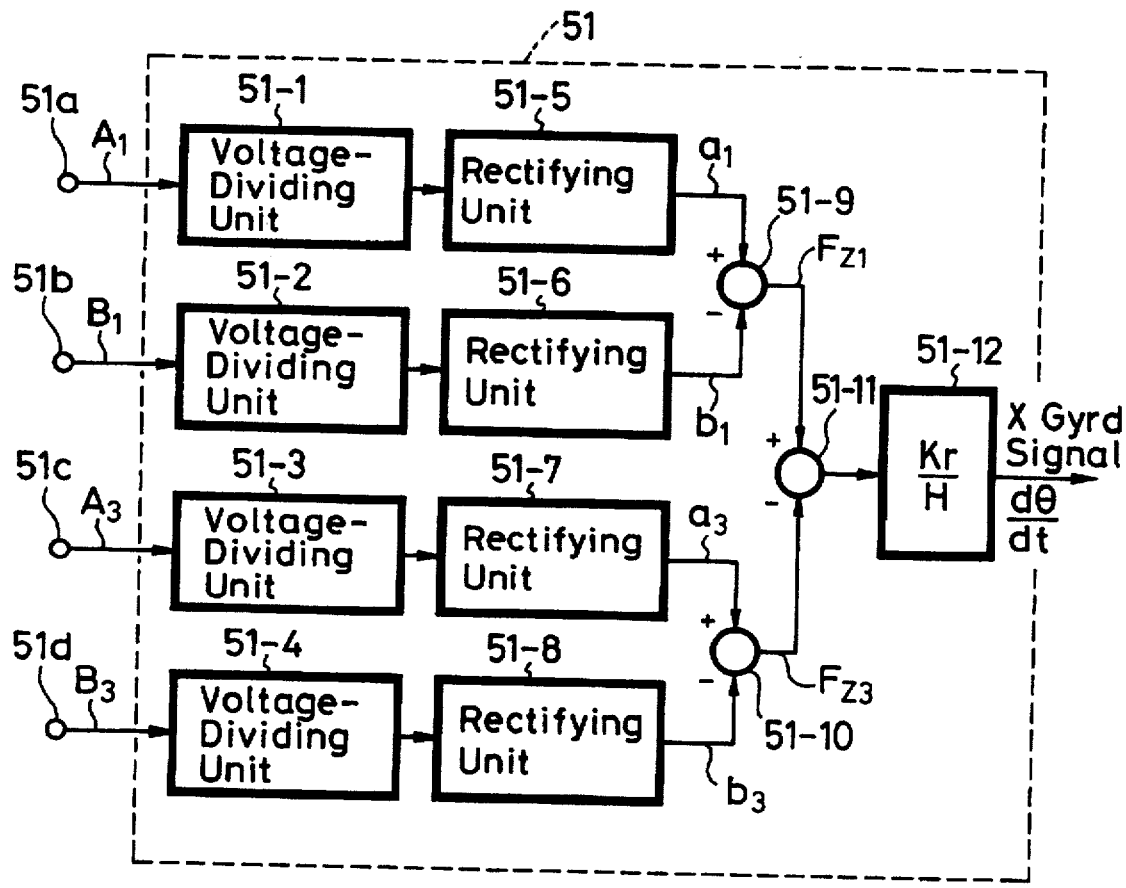
FIGS. 5A and 5B are block diagrams showing examples of X gyro computing unit and X acceleration computing unit of the conventional gyro apparatus.
Figure 5B:
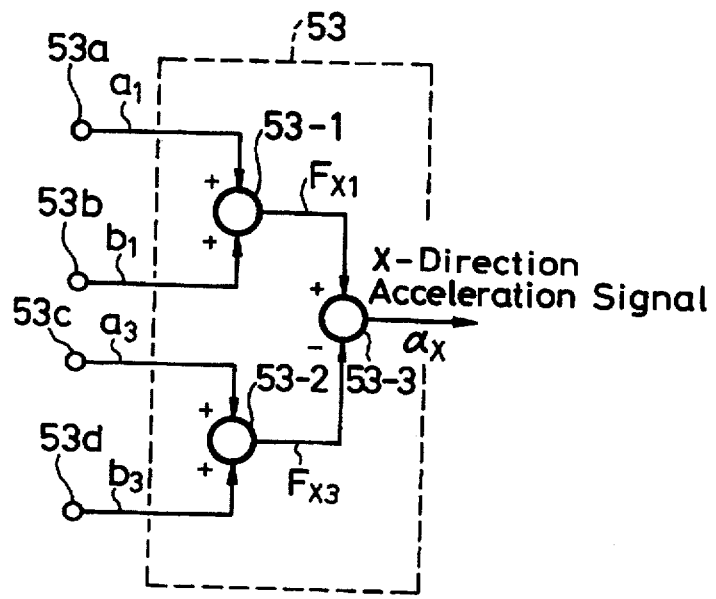
Figure 6A:
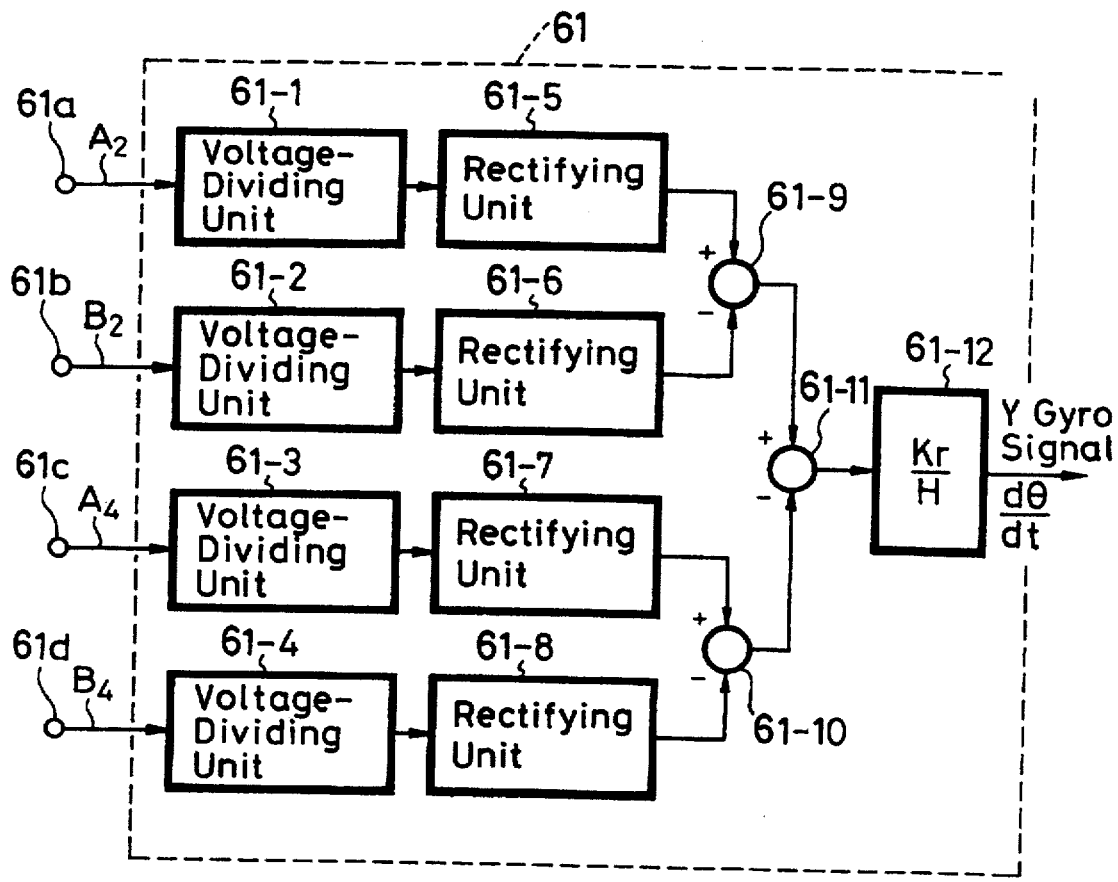
FIGS. 6A and 6B are block diagrams showing examples of Y gyro computing unit and Y acceleration computing unit of the conventional gyro apparatus.
Figure 6B:
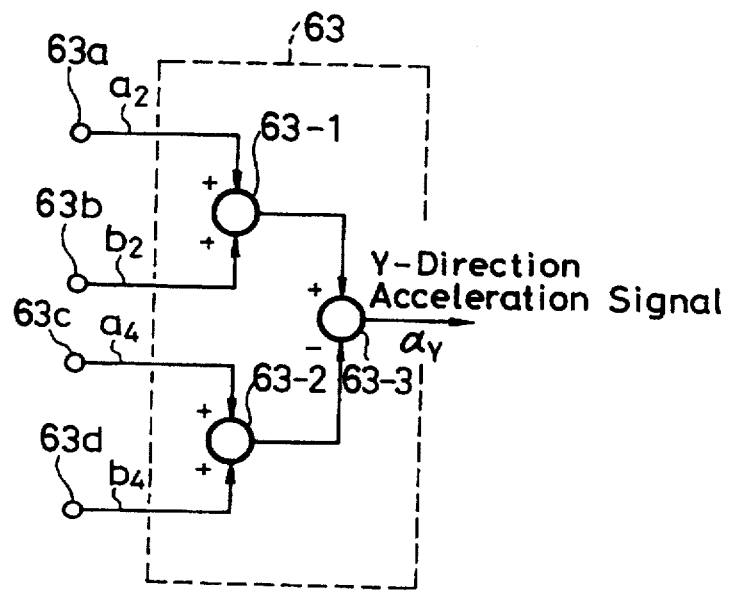
Figure 7:
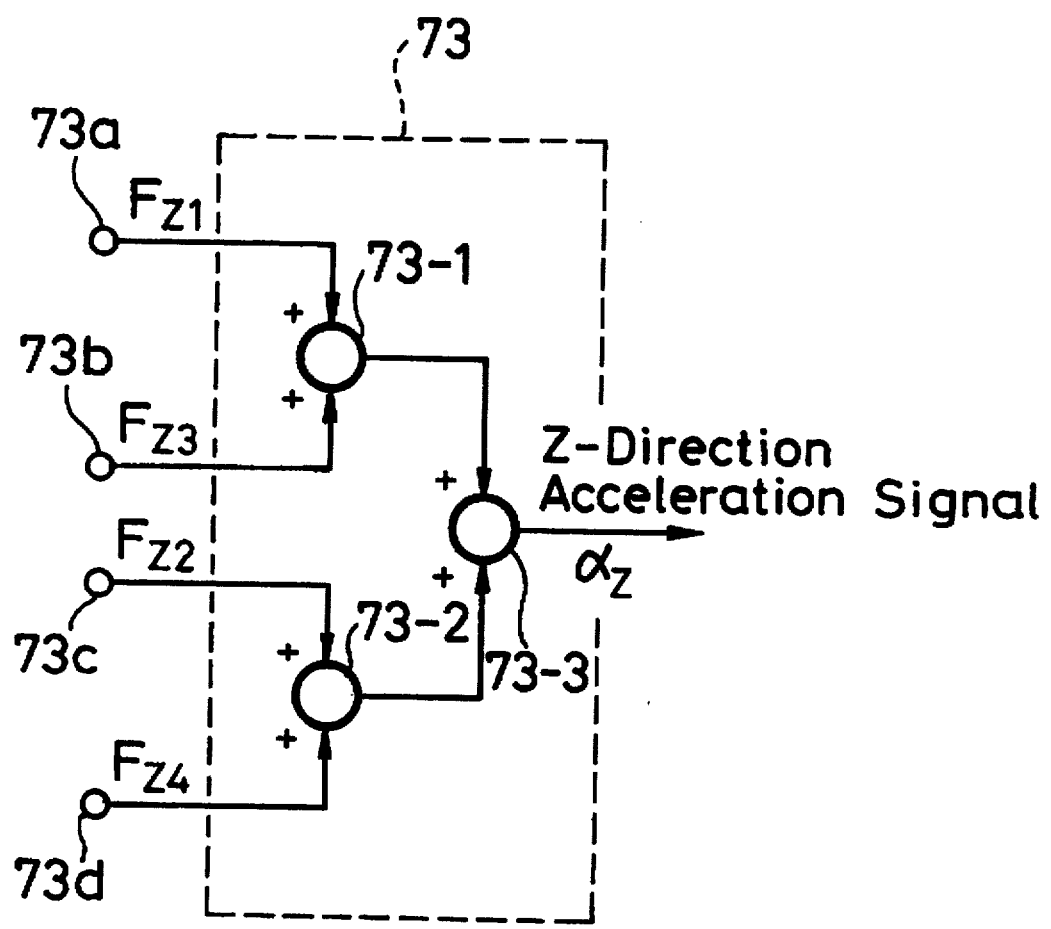
FIG. 7 is a diagram showing an example of a Z acceleration computing unit of the conventional gyro apparatus.
Figure 8A:
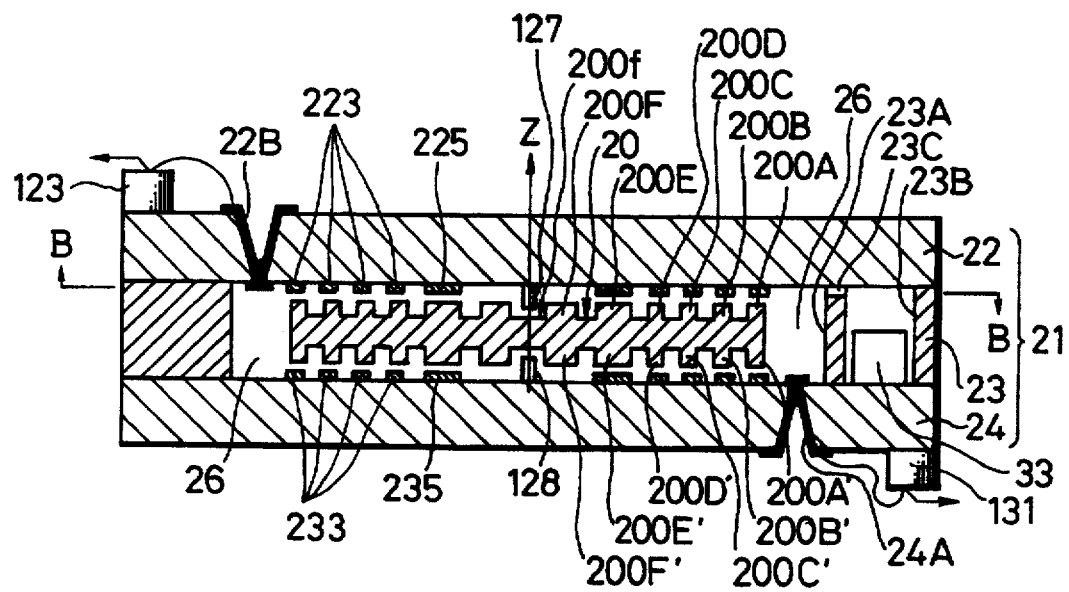
FIG. 8A is a cross-sectional side view illustrating a gyro apparatus according to the present invention.
Figure 8B:
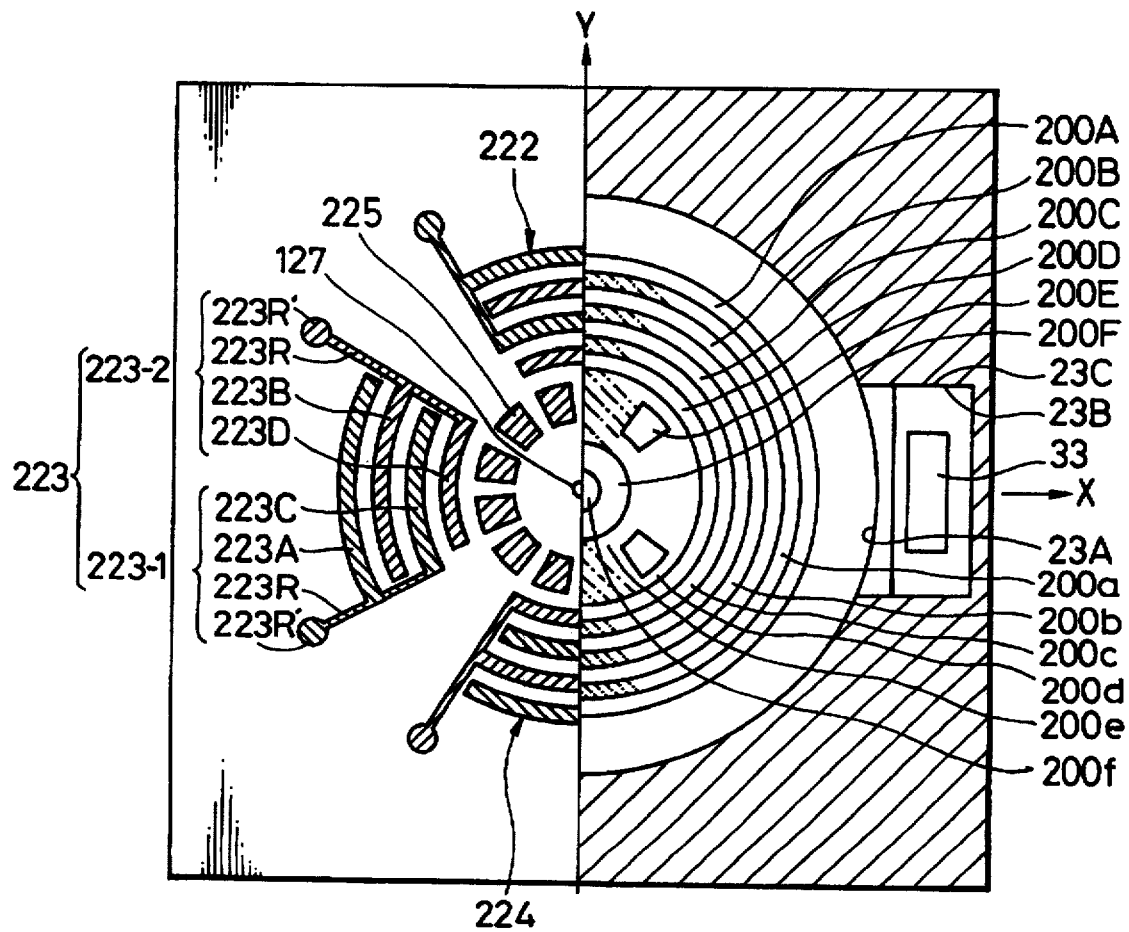
FIG. 8B is a cross-sectional plan view taken along the line B—B in FIG. 8A.

FIGS. 8A, 8B show a gyro apparatus according to an embodiment of the present invention. As shown in FIGS. 8A, 8B, a gyro apparatus includes a thin disk-like gyro rotor 20 and a gyro case 21 with the gyro rotor housed therein.

XYZ coordinates are set in the gyro apparatus as shown in FIGS. 8A, 8B. The Z axis is upwardly oriented along the central axis of the gyro apparatus, and the X axis and the Y axis are oriented in the direction perpendicular to the Z axis. The spin axis of the gyro rotor 20 is disposed along the Z axis.

As shown in FIG. 8A, the gyro case 21 includes an upper bottom member 22, a lower bottom member 24, and a spacer 23 for coupling the upper and lower bottom members 22, 24. The spacer 23 includes an annular inner surface 23A. The inner surfaces of the upper and lower bottom members 22, 24 and the inner surface 23A of the spacer 23 constitute a disk-like hermetically-closed rotor cavity 26 with the gyro rotor 20 housed therein in the inside of the gyro case 21. The rotor cavity 26 is evacuated by some suitable methods.

A concave portion 23B is formed on the outside of the annular inner surface 23A of the spacer 23, and the concave portion 23B is coupled to the rotor cavity 26 by a passage 23C. The height of the passage 23C may be 2 to 3 µm. A getter 33 is disposed in the concave portion 23B, and therefore the rotor cavity 26 can be maintained at high vacuum for a long period of time after the getter 33 has been fired.

The gyro rotor 20 is made of a conductive material, and such conductive material might be single-crystal silicon, for example. If the gyro rotor 20 is made of the single crystal silicon, then it is possible to provide a highly precise gyro rotor which can be hardly affected by thermal distortion and aging. The upper bottom member 22 and the lower bottom member 24 of the gyro case 21 are made of a non-conductive material, e.g., glass. The spacer 23 might be made of the same material as that of the gyro rotor 20. A method of fabricating the gyro rotor 20 and the gyro case 21 will be described in detail later on.

As shown on the right-hand sides of FIGS. 8A, 8B, a plurality of annular electrode portions 200A, 200B, 200C, 200D and 200A', 200B', 200C', 200D' are concentrically formed on the upper and lower surfaces of the gyro rotor 20. Specifically, a plurality of annular grooves 200a, 200b, 200c, 200d, and 200a', 200b', 200c', 200d' are concentrically formed on the upper and lower surfaces, and protruded annular electrode portions 200A, 200B, 200C, 200D, and 200A', 200B', 200C', 200D' are formed by the annular grooves 200a, 200b, 200c, 200d, and 200a', 200b', 200c', 200d'.

On the upper and lower surfaces of the gyro rotor 20, drive electrode portions 200E, 200E' are formed on the insides of the annular electrode portions 200A, 200B, 200C, 200D, and 200A', 200B', 200C', 200D'. The drive electrode portions 200E, 200E' are arranged as a plurality of fan-shaped protruded portions formed between two coaxial annular grooves 200d, 200e, and 200d', 200e', and might be disposed annularly in one row along the circumference.

The annular electrode portions 200A, 200B, 200C, 200D and 200A', 200B', 200C', 200D' and the drive electrode portions 200E, 200E' formed as the protruded portions on the upper and lower surfaces of the gyro rotor 20 might be flush with each other.

On the other hand, as shown on the left-hand sides of FIGS. 8A, 8B, at least three pairs of electrostatic supporting electrodes, in this embodiment, first, second, third, and fourth pairs of electrostatic supporting electrodes 221, 231, 222, 232, 223, 233, and 224, 234 are disposed on the inner surfaces of the upper bottom member 22 and the lower bottom member 24 of the gyro case 21. The four pairs of electrostatic supporting electrodes are disposed at an angular spacing of 90° along the circumferential direction. For example, the first and third pairs of electrostatic supporting electrodes 221, 231, and 223, 233 are disposed along the X axis, and the second and fourth pairs of electrostatic supporting electrodes 222, 232, and 224, 234 are disposed along the Y axis.

Each electrostatic supporting electrode comprises a pair of comb-shaped portions. On the left-hand side of FIG. 8B, for example, there is shown the electrostatic supporting electrode 223 formed on the inner surface of the upper bottom member 22 of the third pair of electrostatic supporting electrodes 223, 233. The electrostatic supporting electrode 223 includes two comb-shaped portions 223-1, 223-2 spaced apart from each other.

One comb-shaped portion 223-1 includes a radial portion 223R extended in the radial direction, and a plurality of circumferential portions 223A, 223C extended in the circumferential direction. Similarly, another comb-shaped portion 223-2 includes a radial portion 223R extended in the radial direction and a plurality of circumferential portions 223B, 223D extended in the circumferential direction. The circumferential portions 223A, 223C, 223B, 223D are alternately disposed so as to sandwich each other. Terminal portions 223R', 223R' are formed on the end portions of the radial portions 223R, 223R of the comb-shaped portions 223-1, 223-2.

On the inner surfaces of the upper bottom member 22 and the lower bottom member 24 of the gyro case 21, drive electrodes 225, 235 are formed on the insides of the four pairs of electrostatic supporting electrodes 221, 231, 222, 232, 223, 233, 224, 234, respectively. The drive electrodes 225, 235 might be arranged as a plurality of fan-like portions disposed annularly in one row along the circumference.

Sizes and relative positional relationship of the annular electrode portions 200A, 200B, 200C, 200D, 200A', 200B', 200C', 200D' of the gyro rotor 20, and electrostatic supporting electrodes 221, 222, 223, 224, 231, 232, 233, 234 of the upper bottom member 22 and the lower bottom member 24 of the gyro case 21 will be described below.

An outer diameter of the gyro rotor 20 might be less than 5 mm, a thickness t thereof might be less than 0.2 mm, and a mass thereof might be less than 10 milligrams. While the four annular electrode portions 200A, 200B, 200C, 200D, and 200A', 200B', 200C', 200D' are illustrated in FIGS. 8A, 8B, in actual practice, there are formed a number of annular electrode portions. When a width L of each electrode portion in the radial direction is about 10 μm and the electrode portions are spaced apart with an equal interval at a radial pitch of about 20 μm, about 100 annular electrode portions are formed within the annular area of width of about 2 mm. The radial width L and the radial pitch of each electrode portion should preferably be as small as possible if a manufacturing method permits.

The sizes of the electrostatic supporting electrodes 221, 222, 223, 224, and 231, 232, 233, 234 of the upper bottom member 22 and the lower bottom member 24 of the gyro case 21 may correspond to the sizes of the annular electrode portions 200A, 200B, 200C, 200D, and 200A', 200B', 200C', 200D'. Although there are four circumferential portions 223A, 223C, 223B, 223D of the comb-shaped portions 223-1, 223-2 of the third electrostatic supporting electrode 223 as shown in FIGS. 8A, 9B, in actual practice, there are formed a number of circumferential portions. For example, when the width L of each circumferential portion in the radial direction is about 10 μm and the circumferential portions are spaced apart with an equal interval at a pitch of about 20 μm, about 100 circumferential portions are formed within an annular area with a width of about 2 mm in the radial direction.

The gyro apparatus is designed such that a radial width $L_1$ of the electrode portions and a radial width $L_2$ of the circumferential portions are equal to each other, i.e., $L_1=L_2$ and that a radial pitch $p_1$ of the electrode portions and a radial pitch $p_2$ of the circumferential portions are equal to each other, i.e., $p_1=p_2$.

A positional relationship between the electrode portions of the gyro rotor 20 and the electrostatic supporting electrodes of the gyro case 21 will be described. For example, a positional relationship between the electrode portions 200A, 200B, 200C, 200D and 200A', 200B', 200C', 200D' of the gyro rotor 20 and the third pair of electrostatic supporting electrodes 223, 233 will be described below. The first circumferential portions 223A, 233A of the third pair of electrostatic supporting electrodes 223, 233 are opposed to the first electrode portions 200A, 200A' of the gyro rotor 20, and the second circumferential portions 223B, 223B of the third pair of electrostatic supporting electrodes 223, 233 are opposed to the second electrode portions 200B, 200B'. Similarly, the third and fourth circumferential portions 223C, 233C, and 223D, 233D are opposed to the third and fourth electrode portions 200C, 200C', and 200D, 200D'.

A clearance δ between the electrode portion of the gyro rotor 20 and the corresponding electrostatic supporting electrode of the gyro case 21 might be several micrometers, and δ=2 to 5 μm, for example.

Radiuses of the annular electrode portions 200A, 200B, 200C, 200D and 200A', 200B', 200C', 200D', i.e., distances thereof from the Z axis may preferably be greater than or smaller than radius of curvatures of the annular circumferential portions 223A, 233A, 223B, 233B and 223C, 233C, 223D, 233D of the corresponding electrostatic supporting electrodes 223, 233, i.e., distances thereof from the Z axis.

Figure 30:
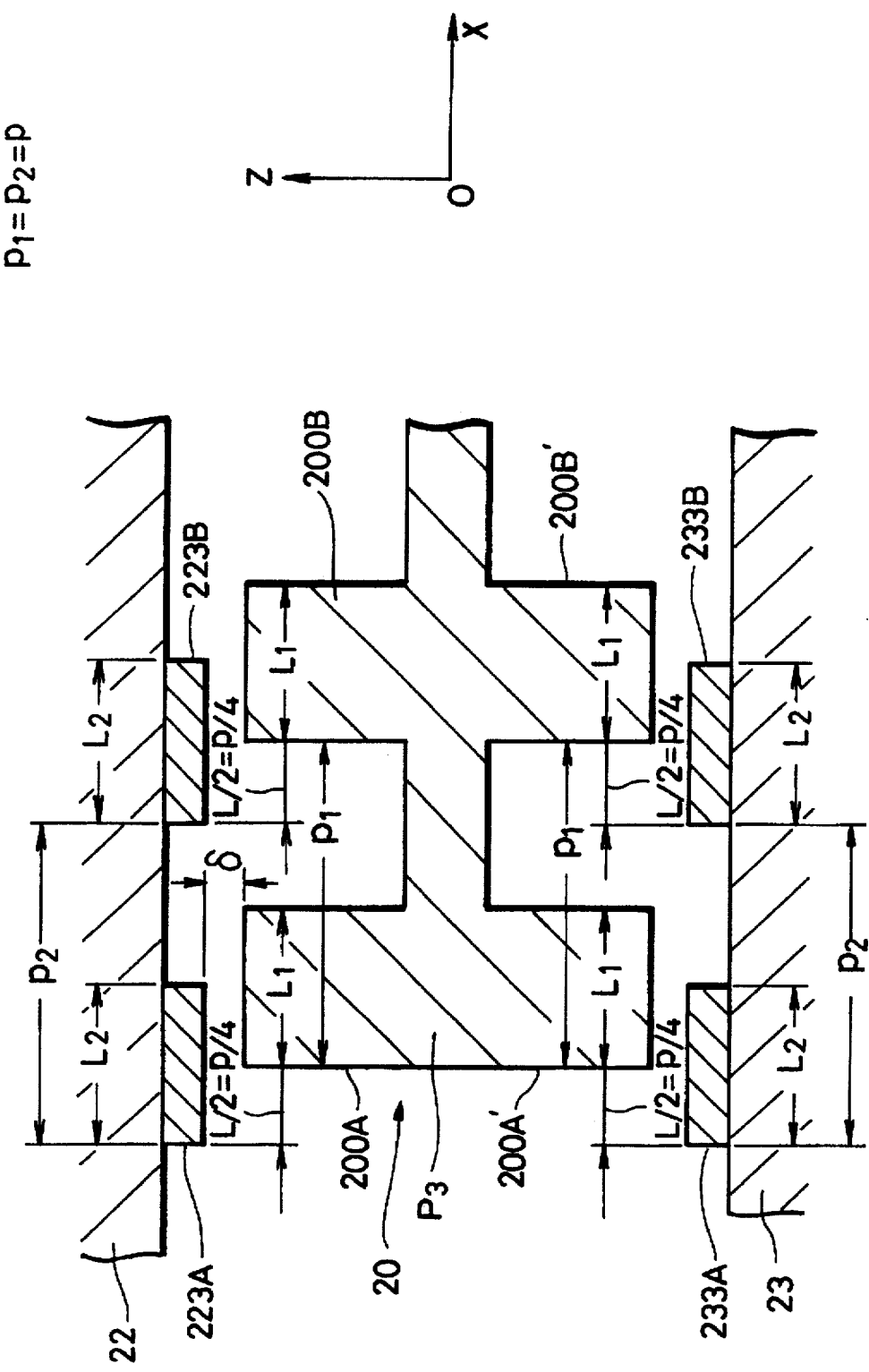
FIG. 30 is an enlarged cross section of a part of the gyro apparatus.

Referring to FIG. 30, in case that the radiuses of the electrode portions 200A, 200B, 200C, 200D, and 200A', 200B', 200C', 200D' of the gyro rotor 20 are smaller than the radius of curvatures of the circumferential portions of the corresponding electrostatic supporting electrodes will be described with reference to the third electrostatic supporting electrodes 223, 233.

As shown in FIG. 30, a difference between radiuses of the annular electrode portions 200A, 200B, 200C, 200D and 200A', 200B', 200C', 200D' and radius of curvatures of the arc of the circumferential portions 223A, 233A, 223B, 233B and 223C, 233C, 223D, 233D may be ½ of the radial width L (i.e., L/2) and ¼ of the radial pitch p (i.e., p/4).

Inner diameters of the first electrode portions 200A, 200A' of the gyro rotor 20 are smaller than those of the corresponding first circumferential portions 223A, 233A, and outer diameters of the first electrode portions 200A, 200A' are smaller than those of the corresponding first circumferential portions 223A, 233A. Similarly, inner diameters of the second, third, and fourth electrode portions 200B, 200B', 200C, 200C', and 200D, 200D' of the gyro rotor 20 are smaller than those of the corresponding second, third, and fourth circumferential portions 223A, 233A, 223B, 233B, 223C, 233C, and 223D, 233D, and outer diameters of the second, third, and fourth electrode portions 200B, 200B', 200C, 200C', and 200D, 200D' of the gyro rotor 20 are smaller than those of the corresponding second, third, and fourth circumferential portions 223A, 233A, 223B, 233B, 223C, 233C, and 223D, 233D.

This is also true in the positional relationship between the electrode portions of the gyro rotor 20 and the first, second, and fourth pairs of electrostatic supporting electrodes 221, 231, 222, 232, 224, 234. Furthermore, this is also true when the electrode portions 200A, 200B, 200C, 200D, 200A', 200B', 200C', 200D' of the gyro rotor 20 are radially outwardly disposed with a displacement from the circumferential portions of the corresponding electrostatic supporting electrodes.

A reason that the electrostatic supporting electrodes according to the present invention are arranged so as to contain a pair of comb-shaped portions disposed alternately will be described below. With the above-mentioned arrangement, in the upper and lower sides of the gyro rotor 20, electrostatic capacities of each pair of comb-shaped portions and electrostatic capacities generated between the corresponding electrode portions of the gyro rotor 20 are equal to each other. In the first electrostatic supporting electrode 221 of the first pair of electrostatic supporting electrodes 221, 231, electrostatic capacities between the first comb-shaped portion 221-1 (221A, 221C) and the corresponding first and third electrode portions 200A, 200C of the gyro rotor 20 and electrostatic capacities between the second comb-shaped portion 221-2 (221B, 221D) and the corresponding second and third electrode portions 200C and 200D of the gyro rotor 20 are equal to each other, and are $C_{1A}$.

Therefore, if the control DC voltage applied to the first comb-shaped portion 221-1 (221A, 221C) and the control DC voltage applied to the second comb-shaped portion 221-2 (221B, 221D) are selected to be voltages of the same magnitude but with opposite polarities, e.g., $\pm V_{1A}$, then the potential of the gyro rotor 20 can be canceled, which will be described later on one more time with reference to FIG. 11.

This is also true in the second electrostatic supporting electrode 231 of the first pair of electrostatic supporting electrodes 221, 231. Furthermore, this is also true in the second, third, and fourth electrostatic supporting electrodes 222, 232, 223, 233, 224, 234.

The drive electrodes 225, 235 of the gyro case 21 and the corresponding drive electrode portions 200E, 200E' of the gyro rotor 20 might be shaped in the same manner and disposed at the same position in the radial direction.

Protruded portions 200F, 200F' are formed at the central portions of the upper and lower surfaces of the gyro rotor 20, and concave portions 200f, 200f' are formed at the central portions of the protruded portions 200F, 200F'. On the other hand, dischargeable stoppers 127, 128 are respectively provided at the central portions of the inner surfaces of the upper bottom member 22 and the lower bottom member 24 of the gyro case 21. Such stoppers 127, 128 are disposed in opposing relation to the concave portions 200f, 200f' formed at the central portions of the upper and lower surfaces of the gyro rotor 20.

The dischargeable stoppers 127, 128 can inhibit the gyro rotor 20 from contacting with the inner surface of the gyro case 21 by restricting the displacements of the gyro rotor 20 in the Z-axis direction, in the X-axis direction, and in the Y-axis direction. Simultaneously, the dischargeable stoppers 127, 128 are adapted to discharge static electricity accumulated in the gyro rotor 20.

When the gyro rotor 20 is displaced in the Z-axis direction and approaches the inner surface of the gyro case 21, the dischargeable stoppers 127, 128 come in contact with the bottoms of the concave portions 200f, 200f' of the gyro rotor 20 before the electrode portions of the gyro rotor 20 contact with the electrodes of the gyro case 21. When the gyro rotor 20 is displaced in the X-axis or Y-axis direction, the discharge stopper 127, 128 come in contact with the circumferential inner surfaces of the concave portions 200f, 200f' of the gyro rotor 20 before the gyro rotor 20 comes in contact with the circumferential inner surface 23A of the gyro case 21.

Thus, the gyro rotor 20 is restricted from being displaced in the Z-axis direction, the X-axis direction, and the Y-axis direction, and the gyro rotor 20 can be inhibited from contacting with the inner surface of the gyro case 21. Further, when the gyro rotor 20 is stopped and grounded, the dischargeable stoppers 127, 128 come in contact the concave portions 200f, 200f' of the gyro rotor 20, whereby static electricity accumulated in the gyro rotor 20 is discharged to the outside through the dischargeable stoppers 127, 128.

The electrostatic supporting electrodes 221, 231, 222, 232, 223, 233, 224, 234 formed on the upper bottom member 22 or the lower bottom member 24 of the gyro case 21, the drive electrodes 225, 235, and the outside power supply or the external circuit might be electrically connected by through-holes. As shown in FIGS. 8A, 8B, small holes, i.e., through-holes 22B, 24A are defined on the upper bottom member 22 or the lower bottom member 24, and metal films are formed on the inner surfaces of the through-holes 22B, 24A. By such metal films, the electrostatic supporting electrodes are connected to mechanism control circuits 123, 131 provided in the outside.

The rotor driving system of the gyro apparatus according to the present invention will be described below. The rotor driving system according to this invention includes drive electrode portions 200E, 200E' formed on the upper and lower surfaces of the gyro rotor 20 and drive electrodes 225, 235 formed on the upper bottom member 22 or the lower bottom member 24 of the gyro case 21. As described above, the drive electrode portions 200E, 200E' and the drive electrodes 225, 235 are disposed in one row on the circumference of the same radius, and each comprises a plurality of the same fan-like portions.

The drive electrode portions 200E, 200E' and the drive electrodes 223, 235 according to the present invention constitute a three-phase electrode. According to this embodiment, the upper drive electrode portions 200E of the gyro rotor 20 includes four fan-like portions which are spaced apart from each other by a central angle of 90°, and the lower drive electrode portion 200E' of the gyro rotor 20 includes four fan-like portions which are spaced apart from each other by a central angle of 90°.

Concurrently therewith, the upper drive electrode 225 of the gyro case 21 includes twelve fan-like portions which are spaced apart from each other by an equal central angle, and the lower drive electrode 235 of the gyro case 21 includes twelve fan-like portions which are spaced apart from each other by an equal central angle. Each of twelve drive electrodes 225 or 235 includes four sets of fan-like portions, and each set comprises three fan-like portions, i.e., first-phase, second-phase, and third-phase.

The fan-like portions of the corresponding phase of the drive electrodes 225 or 235 of each set are connected electrically. The four drive electrodes 225 or 235 of the first phase, for example, are connected electrically, the four drive electrodes 225 or 235 of the second phase are connected electrically, and the four drive electrodes 225 or 235 of the third phase are connected electrically.

A three-phase drive voltage is applied to the three-phase common terminal, and the drive voltage is either a step-like voltage or pulse voltage. The drive voltage is sequentially switched to the adjacent four fan-like portions of the next phase, and the switching of the drive voltage is effected in synchronism with the rotation of the gyro rotor 20, whereby the gyro rotor 20 is rotated at high speed. Since the rotor cavity 26 of the gyro case 21 is maintained vacuum, if the rotational speed of the gyro rotor 20 is increased, then the drive voltage is cut off or the drive voltage is constantly applied to the above three-phase common terminal.

The drive electrode portions 200E, 200E' and the drive electrodes 225, 235 composing the three phase electrode might include much more fan-like portions. For example, each of the drive electrode portions 200E, 200E' might include five fan-like portions, and concurrently therewith, each of the drive electrodes 225, 235 might include five sets (15) fan-like portions.

Figure 9:
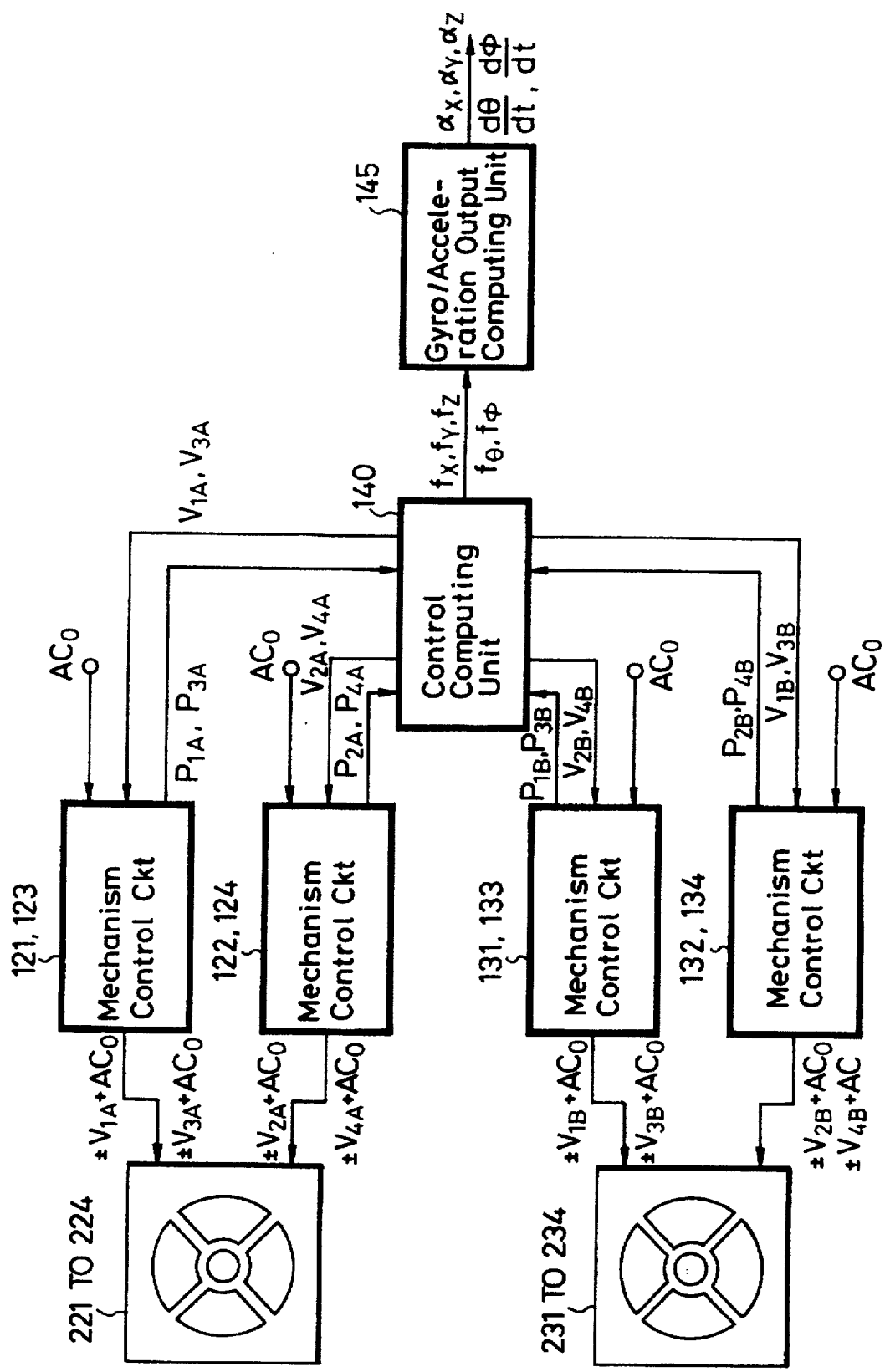
FIG. 9 is a block diagram showing an example of a control loop of the gyro apparatus according to the present invention.

FIG. 9 shows, in block form, a control loop of the gyro apparatus according to the present invention. As shown in FIG. 9, the control loop according to this invention includes mechanism control circuits 121 through 124, and 131 through 134 connected to the four pairs of the electrostatic supporting electrodes 221 through 224, and 231 through 234, and a control computing unit 140 for generating control DC voltages $V_{1A}$ through $V_{4B}$, and $V_{1B}$ through $V_{4B}$ from output voltages $P_{1A}$ through $P_{4A}$, and $P_{1B}$ through $P_{4B}$ supplied thereto from the mechanism control circuits 121 through 134. The control DC voltages $V_{1A}$ through $V_{4B}$, and $V_{1B}$ through $V_{4B}$ generated from the control computing unit 140 are supplied to the mechanical control circuits 121 through 134. The mechanical control circuits 121 through 134 superimposes the control DC voltages $\pm V_{1A}$ through $\pm V_{4A}$, and $\pm V_{1B}$ through $\pm V_{4B}$ and the displacement detection AC voltage $AC_0$, and supplies resultant voltages to the electrostatic supporting electrodes 221 through 224, and 231 through 234.

The gyro apparatus according to the present invention includes a gyro/acceleration output computing unit 145 for receiving an output signal from the control computing unit 140 which will be described in detail later on.

The control DC voltages $\pm V_{1A}$ through $\pm V_{4A}$, and $\pm V_{1B}$ through $\pm V_{4B}$ are applied to the electrostatic supporting electrodes 221 through 224, and 231 through 234, whereby the gyro rotor 20 is floated, supported and slaved at a predetermined reference position. The mechanism control circuits 121 through 124, and 131 through 134 are connected to the four pairs of electrostatic supporting electrodes 221 through 224, and 231 through 234, and detect voltages applied to the four pairs of electrostatic supporting electrodes 221 through 224, and 231 through 234. The displacement detection AC voltage $AC_0$ is applied to the electrostatic supporting electrodes 221 through 224, and 231 through 234, whereby the mechanism control circuits 121 through 124, and 131 through 134 detect voltage signals $P_{1A}$ through $P_{4A}$, and $P_{1B}$ through $P_{4B}$ outputted from the electrostatic supporting electrodes 221 through 224, and 231 through 234.

The voltage signals $P_{1A}$ through $P_{4A}$, and $P_{1B}$ through $P_{4B}$ contain all linear displacements and rotational displacements of the gyro rotor 20. Such voltage signals $P_{1A}$ through $P_{4A}$, and $P_{1B}$ through $P_{4B}$ are supplied to the control computing unit 140. The control computing unit 140 detects Z-axis direction displacements $\pm\Delta z$, X-axis direction displacements $\pm\Delta x$, Y-axis direction displacements $\pm\Delta y$, and X-axis and Y-axis rotational displacements $\Delta\phi$, $\Delta\theta$ of the gyro rotor 20 (arrows on the upper right in FIG. 10 indicates the positive direction). The control computing unit 140 calculates the control DC voltages $\pm V_{1A}$ through $\pm V_{4A}$, and $\pm V_{1B}$ through $\pm V_{4B}$ to be applied to the electrostatic supporting electrodes 221 through 224, and 231 through 234 based on the detected displacements. In this manner, the control DC voltages $\pm V_{1A}$ through $\pm V_{4A}$ are changed, and the gyro rotor 20 is returned to the original position in order to cancel its displacement amount out.

The slaving control system according to the present invention measures the displacement amount of the gyro rotor 20 in actual practice, and aggressively changes the electrostatic force so as to cancel the displacement amount out, and hence the slaving control system according to the present invention is of the active type unlike the conventional passive-type slaving system.

A slaving control system of the gyro apparatus according to the present invention will be described with reference to FIG. 10. The slaving control system according to the present invention is arranged in order to float and support the gyro rotor 20 at a predetermined position, and slaves the gyro rotor 20 in the Z-axis direction, in the X-axis direction, and in the Y-axis direction such that the gyro rotor 20 may not contact with the inner surface of the gyro case 21. Moreover, this slaving control system is adapted to slave the X-axis and Y-axis rotational displacements of the gyro rotor 20.

In actual practice, although the gyro rotor 20 is rotated at high speed, $P_1$, $P_2$, $P_3$, $P_4$ assume the four portions of the gyro rotor 20 located at the positions corresponding to the first, second, third, and fourth pairs of electrostatic supporting electrodes, respectively.

Figure 10:
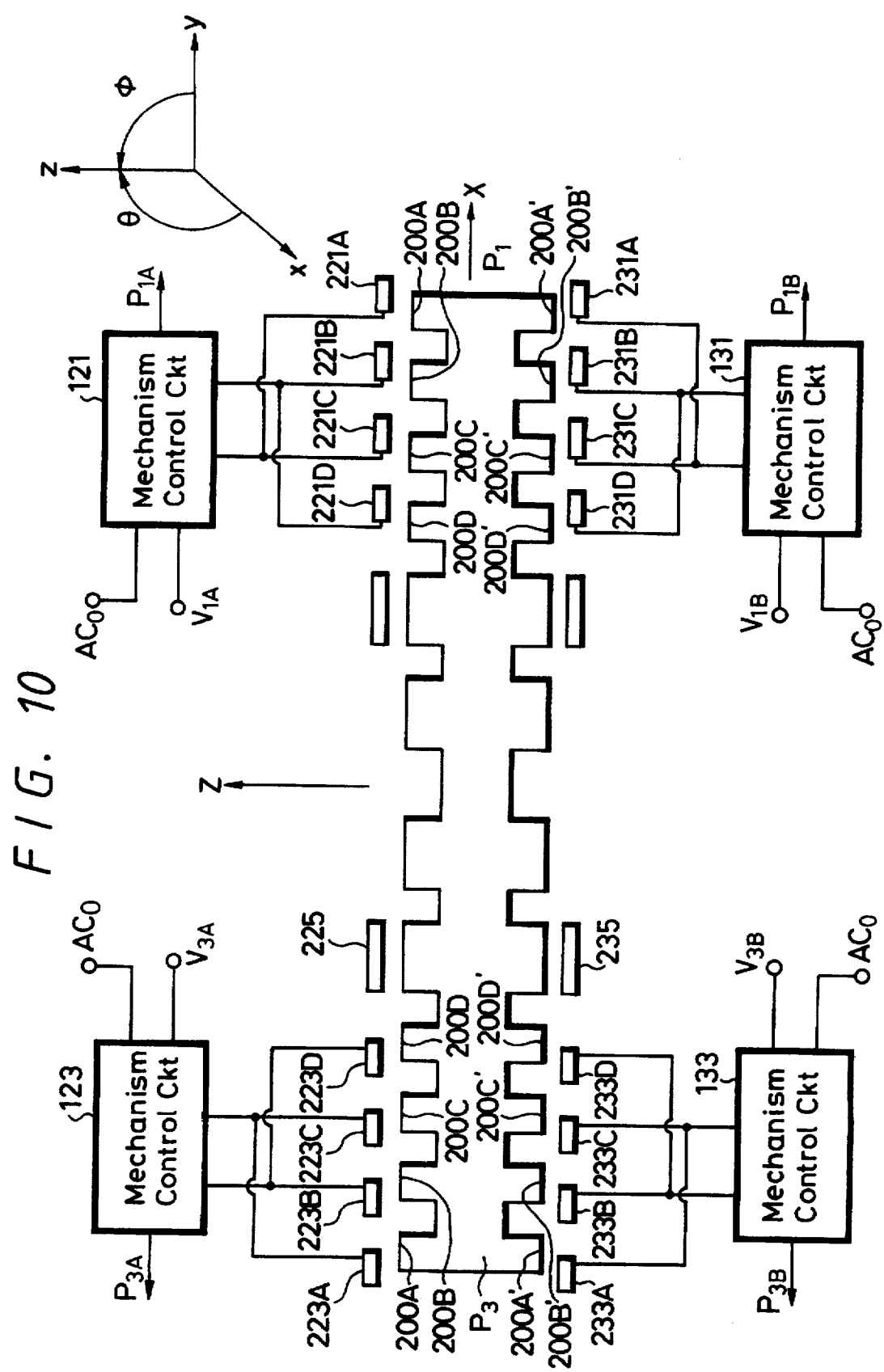
FIG. 10 is a block diagram used to explain a slaving control system of the gyro apparatus according to the present invention.

FIG. 10 shows a cross section of the gyro apparatus according to the present invention taken along the XZ plane wherein the first and third portions $P_1$, $P_3$ of the gyro rotor 20 disposed along the X axis, the first and third pairs of electrostatic supporting electrodes 221, 231, and 223, 233, and the first and third pairs of mechanism control circuits 121, 131, and 123, 133 are illustrated. Although the second and fourth portions $P_2$, $P_4$ of the gyro rotor 20 disposed along the Y axis and the corresponding second and fourth pairs of electrostatic supporting electrodes and the mechanism control circuits are not shown, they are disposed along the direction perpendicular to the sheet of drawings.

The circumference portions 221A, 221B, 221C, 221D of the first electrostatic supporting electrode pair 221 correspond to the electrode portions 200A, 200B, 200C, 200D formed on the upper surface of the gyro rotor 20, and the circumference portions 231A, 231B, 221C, 221D of the first electrostatic supporting electrode pair 231 correspond to the electrode portions 200A', 200B', 200C', 200D' formed on the lower surface of the gyro rotor 20. The circumference portions 223A, 223B, 223C, 223D of the third electrostatic supporting electrode pair 223 correspond to the electrode portions 200A, 200B, 200C, 200D formed on the upper surface of the gyro rotor 20, and the circumference portions 233A, 233B, 233C, 233D of the third electrostatic supporting electrode pair 233 correspond to the electrode portions 200A', 200B', 200C', 200D' formed on the lower surface of the gyro rotor 20.

An arrangement of the mechanism control circuit 121 and a principle of detecting displacement will be described with reference to FIG. 11. The mechanism control circuit 121 is connected to the first electrostatic supporting electrode 221 of the first pair of electrostatic supporting electrodes 221, 231, and other mechanism control circuits 122, 123, 124, 131, 132, 133, 134 also may be arranged similarly. As shown in FIG. 11, the mechanism control circuit 121 includes an adder 121-1 for adding the control DC voltage $V_{1A}$ and the displacement detection AC voltage $AC_0$, a code inverter 121-2, two capacitors 121-3A, 121-3B, and a subtracter 121-4.

Figure 11:
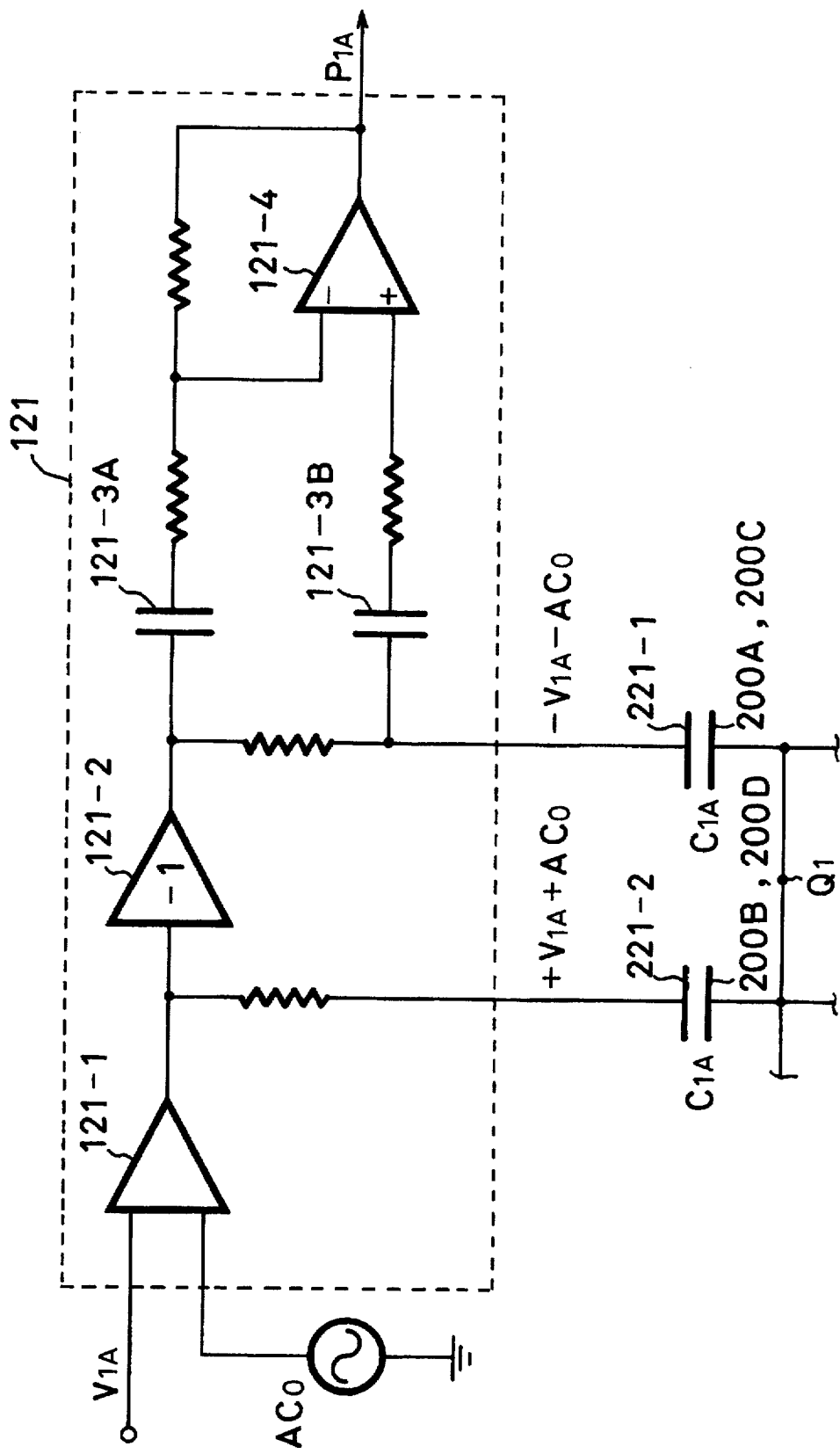
FIG. 11 is a diagram showing a mechanism control circuit of the gyro apparatus according to the present invention.

In FIG. 11, the first and second comb-shaped portions 221-1 (221A, 221C) and 221-2 (221B, 221D) of the first electrostatic supporting electrode 221, and the corresponding electrode portions 200A, 200C, and 200B, 200D of the gyro rotor 20 are respectively replaced with the first and second capacitors. As described above, in the first electrostatic supporting electrode 221, electrostatic capacity between the first comb-shaped portion 221-1 and the first and third electrode portions 200A, 200C and electrostatic capacity between the second comb-shaped portion 221-2 and the second and fourth electrode portions 200B, 200D are equal to each other and are $C_{1A}$. Therefore, electrostatic capacities of the two capacitors are both $C_{1A}$.

The mechanism control circuit 121 outputs the control DC voltages $\pm V_{1A}$. The control DC voltage $+V_{1A}$ is applied to the first comb-shaped portion 221-1 (221A, 221C) of the first electrostatic supporting electrode 221, and the control DC voltage $-V_{1A}$ of the same magnitude but with opposite polarity is applied to the second comb-shaped portion 221-2 (221B, 221D). Accordingly, the control DC voltages $\pm V_{1A}$ with the same magnitude but with the opposite polarity are applied to the first and second capacitors, thereby canceling the potential developed at a junction $Q_1$ of the pair of capacitors out. According to this embodiment, since the control DC voltages with the same magnitude but with the opposite polarities are applied to the pairs of comb-shaped portions of the electrostatic supporting electrodes, the potential of the gyro rotor 20 is constantly held at zero.

The mechanism control circuit 121 outputs the control DC voltages $\pm V_{1A}$ with the displacement detection AC voltage $AC_0$ superimposed thereon, and the displacement detection AC voltage $AC_0$ is applied to the two capacitors. The displacement detection AC voltage $Ac_0$ is expressed by the following equation (10):

$$AC_0 = E_0 \cos(\omega_0 t + \xi) \tag{10}$$

In a like manner, in the first electrostatic supporting electrode 223 of the third electrostatic supporting electrode pair 223, 233, electrostatic capacity between the first comb-shaped portion 223-1 and the first and third electrode portions 200A, 200C, and electrostatic capacity between the second comb-shaped portion 223-2 and the second and fourth electrode portions 200B, 200D are equal to each other, and $C_{3A}$. In the second electrostatic supporting electrode 233, electrostatic capacity between the first comb-shaped portion 233-1 and the first and third electrode portions 200A', 200C' and electrostatic capacity between the second comb-shaped portion 233-2 and the second and fourth electrode portions 200B', 200D' are equal to each other, and are $C_{3B}$.

When the gyro rotor 20 is linearly displaced in the X axis direction by $\Delta x$, rotationally displaced around the Y axis by $\Delta \theta$, and linearly displaced in the Z axis direction by $\Delta Z$, if such displacements are sufficiently small, then electrostatic capacities of respective capacitors are expressed by the equation (11) below:

$$C_{1A} = C_0(1 + \Delta X + \Delta Z + \Delta \theta)$$

$$C_{1B} = C_0(1 + \Delta X - \Delta Z - \Delta \theta)$$

$$C_{3A} = C_0(1 - \Delta X + \Delta Z - \Delta \theta)$$

$$C_{3B} = C_0(1 - \Delta X - \Delta Z + \Delta \theta) \tag{11}$$

where $C_0$ is the electrostatic capacity accumulated in each capacitor when all displacements are zero. Conversely, from the above equation (11), the displacements $\Delta X$, $\Delta Z$, $\Delta \theta$ can be expressed by electrostatic capacities of respective capacitors:

$$\Delta X = (\tfrac{1}{4}C_0)(C_{1A} + C_{1B} - C_{3A} - C_{3B})$$

$$\Delta \theta = (\tfrac{1}{4}C_0)(C_{1A} - C_{1B} - C_{3A} + C_{3B})$$

$$\Delta Z = (\tfrac{1}{4}C_0)(C_{1A} - C_{1B} + C_{3A} - C_{3B}) \tag{12}$$

Although a cross section of the gyro apparatus taken along the YZ plane is not shown, similar effects are achieved with respect to the second and fourth pairs of electrostatic supporting electrodes 222, 232, and 224, 234 disposed along the Y axis, and the corresponding second and fourth portions $P_2$, $P_4$ of the gyro rotor 20.

By way of example, assuming that the gyro rotor 20 is linearly displaced in the Y axis direction by $\Delta Y$, linearly displaced in the Z axis direction by $\Delta Z$, and rotationally displaced around the X axis by $\Delta \phi$, then electrostatic capacities of respective capacitors are expressed by the following equation (13) in correspondence to the equation (11):

$$C_{2A} = C_0(1 + \Delta Y + \Delta Z + \Delta \phi)$$

$$C_{2B} = C_0(1 + \Delta Y - \Delta Z - \Delta \phi)$$

$$C_{4A} = C_0(1 - \Delta Y + \Delta Z - \Delta \phi)$$

$$C_{4B} = C_0(1 - \Delta Y - \Delta Z + \Delta \phi) \tag{13}$$

Expressing the displacements $\Delta X$, $\Delta Y$, $\Delta \phi$ by the electrostatic capacities of the capacitors in correspondence to the equation (12), we have:

$$\Delta Y = (\tfrac{1}{4}C_0)(C_{2A} + C_{2B} - C_{4A} - C_{4B})$$

$$\Delta \phi = (\tfrac{1}{4}C_0)(C_{2A} - C_{2B} - C_{4A} + C_{4B})$$

$$\Delta Z = (\tfrac{1}{4}C_0)(C_{2A} - C_{2B} + C_{4A} - C_{4B}) \tag{14}$$

Output signals $P_{1A}$, $P_{1B}$, $P_{2A}$, $P_{2B}$, $P_{3A}$, $P_{3B}$, $P_{4A}$, $P_{4B}$ of the mechanism control circuits 121, 122, 123, 124, 131, 132, 133, 134 are expressed by the equation (15) below:

$$P_{1A}=K_V C_{1A} E_0 \cos(\omega_0 t+\xi)$$
$$P_{1B}=K_V C_{1B} E_0 \cos(\omega_0 t+\xi)$$
$$P_{2A}=K_V C_{2A} E_0 \cos(\omega_0 t+\xi)$$
$$P_{2B}=K_V C_{2B} E_0 \cos(\omega_0 t+\xi)$$
$$P_{3A}=K_V C_{3A} E_0 \cos(\omega_0 t+\xi)$$
$$P_{3B}=K_V C_{3B} E_0 \cos(\omega_0 t+\xi)$$
$$P_{4A}=K_V C_{4A} E_0 \cos(\omega_0 t+\xi)$$
$$P_{4B}=K_V C_{4B} E_0 \cos(\omega_0 t+\xi) \quad (15)$$

where $K_V$ is the constant determined by the shape of the capacitor or the like. From the equation (15), electrostatic capacities $C_{1A}$, $C_{1B}$, $C_{2A}$, $C_{2B}$, $C_{3A}$, $C_{3B}$, $C_{4A}$, $C_{4B}$ are expressed by the following equation (16):

$$C_{1A}=P_{1A}[1/K_V E_0 \cos(\omega_0 t+\xi)]$$
$$C_{1B}=P_{1B}[1/K_V E_0 \cos(\omega_0 t+\xi)]$$
$$C_{2A}=P_{2A}[1/K_V E_0 \cos(\omega_0 t+\xi)]$$
$$C_{2B}=P_{2B}[1/K_V E_0 \cos(\omega_0 t+\xi)]$$
$$C_{3A}=P_{3A}[1/K_V E_0 \cos(\omega_0 t+\xi)]$$
$$C_{3B}=P_{3B}[1/K_V E_0 \cos(\omega_0 t+\xi)]$$
$$C_{4A}=P_{4A}[1/K_V E_0 \cos(\omega_0 t+\xi)]$$
$$C_{4B}=P_{4B}[1/K_V E_0 \cos(\omega_0 t+\xi)] \quad (16)$$

Substituting the equation (16) into the right-hand sides of the equations (12) and (14) yields the following equation (17) by which linear and rotational displacements of the gyro rotor 20 can be obtained:

$$\Delta X = K_X(P_{1A}+P_{1B}-P_{3A}-P_{3B})$$
$$\Delta Y = K_Y(P_{2A}+P_{2B}-P_{4A}-P_{4B})$$
$$\Delta Z = K_Z(P_{1A}+P_{2A}+P_{3A}+P_{4A}-P_{1B}-P_{2B}-P_{3B}-P_{4B})$$
$$\Delta \theta = K\theta(P_{1A}-P_{1B}-P_{3A}+P_{3B})$$
$$\Delta \phi = K\phi(P_{2A}-P_{2B}-P_{4A}+P_{4B}) \quad (17)$$

where Kx, Ky, Kz, Kθ, Kφ are the proportional constants. Study of the equation (16) reveals that such proportional constants contain vibration component $1/\cos(\omega_0 t+\xi)$. According to this embodiment, all linear displacements and rotational displacements of the gyro rotor 20 can be obtained from the output voltages $P_{1A}$ through $P_{4B}$ of the four pairs of the mechanism control circuits. Even when more than two of the linear displacements ΔX, ΔY, ΔZ and the rotational displacements Δθ, Δφ are superimposed upon each other, the above respective displacements can be obtained by the aforesaid equation (17).

The slaving control system according to this embodiment measures the displacement amounts of the gyro rotor 20 and aggressively changes electrostatic force in order to cancel the displacement amounts, and is of the active type unlike the conventional passive type slaving system.

Figure 12:
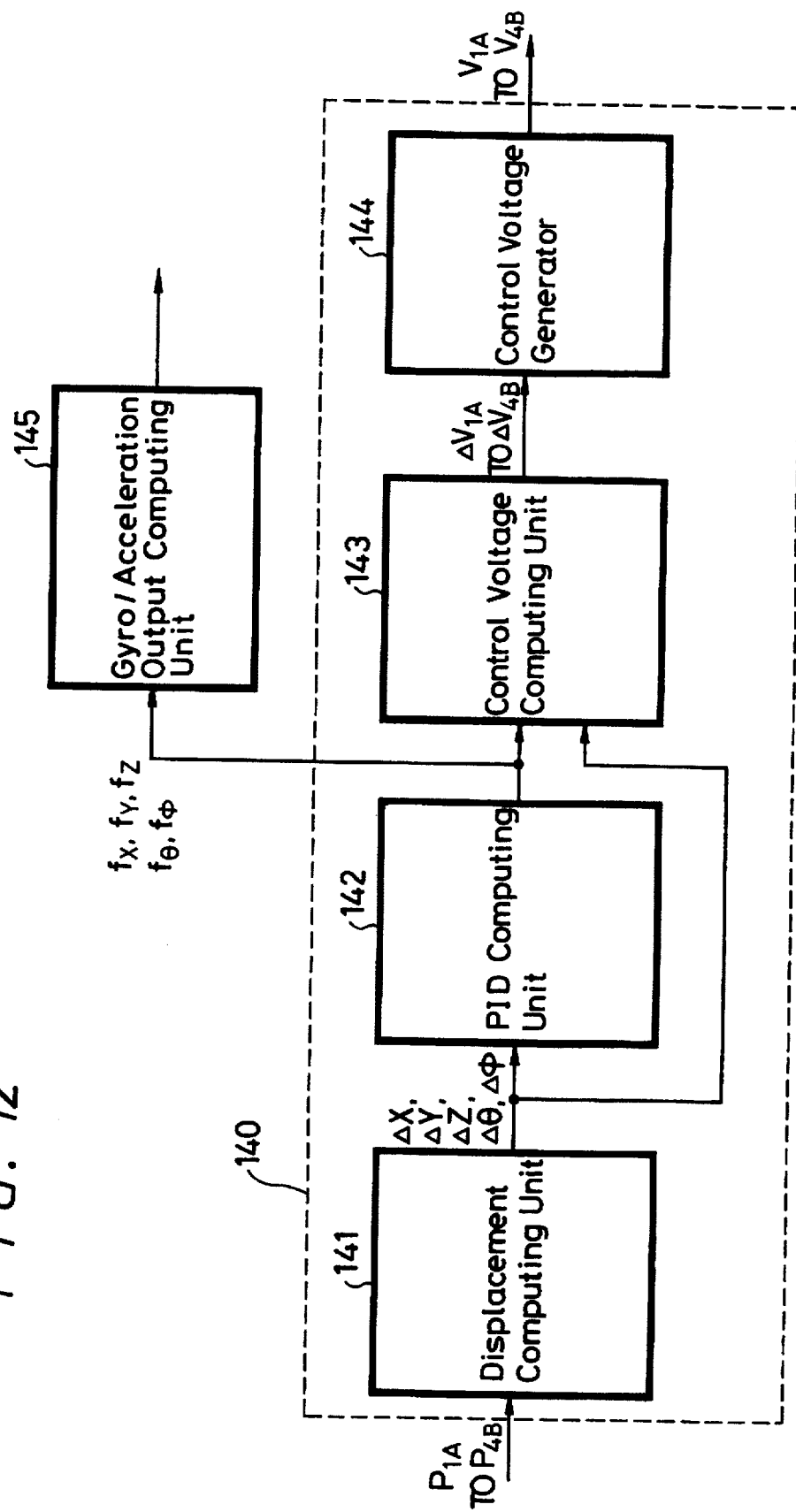
FIG. 12 is a block diagram showing a control computing unit and a gyro/acceleration output computing unit of the gyro apparatus according to the present invention.

FIG. 12 shows, in block form, the control computing unit 140 and the gyro/acceleration output computing unit 145 of the gyro apparatus according to the present invention. As shown in FIG. 12, the control computing unit 140 according to this embodiment includes a displacement computing unit 141 for computing the linear displacements ΔX, ΔY, ΔZ and the rotational displacements Δθ, Δφ from the output voltages $P_{1A}$, $P_{1B}$, $P_{2A}$, $P_{2B}$, $P_{3A}$, $P_{3B}$, $P_{4A}$, $P_{4B}$ of the mechanism control circuits 121 through 124, and 131 through 134, a PID (proportional, integral, and differential) computing unit 142 for computing linear accelerations fx, fy, fz and rotational moments fθ, fφ, a control voltage computing unit 143 for computing control DC voltage changed amounts $\Delta V_{1A}$, $\Delta V_{1B}$, $\Delta V_{2A}$, $\Delta V_{2B}$, $\Delta V_{3A}$, $\Delta V_{3B}$, $\Delta V_{4A}$, $\Delta V_{4B}$, and a control voltage generator 144 for generating control DC voltages $V_{1A}$, $V_{1B}$, $V_{2A}$, $V_{2B}$, $V_{3A}$, $V_{3B}$, $V_{4A}$, $V_{4B}$.

The gyro apparatus includes the gyro/acceleration output computing unit 145, and the gyro/acceleration output computing unit 145 calculates gyro outputs dθ/dt, dφ/dt and accelerations $\alpha_x$, $\alpha_y$, $\alpha_z$ based on the accelerations fx, fy, fz and the rotational moments fθ, fφ supplied thereto from the PID computing unit 142.

Figure 13:
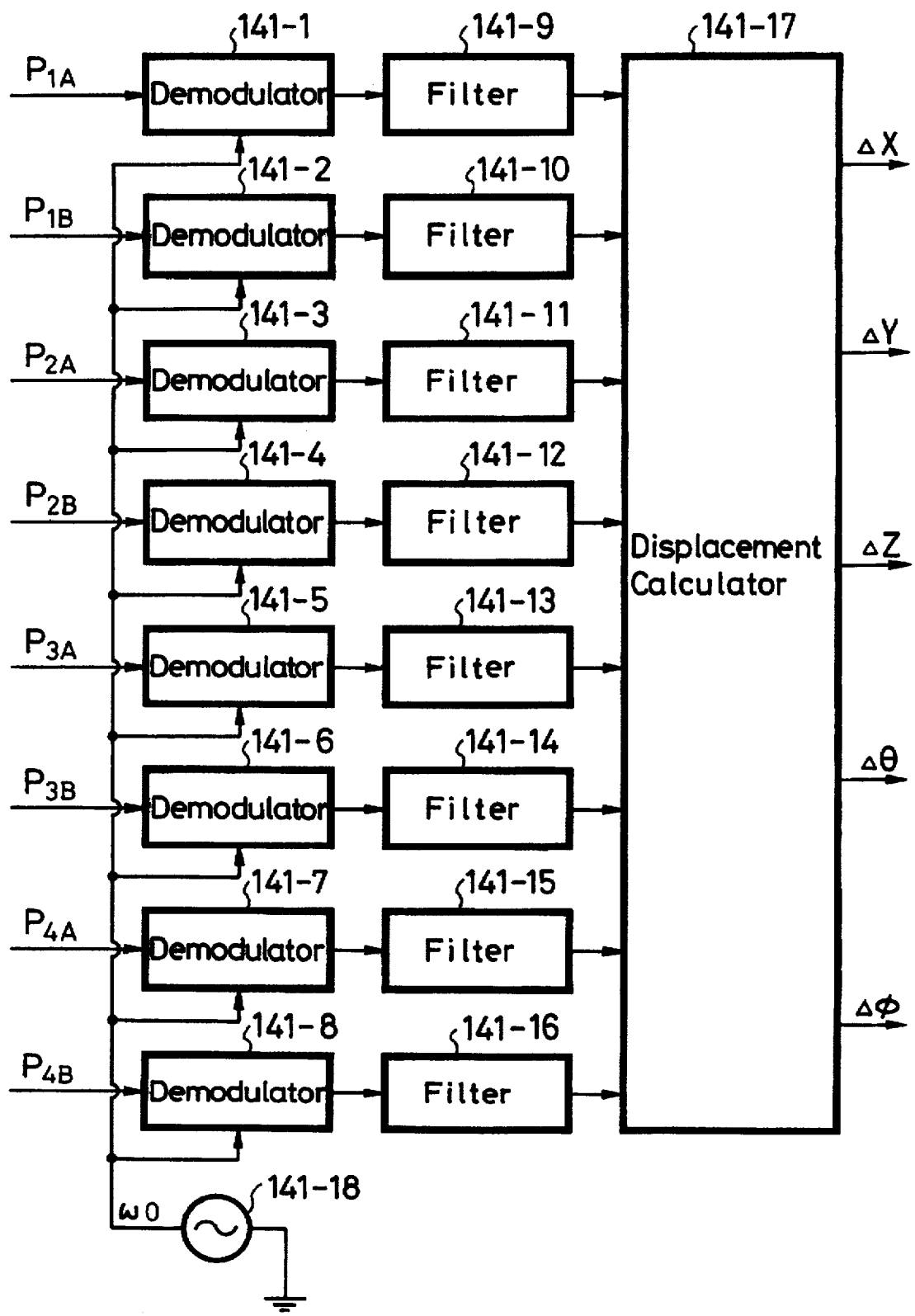
FIG. 13 is a block diagram showing a displacement computing unit of the gyro apparatus according to the present invention.

Arrangement and operation of the displacement computing unit 141 according to this embodiment will be described below with reference to FIG. 13. As shown in FIG. 13, the displacement computing unit 141 according to this embodiment includes first to eighth demodulators 141-1 through 141-8 for demodulating the voltage signals $P_{1A}$, $P_{1B}$, $P_{2A}$, $P_{2B}$, $P_{3A}$, $P_{3B}$, $P_{4A}$, $P_{4B}$ by a reference signal with a frequency $\omega_0$, filters 141-9 through 141-16 for reducing ripple from the demodulators 141-1 through 141-8 to provide DC waveforms, displacement calculator 141-17, and a signal generator 141-18 for generating the reference signal with the frequency $\omega_0$.

The displacement calculator 141-17 calculates the linear displacements ΔX, ΔY, ΔZ and the rotational displacements Δθ, Δφ based on the aforesaid equation (17), and the displacement signals are supplied to the PID computing unit 142, and the control voltage computing unit 143.

Arrangement and operation of the PID computing unit 142 according to this embodiment will be described with reference to FIG. 14. As shown in FIG. 14, the PID computing unit 142 according to this embodiment includes five PID calculators 142-1, 142-2, 142-3, 142-4, 142-5, and each of the PID calculators 142-1, 142-2, 142-3, 142-4, 142-5 calculates the linear accelerations fx, fy, fz and the rotational moments fθ, fφ based on the linear displacements ΔX, ΔY, ΔZ and the rotational displacements Δθ, Δφ supplied thereto.

FIG. 14 shows the first PID calculator 142-1. As shown in FIG. 14, the first PID calculator 142-1 comprises a differential unit 142-1A for differentiating the linear displacement ΔX, a proportional unit 142-1B for proportioning the linear displacement ΔX, an integral unit 142-1C for integrating the linear displacement ΔX, and an adding unit 142-1D for adding these calculated results. An output signal from the adding unit 142-1D is the output signal of the PID calculator 142-1. In FIG. 14, reference letter S denotes a Laplacian operator, $K_p$ denotes a proportional constant, $T_D$ denotes a differential time constant, and $T_I$ denotes an integral time constant.

Other three PID calculators included in the PID computing unit 142 according to this embodiment, i.e., second, third, and fourth PID calculators 142-1 might be similar in arrangement to the first PID calculator 142-1 shown in FIG. 14.

The output signals fx, fy, fz, fθ, fφ of the PID computing unit 142 are supplied to the control voltage computing unit 143 and the gyro/acceleration output computing unit 145. Incidentally, the gyro/acceleration output computing unit 145 might be supplied with the output signals from the integrators 142-1C through 142-5C but not the output signals fx, fy, fz, fθ, fφ of the adding units 142-1D through 142-5D.

Arrangement and operation of the control voltage computing unit 143 according to this embodiment will be described with reference to FIGS. 15A, 15B and FIG. 16. The control voltage computing unit 143 according to this embodiment calculates the control DC voltage changed amounts $\Delta V_1$ through $\Delta V_8$ from the output signals fx, fy, fz, fθ, fφ from the PID computing unit 142. According to this embodiment, the forces fx, fy, fz and the torques fθ, fφ that should be applied to the gyro rotor 20 through the control voltage computing unit 143 and the control voltage generator 144 are calculated in such a manner that the displacement of the gyro rotor 20 is canceled. Finally, the change amounts $\Delta V_{1A}$ through $\Delta V_{4B}$ of the control DC voltages $V_{1A}$ through $V_{4B}$ are calculated from the forces fx, fy, fz and the torques fθ, fφ.

Referring to FIGS. 15A, 15B, a manner in which the input signal to the control voltage computing unit 143 is made dimensionless will be described. As shown in FIG. 15A, the circumference portion 221A of the electrostatic supporting electrode of the gyro case 21 and the corresponding electrode portion 200A of the gyro rotor 20 is assumed to be a schematic capacitor. The circumference portion 221A of the electrostatic supporting electrode is designed to have a radius of curvature which is larger or smaller than the radius of the corresponding electrode portion 200A by a distance $\delta_2$ (e.g., $\delta_2 = r_1 - r_2 = L/2 = p/4$ where $r_1$ is a radius of curvature of electrode portions, $r_2$ is a radius of the corresponding electrode of the gyro rotor), and an overlapping portion becomes a capacitor.

Such capacitor is disposed at the position of radius r, the radial width is L, a width of the circumferential direction is B, and a spacing is δ. The linear displacements $\Delta X$, $\Delta Y$, $\Delta Z$ and the rotational displacements $\Delta \theta$, $\Delta \phi$ are made dimensionless by the following equation (18):

$$\Delta X_N = \Delta X/L$$

$$\Delta Y_n = \Delta Y/L$$

$$\Delta Z_N = \Delta Z/\delta$$

$$\Delta \theta_N = \Delta \theta/(\delta/r)$$

$$\Delta \phi_N = \Delta \phi/(\delta/r) \tag{18}$$

where N is the dimensionless amount. Then, a manner in which the linear accelerations fx, fy, fz and the rotational moments fθ, fφ are made dimensionless will be described with reference to FIG. 15B. The linear accelerations fx, fy, fz are made dimensionless by the following equation (19):

$$Fx = fx(C_0 V_0^2/L)^{-1}$$

$$Fy = fy(C_0 V_0^2/L)^{-1}$$

$$Fz = fz(C_0 V_0^2/\delta)^{-1}$$

$$T\theta = f\theta(rC_0 V_0^2/\delta)^{-1}$$

$$T\phi = f\phi(rC_0 V_0^2/\delta)^{-1} \tag{19}$$

$C_0$ represents the electrostatic capacity obtained when the displacement of the gyro rotor 20 is null, and expressed as $C_0 = \epsilon BL/\delta$ by use of dielectric constant ε. $V_0$ is the control DC voltage obtained when the displacement of the gyro rotor 20 is null, r is the radius, and δ is the clearance between the electrodes. Then, the control DC voltage changed amounts $\Delta V_{1A}$ through $\Delta V_{4B}$ are calculated from the dimensionless forces Fx, Fy, Fz, torques Tθ, Tφ and the dimensionless linear displacements $\Delta X_N$, $\Delta Y_N$, $\Delta Z_N$ and rotational displacements $\Delta \theta_N$, $\Delta \phi_N$.

Having considered the changed amounts $\Delta V_{1A}$, $\Delta V_{1B}$ and $\Delta V_{3A}$, $\Delta V_{3B}$ of the control DC voltages $\pm V_{1A}$, $\pm V_{1B}$, and $\pm V_{3A}$, $\pm V_{3B}$ applied to the first and third electrostatic electrodes 221, 223, each of the four changed amounts $\Delta V_{1A}$, $\Delta V_{1B}$, and $\Delta V_{3A}$, $\Delta V_{3B}$ can be expressed by the dimensionless forces Fx, Fz and torque Tθ. Similarly, having considered the changed amounts $\Delta V_{2A}$, $\Delta V_{2B}$, and $\Delta V_{4A}$, $\Delta V_{4B}$ of the control DC voltages $\pm V_{3A}$, $\pm V_{3B}$ and $\pm V_{4A}$, $\pm V_{4B}$ applied to the second and fourth electrostatic electrodes 222, 224, each of the four changed amounts $\Delta V_{2A}$, $\Delta V_{2B}$, and $\Delta V_{4A}$, $\Delta V_{4B}$ can be expressed by the dimensionless forces Fy, Fz and torque Tφ.

There is provided one more condition so that the four changed amounts $\Delta V_{1A}$, $\Delta V_{1B}$, and $\Delta V_{3A}$, $\Delta V_{3B}$, and $\Delta V_{2A}$, $\Delta V_{2B}$, and $\Delta V_{4A}$, $\Delta V_{4B}$ can be given. This condition is given by the following equation (21):

$$\Delta V_{1A} + \Delta V_{1B} + \Delta V_{3A} + \Delta V_{3B} = 0$$

$$\Delta V_{2A} + \Delta V_{2B} + \Delta V_{4A} + \Delta V_{4B} = 0 \tag{20}$$

The first equation of the equation (20) expresses that the sum of the changed amounts of the control DC voltages at the portion along the XZ plane of the gyro rotor, i.e., the first and third portions $P_1$, $P_3$ is null. Also, the second equation of the equation (20) expresses that the sum of the changed amounts of the control DC voltages at the portion along the YZ plane of the gyro rotor 20, i.e., the second and fourth portions $P_2$, $P_4$ is null. If the above condition is set, then it is possible to prevent undesirable electric charges from being flowed into the gyro rotor 20. At the same time, the values of the changed amounts $\Delta V_{1A}$ through $\Delta V_{4B}$ of eight control DC voltages can be determined uniquely.

According to this embodiment, the control DC voltage changed amounts $\Delta V_{1A}$ through $\Delta V_{4B}$ can be calculated based on the dimensionless forces Fx, Fy, Fz, torques Tθ, Tφ, and the dimensionless linear displacements $\Delta X_N$, $\Delta Y_N$, $\Delta Z_N$ and rotational displacements $\Delta \theta_N$, $\Delta \phi_N$.

FIG. 16 shows an example of such computing equation. The computing equation is expressed in the form of matrix, and is generally referred to as an "ACM" (actuator compensating matrix). The ACM is given by the equation (21) below:

$$\Delta V_{1A} = V_0(A_{11} \cdot Fx + A_{12} \cdot Fz/2 + A_{13} \cdot T\theta)$$

$$\Delta V_{1B} = V_0(A_{21} \cdot Fx + A_{22} \cdot Fz/2 + A_{23} \cdot T\theta)$$

$$\Delta V_{3A} = V_0(A_{31} \cdot Fx + A_{32} \cdot Fz/2 + A_{33} \cdot T\theta)$$

$$\Delta V_{3B} = V_0(A_{41} \cdot Fx + A_{42} \cdot Fz/2 + A_{43} \cdot T\theta)$$

$$\Delta V_{2A} = V_0(B_{11} \cdot Fy + B_{12} \cdot Fz/2 + B_{13} \cdot T\phi)$$

$$\Delta V_{2B} = V_0(B_{21} \cdot Fy + B_{22} \cdot Fz/2 + B_{23} \cdot T\phi)$$

$$\Delta V_{4A} = V_0(B_{31} \cdot Fy + B_{32} \cdot Fz/2 + B_{33} \cdot T\phi)$$

$$\Delta V_{4B} = V_0(B_{41} \cdot Fy + B_{42} \cdot Fz/2 - B_{43} \cdot T\phi) \tag{21}$$

Coefficients of the dimensionless forces Fx, Fy, Fz and torques Tθ, Tφ on the right-hand side of the equation (21) are elements of this actuator compensating matrix.

$$A_{11} = (\frac{1}{4})(1 - 2\Delta Z_N - 2\Delta \theta_N)$$

$$A_{12} = (\frac{1}{4})(1 - \Delta X_N - \Delta \theta_N)$$

$A_{13}=(¼)(1-\Delta X_N-\Delta Z_N)$ $A_{21}=(¼)(1+2\Delta Z_N+2\Delta\theta_N)$ $A_{22}=(¼)(1-\Delta X_N+\Delta\theta_N)$ $A_{23}=(-¼)(1-\Delta X_N+\Delta Z_N)$ $A_{31}=(-¼)(1-2\Delta Z_N+2\Delta\theta_N)$ $A_{32}=(¼)(1+\Delta X_N+\Delta\theta_N)$ $A_{33}=(-¼)(1+\Delta X_N-\Delta Z_N)$ $A_{41}=(-¼)(1+2\Delta Z_N-2\Delta\theta_N)$ $A_{42}=(-¼)(1+\Delta X_N-\Delta\theta_N)$ $A_{43}=(¼)(1+\Delta X_N+\Delta Z_N)$ \hfill (22)

$B_{11}=(¼)(1-2\Delta Z_N-2\Delta\phi_N)$ $B_{12}=(¼)(1-\Delta Y_N-\Delta\phi_N)$ $B_{13}=(¼)(1-\Delta Y_N-\Delta Z_N)$ $B_{21}=(¼)(1+2\Delta Z_N+2\Delta\phi_N)$ $B_{22}=(-¼)(1-\Delta X_N+\Delta\theta_N)$ $B_{23}=(-¼)(1-\Delta Y_N+\Delta Z_N)$ $B_{31}=(-¼)(1-2\Delta Z_N+2\Delta\phi_N)$ $B_{32}=(¼)(1+\Delta Y_N+\Delta\phi_N)$ $B_{33}=(-¼)(1+\Delta Y_N-\Delta Z_N)$ $B_{41}=(-¼)(1+2\Delta Z_N-2\Delta\phi_N)$ $B_{42}=(-¼)(1+\Delta Y_N-\Delta\phi_N)$ $B_{43}=(¼)(1+\Delta Y_N+\Delta Z_N)$ \hfill (23)

The control voltage generator 144 generates the control DC voltages $V_{1A}$, $V_{1B}$, $V_{2A}$, $V_{2B}$, $V_{3A}$, $V_{3B}$, $V_{4A}$, $V_{4B}$ which are supplied to the four pairs of electrostatic supporting electrodes 221, 231, 222, 232, 223, 233, 224, 234. These control DC voltages are expressed by the following equation (24):

$V_{1A}=V_0+\Delta V_{1A}$ $V_{1B}=V_0+\Delta V_{1B}$ $V_{2A}=V_0+\Delta V_{2A}$ $V_{2B}=V_0+\Delta V_{2B}$ $V_{3A}=V_0+\Delta V_{3A}$ $V_{3B}=V_0+\Delta V_{3B}$ $V_{4A}=V_0+\Delta V_{4A}$ $V_{4B}=V_0+\Delta V_{4B}$ \hfill (24)

where $V_0$ denotes the reference voltage, $V_{1A}$ and $V_{1B}$ denote the control DC voltages applied to the first pair of electrostatic supporting electrodes 221, 231, $V_{2A}$, $V_{2B}$ the control DC voltages applied to the second pair of electrostatic supporting electrodes 222, 232, $V_{3A}$, $V_{2B}$ denote the control DC voltages applied to the third pair of electrostatic supporting electrodes 223, 233, and $V_{4A}$, $V_{4B}$ denote the control DC voltages applied to the fourth pair of electrostatic supporting electrodes 224, 234.

Then, forces acting on the gyro rotor 20 are computed. The equations (1) through (9) and explanations therefor are also applicable to the present invention. Electrostatic forces acting on the four portions $P_1$, $P_2$, $P_3$, $P_4$ of the gyro rotor 20 are proportional to difference among the control DC voltages $V_{1A}$, $V_{1B}$, $V_{2A}$, $V_{2B}$, $V_{3A}$, $V_{3B}$, $V_{4A}$, $V_{4B}$ applied to the corresponding four pairs of electrostatic supporting electrodes 221, 231, 222, 232, 223, 233, 224, 234.

$Fz1=K_z(V_{1A}-V_{1B})$ $Fz2=K_z(V_{2A}-V_{2B})$ $Fz3=K_z(V_{3A}-V_{3B})$ $Fz4=K_z(V_{4A}-V_{4B})$ \hfill (25)

where $K_z$ is the constant determined by the shapes of the electrostatic supporting electrodes of the gyro case and the electrode portions of the gyro rotor 20. A resultant force of the electrostatic forces acting on the gyro rotor 20 is a sum of electrostatic forces acting on the four portions $P_1$, $P_2$, $P_3$, $P_4$.

$\hat{F}z=K_z(V_{1A}-V_{1B}+V_{2A}-V_{2B}+V_{3A}-V_{3B}+V_{4A}-V_{4B})$

As described above, since the electrostatic supporting electrodes of the gyro case 21 are radially outwardly or inwardly displaced from the electrode portions of the gyro rotor 20, the gyro rotor 2 is applied with forces of X axis direction and Y axis direction. X-axis direction force acting on the first and third portions $P_1$ and P3 of the gyro rotor 20 are expressed as follows:

$Fx1=K_X(V_{1A}+V_{1B})$ $Fx2=K_X(V_{3A}+V_{3B})$ \hfill (27)

The force of the X axis direction acting on the gyro rotor 20 is equal to a difference between forces acting on the first and third portions $P_1$ and $P_3$.

$\hat{F}x=Fx1-Fx2=K_X(V_{1A}+V_{1B}-V_{3A}-V_{3B})$tm (28)

Similarly, the force of the Y axis direction acting on the gyro rotor 20 is a difference of forces acting on the second and fourth portions $P_2$ and $P_4$.

$\hat{F}y=Fy1-Fy2=K_X(V_{2A}+V_{2B}-V_{4A}-V_{4B})$ \hfill (29)

The above argument is concerned with the case that the electrostatic forces Fz1, Fz3 of the same direction act on the first and third portions $P_1$, $P_3$ of the gyro rotor 20 and the case that the electrostatic forces Fz2, Fz4 of the same direction act on the second and fourth portions $P_2$, $P_4$ of the gyro rotor 20. When the electrostatic forces Fz1, Fz3 of the opposite directions act on the first and third portions $P_1$, $P_3$ of the gyro rotor 20, there is generated the torque $\hat{T}\theta$ which rotates the gyro rotor 20 around the Y axis. Similarly, when the electrostatic forces Fz2, Fz4 of the opposite directions act on the second and fourth portions $P_2$, $P_4$ of the gyro rotor 20, there is generated the torque $\hat{T}\phi$ which rotates the gyro rotor 20 around the X axis. Such torques $\hat{T}\theta$, $\hat{T}\phi$ are expressed by the following equation (30):

$\hat{T}\theta=(Fz3-Fz1)r$ $\hat{T}\phi=(Fz4-Fz2)r$ \hfill (30)

Figure 17:
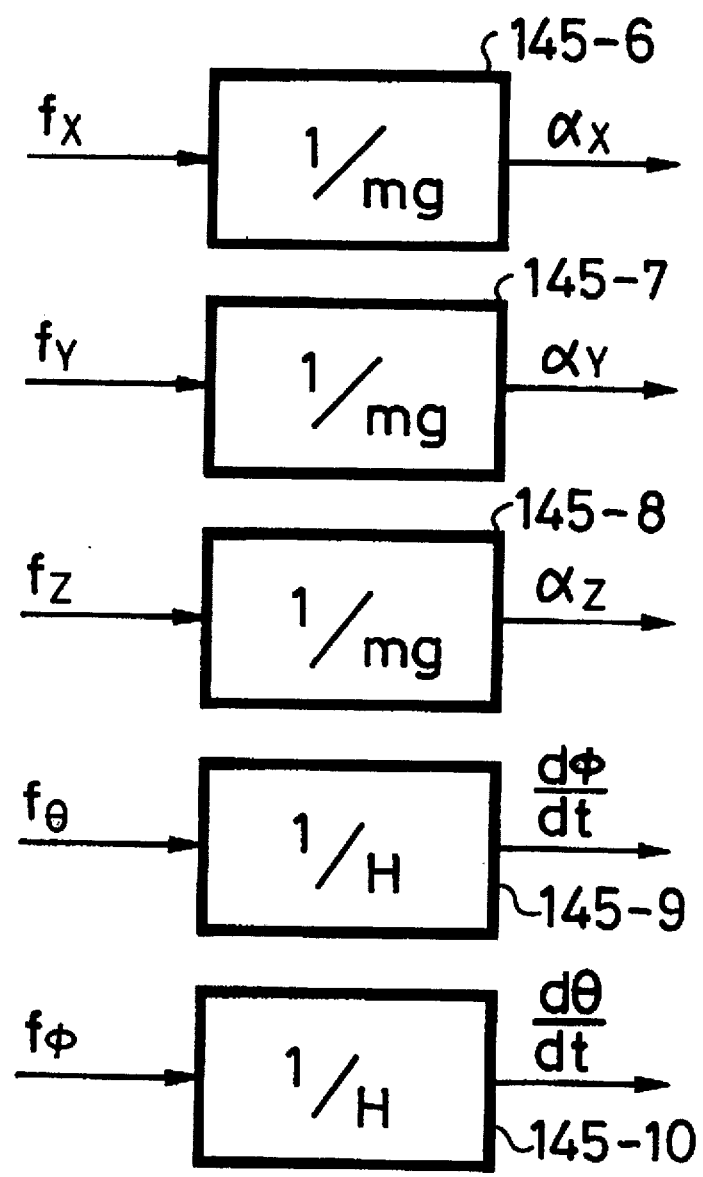
FIG. 17 is a block diagram used to explain operation of a gyro/acceleration output computing unit of the gyro apparatus according to the present invention.

Arrangement and operation of the gyro/acceleration output computing unit 145 according to the present invention will be described with reference to FIG. 17. The gyro/acceleration output computing unit 145 according to the present invention performs the calculations of the external accelerations and the angular velocities by the following equation (31):

$$\alpha_x = f x/mg$$

$$\alpha_y = f y/mg$$

$$\alpha_z = f z/mg$$

$$d\theta/dt = f\phi/H$$

$$d\phi/dt = f\theta/H \qquad (31)$$

where m is the mass of gyro rotor 20, g is the gravitational acceleration, and H is the spin angular momentum. Such computings are effected by the multipliers 145-1 through 145-10.

When the external angular velocity dθ/dt around the Y axis acts on the gyro apparatus, the gyro case 21 is rotationally displaced around the Y axis. The gyro rotor 20 is torqued around the X axis by the torque Tφ. The gyro rotor 20 is rotationally displaced around the Y axis due to precession, and the Y axis rotational displacement relative to the gyro case 21 is canceled out. When the X axis external angular acceleration dφ/dt acts on the gyro apparatus, the gyro rotor 20 is torqued around the Y axis by the torque Tθ. The gyro rotor 20 is rotated around the X axis due to precession, and the X axis rotational displacement of the gyro rotor 20 relative to the gyro case 21 is canceled out.

A method of fabricating the gyro rotor 20 of the gyro apparatus according to the present invention will be described with reference to FIGS. 18A, 18B. Initially, there is prepared a thin plate-like or disk-like member made of a conductive material. As shown in FIG. 18A, a circular concave portion with a depth δ is formed on the upper and lower surfaces of the above thin disk-like member. Grooves 200a, 200b, 200c, 200d, 200e, 200f, 200a', 200b', 200c', 200d', 200e', 200f' are formed on such circular concave portions, thereby the electrode portions being formed. Annular grooves 200g, 200g' for cutting are formed outside the grooves 200a and 200a' at the same time.

As earlier noted with reference to FIGS. 8A, 8B, there are formed the concave portion 23B for housing the getter 33 and the passage 23C for connecting the concave portion 23B and the clearance portion 26.

The depth δ of the circular concave portion initially formed corresponds to the clearance δ produced between the electrode portions of the gyro rotor 20 and the electrostatic supporting electrodes of the gyro case 21. Such depth may be several micrometers, i.e., δ=2 to 5 μm, for example. A depth of the grooves 200a, 200b, 200c, 200d, 200e, 200f, 200a', 200b', 200c', 200d', 200e', 200f' may be selected properly.

Then, the annular grooves 200g, 200g' for cutting are cut out further until the central disk-like portion is separated. The thus separated disk-like portion serves as the gyro rotor 20, and the remaining outside portion serves as the spacer 23.

According to this embodiment, the gyro rotor 20 and the spacer 23 can be fabricated by the same material simultaneously. The gyro rotor 20 and the spacer 23 may be made by lithography, such as etching.

A method of fabricating the upper bottom member 22 and the lower bottom member 24 of the gyro case will be described. Initially, there is prepared a plate-like or disk-like member made of an insulating material, e.g., glass. Electrostatic supporting electrodes are formed on the inner surface of the plate-like or disk-like member. The electrostatic supporting electrodes may be fabricated by forming a metal thin film by a proper thin film forming technique. The thin film forming technique might be vacuum deposition, ion plating, photo-fabrication or the like. Through-holes are formed through the plate-like or disk-like member, and a similar metal thin film is formed on the inner surface of the through-hole, whereby through-hole interconnections are formed between the electrostatic supporting electrodes and the external power supply or the circuit. After the through-hole interconnections have been formed, the through-holes are closed.

The gyro rotor 20 and the spacer 23 are inserted between the thus fabricated upper bottom member 22 and lower bottom member 23 in a sandwich fashion. The getter 33 is disposed in the concave portion 23B, and the upper bottom member 22, the lower bottom member 24 and the spacer 24 are bonded by a proper bonding method, preferably, by anodic bonding. Such bonding may be effected in a vacuum atmosphere.

According to the present invention, the displacement detection AC voltage is supplied to the electrostatic supporting electrodes in the state that it is superimposed upon the control DC voltage. There is then the advantage that all displacements of the gyro rotor 20, i.e., XYZ-axis linear displacements, and Y axis and X axis rotational displacements of the gyro rotor 20 can be detected from the output voltage of the displacement detection circuit.

According to the present invention, since the gyro apparatus of the present invention does not use the optical displacement detecting apparatus including the light-emitting device and the light-receiving device unlike the conventional electrostatic gyro, the gyro apparatus according to the present invention can be miniaturized.

Since the gyro apparatus according to the present invention includes the feedback loop for feeding the displacement detected from the gyro rotor 20 by the displacement detection system back to the control DC voltage, there is then the advantage that the displacement of the gyro rotor 20 can be canceled by controlling the position of the gyro rotor 20 by an active slaving control system.

According to the gyro apparatus of the present invention, since the position of the gyro rotor 20 is controlled by the active-type control system having the feedback loop, the gyro apparatus according to the present invention does not use the coil and the transformer unlike the passive type electrostatic gyro, and hence the gyro apparatus can be miniaturized.

According to the present invention, since the feedback loop for feeding the displacement detected from the gyro rotor 20 by the displacement detecting system back to the control DC voltage includes the actuator compensating matrix (ACM), the position of the gyro rotor 20 can be controlled accurately and easily.

According to the present invention, since the gyro rotor 20 and the spacer 23 can be simultaneously fabricated from a single conductive thin plate material by lithography, it is possible to obtain an inexpensive highly-precise gyro apparatus.

According to the present invention, since the gyro rotor 20 and the spacer 23 can be made of a monocrystalline metal such as silicon, it is possible to provide a highly-precise gyro apparatus which is difficult to be affected by a change of temperature and aging change.

According to the present invention, since the spacer 23, the upper bottom member 21 and the lower bottom member 24 are bonded by anodic bonding, there is then the advantage that the gyro case 21 can be fabricated under the condition that the gyro rotor 20 is sealed into the gyro case 21 in the vacuum.

According to the present invention, since the gyro apparatus is fabricated by forming the metal thin film electrodes by a thin film forming technique of the four pairs of electrostatic supporting electrodes disposed on the inner surfaces of the upper bottom member 21 and the lower bottom member 24, these electrode portions can be of the same shape, and easily formed on the upper bottom member 21 and the lower bottom member 24.

According to the present invention, since each of the four pairs of the electrostatic supporting electrodes includes a pair of comb-shaped portions and the circumferential portions of such a pair of comb-shaped portions are alternately disposed, there is then the advantage that desirable and controllable electrostatic forces by applying the DC control voltage from the mechanism control circuit to the electrostatic supporting electrodes can be possibly obtained between the electrostatic supporting electrodes of the gyro case and the electrode portions of the gyro rotor without physically grounding the electrical potential of the gyro rotor such as mechanical contact by wire or the like.

Further, according to the present invention, since each of the four pairs of the electrostatic supporting electrodes formed on the inner surfaces of the upper bottom member 21 and the lower bottom member 24 includes a pair of comb-shaped portions and such comb-shaped portions are alternately disposed, there is then the advantage that the changing ratio of electrical energy ($E=CV^2$) accumulated between the electrode portions of the gyro rotor 20 and the electrostatic supporting electrodes of the gyro case 21 can be increased.

Furthermore, according to the present invention, since the control DC voltages $\pm V_{1A}$ through $\pm V_{4B}$ with the same absolute value but with the opposite polarities are applied to each pair of the electrostatic supporting electrodes, there is then the advantage that the potential of the gyro rotor 20 can constantly be held at zero.

Figure 19A:
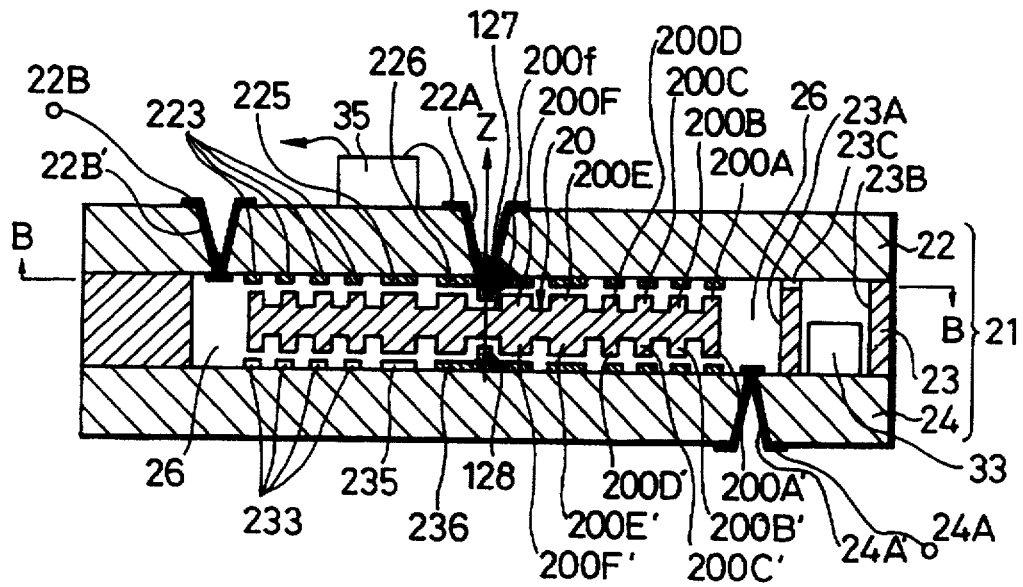
FIG. 19A is a cross-sectional side view illustrating a gyro apparatus according to another embodiment of the present invention.
Figure 19B:
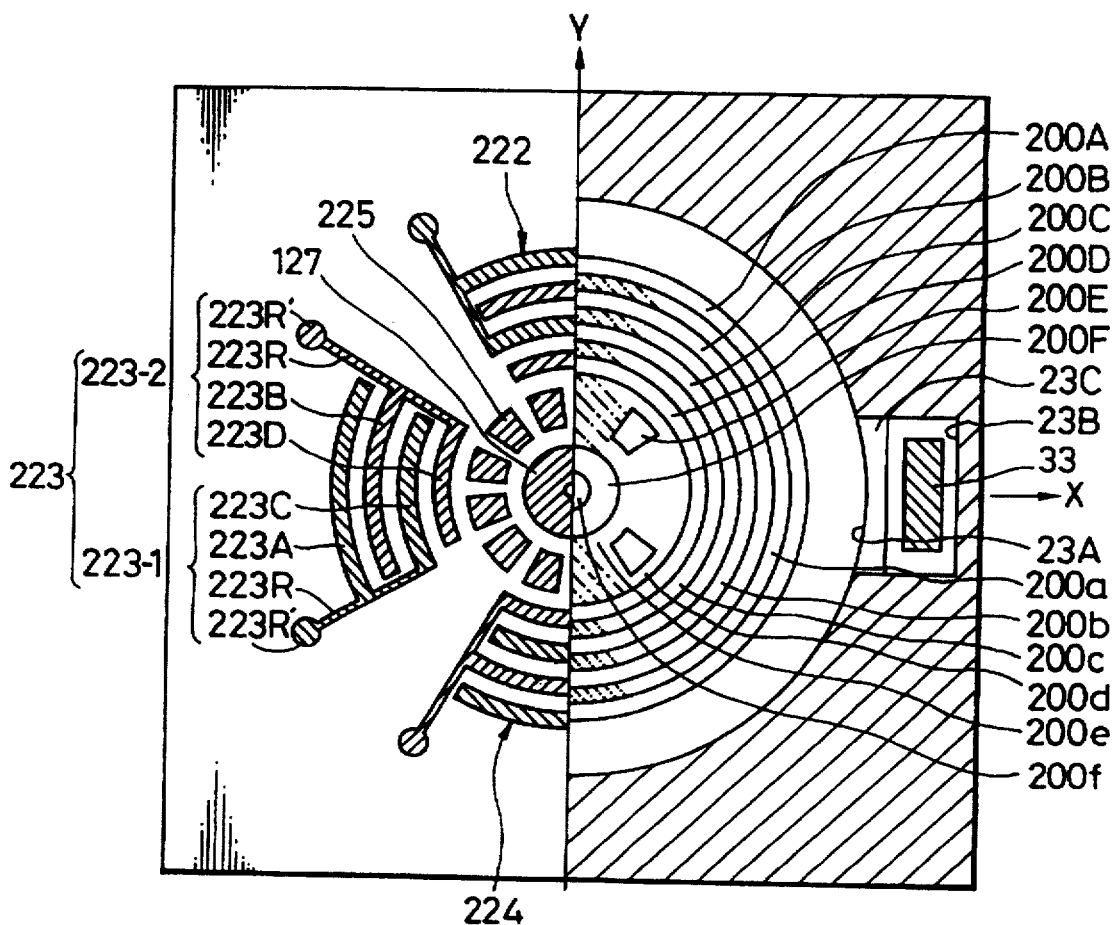
FIG. 19B is a cross-sectional plan view taken along the line B—B in FIG. 19A.

Referring to FIGS. 19A, 19B, a gyro apparatus according to another embodiment of the present invention will be described. In FIGS. 19A and 19B, elements and parts identical to those of FIGS. 8A, 8B are marked with the same references, and therefore need not be described in detail.

According to the second embodiment, as shown in FIGS. 19A, 19B, on the upper and lower surfaces of the gyro rotor 20, the displacement detection electrode portions 200F, 200F' are formed on the insides of the drive electrode portions 200E, 200E', and the concave portions 200f, 200f' are formed at the central portions of the displacement detection electrodes 200F, 200F'.

On the inner surfaces of the upper bottom member 22 and the lower bottom member 24 of the gyro case 21, displacement detection electrodes 226, 236 are formed on the insides of the drive electrodes 225, 235, respectively.

The drive electrodes 225, 235 and the displacement detection electrodes 226, 236 corresponding to the drive electrode portions 200E, 200E' of the gyro rotor 20 may be the same in shape, and disposed at the same position of the radial direction.

The dischargeable stoppers 127, 128 are respectively formed on the inner surfaces of the upper bottom member 22 and the lower bottom member 24 of the gyro case 21, i.e., the central portions of the displacement detection electrodes 226, 236. The stoppers 127, 128 are disposed in opposing relation to the concave portions 200f, 200f' formed at the central portions of the upper and lower surfaces of the gyro rotor 20.

As shown in FIG. 19A, a preamplifier 35, e.g., FET (field-effect transistor), is disposed on the outer surface of the upper bottom member 22, and the amplifier 35 is connected to the displacement detection electrodes 226, 236.

The through-holes 22A (only through-hole 22A defined on the upper bottom member 22 is shown) are defined on the upper bottom member 22 and the lower bottom member 24, and the preamplifier 35 is connected to the displacement detection electrodes 226, 236 by the metal thin films formed on the inner surfaces of the through-holes 22A.

Each pair of comb-shaped portions are electrically connected as will be described later on with reference to FIG. 21. Accordingly, through-holes 22B (only one through-hole 22B is shown) are defined in correspondence of terminal portions 223R', 223R' of comb-shaped portions 223-1, 223-2 of the first electrostatic supporting electrodes 223 of the third pair, and the metal thin films formed on the inner surfaces of the through-holes 22B are connected to the common terminal provided on the outside of the upper bottom member 22, whereby the terminal portions 223R', 223R' of the two comb-shaped portions 223-1, 223-2 are connected electrically. Similarly, through-holes 24A (only one through-hole 24A is shown) are defined in correspondence with terminal portions 231R', 231R' of comb-shaped portions 231-1, 231-2 of the second electrostatic supporting electrode 231 of the first pair, and metal thin films formed on the inner surfaces of the through-holes 24A are connected to a common terminal provided outside the lower bottom member 24, whereby the terminal portions 231R', 231R' of the two comb-shaped portions 231-1, 231-2 are connected electrically.

Figure 20:
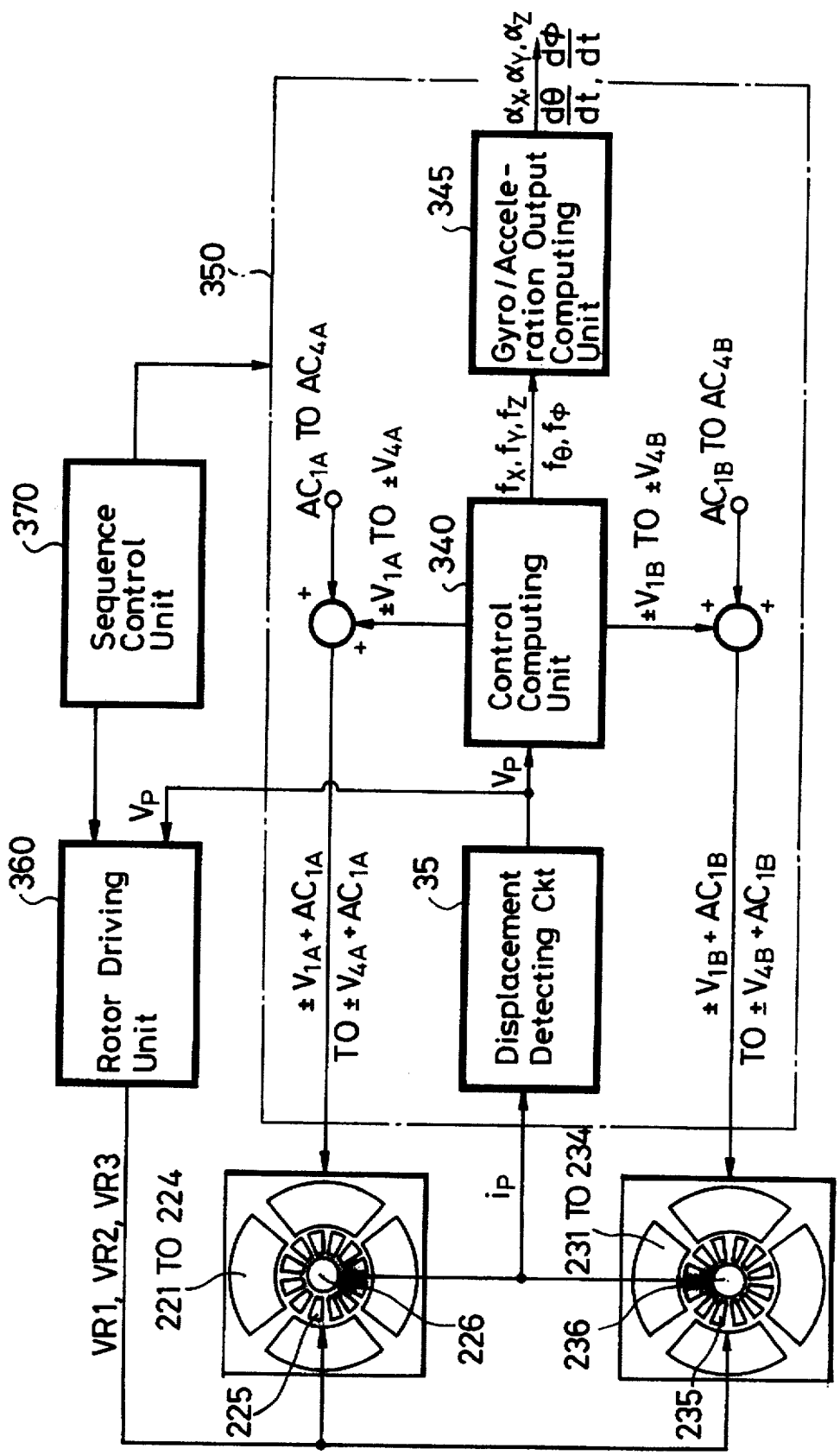
FIG. 20 is a block diagram used to explain a control loop of the gyro apparatus according to the second embodiment of the present invention.

FIG. 20 shows, in block form, a control loop of the gyro apparatus according to the second embodiment of the present invention. As shown in FIG. 20, the control loop according to this embodiment comprises a slaving control system including a slaving control unit 350, a rotor driving system including a rotor driving unit 360, and a sequence control unit 370.

The slaving control unit 350 according to this embodiment includes a displacement detection circuit for detecting a displacement detection current $i_p$ and converting the detected displacement detection current $i_p$ into a displacement detection voltage $V_p$, i.e., the preamplifier 35 and a control computing unit 340 for generating control DC voltages $\pm V_{1A}$ through $\pm V_{1B}$, and $\pm V_{1B}$ through $\pm V_{4B}$ from the displacement detection voltage $V_p$ supplied thereto. The control DC voltages $\pm V_{1A}$ through $\pm V_{1B}$, and $\pm V_{1B}$ through $\pm V_{4B}$ outputted from the control computing unit 340 are added with displacement detection AC voltages $AC_{1A}$ through $AC_{4A}$, and $AC_{1B}$ through $AC_{4B}$, and supplied to the electrostatic supporting electrodes 221 through 224, and 231 through 234. The gyro apparatus according to the second embodiment includes a gyro/acceleration output computing unit 345 for receiving the output signal of the control computing unit 340, and the gyro/acceleration output computing unit 345 will be described in detail later on.

The gyro rotor 20 is floated, supported, and slaved at a predetermined position on application of the control DC voltages $\pm V_{1A}$ through $\pm V_{4A}$, and $\pm V_{1B}$ through $\pm V_{4B}$ to the electrostatic supporting electrodes 221 through 224, and 231 through 234. The displacement detection current $i_p$ is flowed to the displacement detection electrodes 226, 236 formed on the inner surfaces of the gyro case 21 on application of displacement detection AC voltages $AC_{1A}$ through $AC_{4A}$, and $AC_{1B}$ through $AC_{4B}$ to the electrostatic supporting electrodes 221 through 224, and 231 through 234. The displacement detection current $i_p$ is converted into a voltage signal $V_p$ by the preamplifier 35, and the voltage signal $V_p$ includes all linear displacements and rotational displacements of the gyro rotor 20.

The voltage signal $V_p$ is supplied to the control computing unit 340, and the control computing unit 340 detects Z-axis direction displacements ±Δz, X-axis direction displacements ±Δx, Y-axis direction displacements ±Δy and X-axis and Y-axis rotational displacements Δφ, Δθ (upper right-hand arrow in FIG. 21 indicates a positive direction) of the gyro rotor 20. Further, the control DC voltages $\pm V_{1A}$ through $\pm V_{4A}$, and $\pm V_{1B}$ through $\pm V_{4B}$ that should be applied to the electrostatic supporting electrodes 221 through 224, and 231 through 234 are calculated from the above-mentioned displacements. In this manner, the control DC voltages $\pm V_{1A}$ through $\pm V_{4A}$ and $\pm V_{1B}$ through $\pm V_{4B}$ are changed, and the gyro rotor 20 is returned to the original position such that the displacement amount is canceled.

The control loop or slaving system according to this embodiment measures the displacement amount of the gyro rotor 20 in actual practice, and aggressively changes the electrostatic force such that the displacement amount become null. Therefore, the control loop or slaving system according to this embodiment is formed as the active type unlike the conventional passive-type slaving system.

Operation of the slaving control system according to the present invention will be described in detail with reference to FIG. 21. The gyro rotor 20 is rotated at high speed, and $P_1$, $P_2$, $P_3$, $P_4$ assumes the four portions of the gyro rotor 20 corresponding to the first, second, third, and fourth pairs of electrostatic supporting electrodes.

Figure 21:
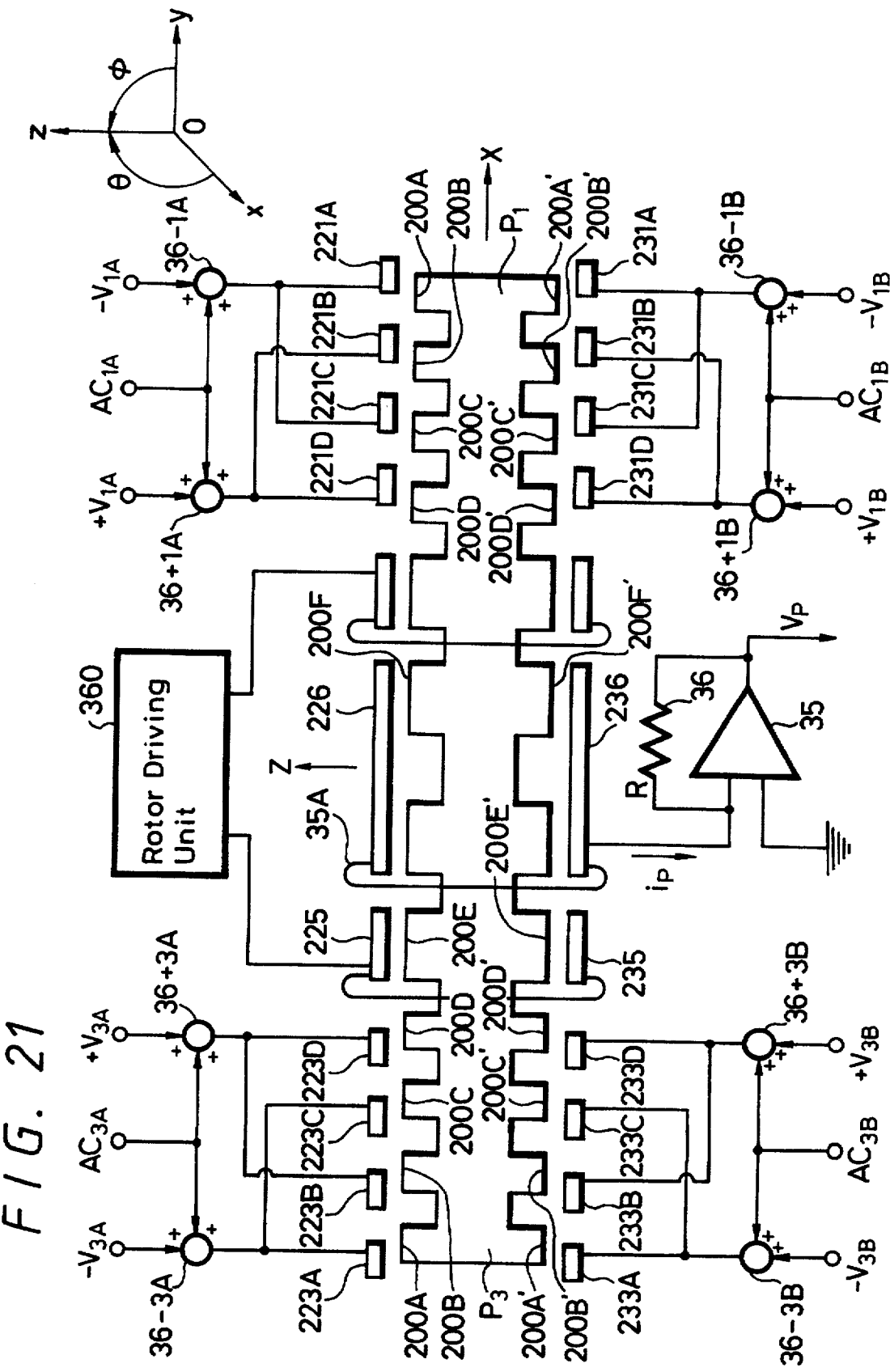
FIG. 21 is a block diagram used to explain a slaving control system of the gyro apparatus according to the second embodiment of the present invention.

FIG. 21 shows a cross section of the gyro apparatus according to the present invention taken along the XZ plane. FIG. 21 illustrates the first and third pairs of electrostatic supporting electrodes 221, 231, and 223, 233 disposed along the X axis, and the corresponding first and third portions $P_1$, $P_3$ of the gyro rotor 20. Although the second and fourth pairs of electrostatic supporting electrodes disposed along the Y axis and the corresponding second and fourth portions $P_2$ and P4 of the gyro rotor 20 are not shown, they are disposed along the direction perpendicular to the sheet of drawing.

The circumference portions 221A, 221B, 221C, 221D of the first pair of electrostatic supporting electrode pairs 221 are opposed to the electrode portions 200A, 200B, 200C, 200D formed on the upper surface of the gyro rotor 20, the circumference portions 231A, 231B, 231C, 231D of the first pair of electrostatic supporting electrode 231 are opposed to the electrode portions 200A', 200B', 200C', 200D' formed on the lower surface of the gyro rotor 20. The circumference portions 223A, 223B, 223C, 223D of the third pair of electrostatic supporting electrode 223 are opposed to the electrode portions 200A, 200B, 200C, 200D formed on the upper surface of the gyro rotor 20, and the circumference portions 233A, 233B, 233C, 233D of the third pair of electrostatic supporting electrodes 233 are opposed to the electrode portions 200A', 200B', 200C', 200D' formed on the lower surface of the gyro rotor 20.

A manner in which the control DC voltages are applied to the electrostatic supporting electrodes will be described. The circumference portions 221A, 221C of the first comb-shaped portion 221-1 of the first pair of electrostatic supporting electrode 221 are connected through an adder 36−1A to the DC voltage $-V_{1A}$, and the circumference portion 221B, 221D of the second comb-shaped portion 221-2 are connected through an adder 36+1A to the DC voltage $+V_{1A}$. The circumference portions 231A, 231C of the first comb-shaped portion 231-1 of the first pair of electrostatic supporting electrode 231 are connected through an adder 36−1B to the DC voltage $-V_{1B}$, and the circumference portions 231B, 231D of the second comb-shaped portion 231-2 are connected through an adder 36+1B to the DC voltage $+V_{1B}$.

Similarly, the circumference portions 223A, 223C of the first comb-shaped portion 223-1 of the third pair of electrostatic supporting electrode 223 are connected through an adder 36−3A to the DC voltage $-V_{3A}$, and the circumference portions 223B, 223D of the second comb-shaped portion 223-2 are connected through an adder 36+3A to the DC voltage $+V_{3A}$. The circumference portions 233A, 233C of the first comb-shaped portion 233-1 of the third pair of electrostatic supporting electrode 233 are connected through an adder 36−3B to the DC voltage $-V_{3B}$, and the circumference potions 233B, 233D of the second comb-shaped portion 233-2 are connected through an adder 36+3B to the DC voltage $+V_{3B}$.

A manner in which the detection AC voltages are applied to the electrostatic supporting electrodes will be described below. The detection AC voltages $AC_{1A}$, $AC_{1B}$, $AC_{3A}$, $AC_{3c}$ are applied to the first and third pairs of electrostatic supporting electrodes 221, 231, and 223, 233 under the condition that they are superimposed upon the control DC voltages. As illustrated, the detection AC voltages $AC_{1A}$, $AC_{1B}$, and $AC_{3A}$, $AC_{3B}$ are applied to the first pair of the adders 36−1A, 36+1A, and 36−1B, 36+1B, and the detection AC voltages $AC_{3A}$, $AC_{3B}$ are applied to the third pair of adders 36−3A, 36+3A, and 36−3B, 36+3B. The detection AC voltages $AC_{1B}$, $AC_{1B}$, $AC_{3A}$, $AC_{3B}$ are expressed by the following equation (32):

$$AC_{1A} = -EX - E\theta - EZ$$
$$AC_{1B} = -EX + E\theta + EZ$$
$$AC_{3A} = +EX + E\theta - EZ$$
$$AC_{3B} = +EX - E\theta + EZ \tag{32}$$

Terms of the right-hand sides of the detection AC voltages $AC_{1A}$, $AC_{1B}$, $AC_{3A}$, $AC_{3B}$ are expressed by the following equation (33):

$$+EX = E_0 \cos(\omega_1 t + \zeta_1)$$
$$-EX = E_0 \cos(\omega_1 t + \eta_1)$$
$$+E\theta = E_0 \cos(\omega_4 t + \zeta_4)$$
$$-E\theta = E_0 \cos(\omega_4 t + \eta_4)$$
$$+EZ = E_0 \cos(\omega_3 t + \zeta_3)$$
$$-EZ = E_0 \cos(\omega_3 t + \eta_3) \tag{33}$$

where ±EX represent the voltage components used to detect the X-axis direction linear displacement ΔX of the gyro rotor 20, ±Eθ represent the voltage components used to detect the Y-axis rotational displacement Δθ of the gyro rotor 20, and ±EZ represent the voltage components used to detect the Z-axis linear displacement ΔZ of the gyro rotor 20, and $\omega_1$, $\omega_3$, $\omega_4$ represent the displacement detection frequencies. Furthermore, plus and minus symbols of ±EX, ±Eθ, ±EZ represent the phase differences of 180 degrees, and hence the phase differences ζ, η have the following relationship expressed as:

$$\eta_1 = \zeta_1 \pm 180°$$
$$\eta_3 = \zeta_3 \pm 180°$$
$$\eta_4 = \zeta_4 \pm 180° \tag{34}$$

Although a cross section of the gyro apparatus taken along the YZ plane is not shown, a similar argument also is established for the second and fourth pairs of electrostatic supporting electrodes 222, 232, and 224, 234 and the corresponding second and fourth portions $P_2$, $P_4$ of the gyro rotor 20. In each of the second and fourth pairs of electrostatic supporting electrodes 222, 232, and 224, 234, the DC voltages with the same magnitude but with the opposite polarities are applied to the first and second comb-shaped portions.

The circumference portions 222A, 222C of the first comb-shaped portion 222-1 of the second pair of electrostatic supporting electrode 222 are connected to the DC voltage $-V_{2A}$, and the circumference portions 222B, 222D of the second comb-shaped portion 222-2 are connected to the DC voltage $+V_{2A}$. The circumference portions 232A, 232C of the first comb-shaped portion 232-1 of the second pair of electrostatic supporting electrode 232 are connected to the DC voltage $-V_{2B}$, and the circumference portions 232B, 232D of the second comb-shaped portion 232-2 are connected to the DC voltage $+V_{2B}$.

Similarly, the circumference portions 224A, 224C of the fourth pair of electrostatic supporting electrode 224 are connected to the DC voltage $-V_{4A}$, and the circumference portions 224B, 224D of the second comb-shaped portion 224-2 are connected to the DC voltage $+V_{4A}$. The circumference portions 234A, 234C of the first comb-shaped portion 234-1 of the fourth pair of electrostatic supporting electrode 234 are connected to the DC voltage $-V_{4B}$, and the circumference portions 234B, 234D of the second comb-shaped portion 234-2 are connected to the DC voltage $+V_{4B}$.

In association with the foregoing equation (32), we can have the following equation (35) for the detection AC voltages $AC_{2A}$, $AC_{2B}$, $AC_{4A}$, $AC_{4B}$ applied to the second and fourth pairs of electrostatic supporting electrodes 222, 232, and 224, 234:

$$AC_{2A} = -EY - E\phi - EZ$$
$$AC_{2B} = -EY + E\phi + EZ$$
$$AC_{4A} = +EY + E\phi - EZ$$
$$AC_{4B} = +EY - E\phi + EZ \quad (35)$$

Respective terms of the right-hand sides of the detection AC voltages $AC_{2A}$, $AC_{2B}$, $AC_{4A}$, $AC_{4B}$ are expressed by the equation (36) below:

$$+EY = E_0 \cos(\omega_2 t + \zeta_2)$$
$$-EY = E_0 \cos(\omega_2 t + \eta_2)$$
$$+E\phi = E_0 \cos(\omega_5 t + \zeta_5)$$
$$-E\phi = E_0 \cos(\omega_5 t + \eta_5)$$
$$+EZ = E_0 \cos(\omega_3 t + \zeta_3)$$
$$-EZ = E_0 \cos(\omega_3 t + \eta_3) \quad (36)$$

where $\pm EY$ represent the voltage components used to detect the Y-axis direction linear displacement $\Delta Y$ of the gyro rotor 20, $\pm E\phi$ represent the voltage components used to detect X-axis rotational displacement $\Delta\phi$ of the gyro rotor 20, $\pm EZ$ represent the voltage components used to detect the Z-axis direction linear displacement of the gyro rotor 20, and $\omega_2$, $\omega_3$, $\omega_5$ are the frequencies of detection AC voltage. Phase differences contained in the above voltage components are expressed by the following equation (37):

$$\eta_2 = \zeta_2 \pm 180°$$
$$\eta_3 = \zeta_3 \pm 180°$$
$$\eta_5 = \zeta_5 \pm 180° \quad (37)$$

Figure 22:
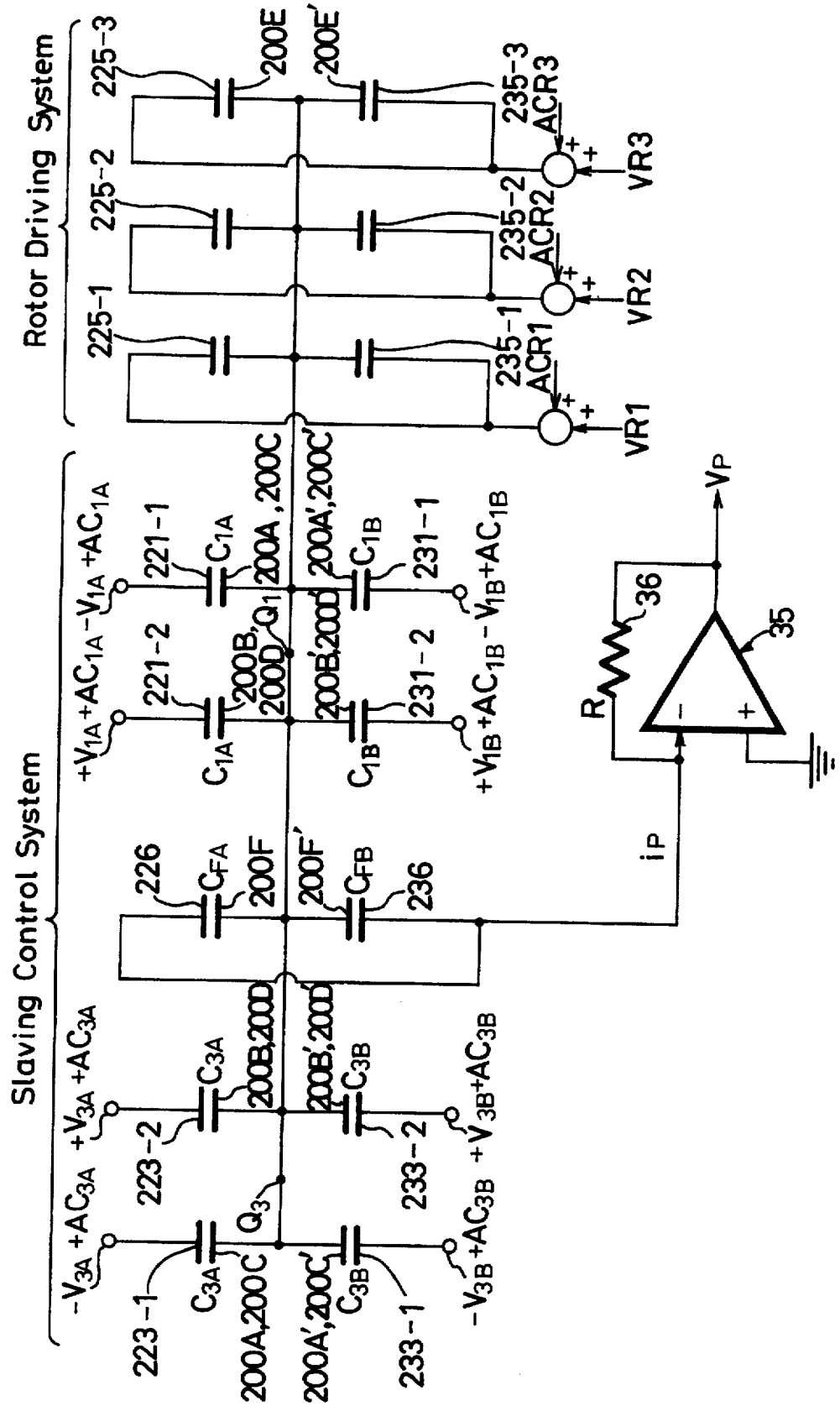
FIG. 22 is a diagram showing equivalent circuits of a slaving control system and a rotor driving system of the gyro apparatus according to the second embodiment of the present invention.

A principle of the displacement detection system according to this embodiment will be described with reference to FIG. 22. FIG. 22 shows equivalent circuits of the slaving control system and the rotor driving system. In the equivalent circuit of the slaving control system, the first and third pairs of electrostatic supporting electrodes 221, 231, and 223, 233, and the corresponding electrode portions 200A, 200A', 200C, 200C' of the gyro rotor 20 are replaced with capacitors. As described above, in the first electrostatic supporting electrode 221 of the first pair of electrostatic supporting electrodes 221, 231, the electrostatic capacity between the first comb-shaped portion 221-1 and the first and third electrode portions 200A, 200C and the electrostatic capacity between the second comb-shaped portion 221-2 and the second and fourth electrode portions 200B, 200D are equal to each other, and are $C_{1A}$. In the second electrostatic supporting electrode 231, the electrostatic capacity between the first comb-shaped portion 231-1 and the first and third electrode portions 200A', 200C' and the electrostatic capacity between the second comb-shaped portion 221-2 and the second and fourth electrode portions 200B', 200D' are equal to each other, and are $C_{1B}$.

In a like manner, in the first electrostatic supporting electrode 223 of the third pair of electrostatic supporting electrodes 223, 233, the electrostatic capacity between the first comb-shaped portion 223-1 and the first and third electrode portions 200A, 200C and the electrostatic capacity between the second comb-shaped portion 223-2 and the second and fourth electrode portions 200B, 200D are equal to each other, and are $C_{3A}$. In the second electrostatic supporting electrode 233, the electrostatic capacity between the first comb-shaped portion 233-1 and the first and third electrode portions 200A', 200C' are equal to each other, and are $C_{3B}$. The static capacities of the capacitors comprising the displacement detection electrodes 226, 236 and the corresponding displacement detection electrodes 200F, 200F' of the gyro rotor are assumed to be $C_{FA}$, $C_{FB}$, respectively.

Let us assume that the gyro rotor 20 is linearly displaced in the X axis direction by $\Delta X$, rotationally displaced around the Y axis by $\Delta\theta$, and that the gyro rotor 20 is linearly displaced in the Z axis direction by $\Delta Z$. Also, assuming that the above-mentioned displacements are sufficiently small, then electrostatic capacities of the respective capacitors are expressed by the aforementioned equation (11). Conversely, from the equation (11), the displacements $\Delta X$, $\Delta Z$, $\Delta\theta$ can be expressed by the electrostatic capacities of the capacitors based on the aforementioned equation (12).

In the electrostatic supporting electrodes, the control DC voltages $\pm V_{1A}$, $\pm V_{1B}$, $\pm V_{3A}$, $\pm V_{3B}$ with the same magnitude but with the opposite polarities are applied to the two comb-shaped portions 221-1 and 221-2, 231-1 and 231-2, 223-1 and 223-2, 233-1 and 233-2, whereby the potentials developed at the junctions $Q_1$, $Q_0$ of the two pairs of capacitors are canceled. According to this embodiment, since the control DC voltages with the same magnitude but with the opposite polarities are applied to the comb-shaped portions of each pair of electrostatic supporting electrodes, the potential of the gyro rotor 20 is null.

On application of the detection AC voltages $AC_{1A}$, $AC_{1B}$, and $AC_{3A}$, $AC_{3B}$ to the first and third pairs of electrostatic supporting electrodes 221, 231, and 223, 233 under the condition that the detection AC voltages $AC_{1A}$, $AC_{1B}$, $AC_{3A}$, $AC_{3B}$ are superimposed upon the control DC voltages, the displacement detection AC current $i_p$ is generated in the displacement detection capacitors. Such displacement detection AC current $i_p$ is expressed by the following equation (38):

$$i_p = K_{13}(C_{1A}AC_{1A} + C_{1B}AC_{1B} + C_{3A}AC_{3A} + C_{3B}AC_{3B})$$

$$K_{13}=2(C_{FA}+C_{FB})s/(2C_{1B}+2C_{1B}+2C_{3A}+2C_{3B}+C_{FA}+C_{FB}) \quad (38)$$

where s is the Laplacian operator. Substituting the detection AC voltages $AC_{1A}$, $AC_{1B}$, and $AC_{3A}$, $AC_{3B}$ expressed by the equation (33) and the electrostatic capacities $C_{1A}$, $C_{1B}$, and $C_{3A}$, $C_{3B}$ expressed by the equation (11) into the above equation (38), we have the displacement detection AC current $i_p$ expressed as:

$$i_p=K_{13}(EX\Delta X+E\theta\Delta\theta+EZ\Delta Z)$$

$$K_{13}=-8s(C_{FA}+C_{FB})/(8C_0+C_{FA}+C_{FB}) \quad (39)$$

Although the cross section of the gyro apparatus according to this embodiment taken along the YZ plane is not shown, a similar argument is also established in the second and fourth pairs of electrostatic supporting electrodes 222, 232, and 224, 234 disposed along the Y axis, and the corresponding second and fourth portions $P_2$ and $P_4$ of the gyro rotor 20.

Assuming that the gyro rotor 20 is linearly displaced in the Y axis direction by $\Delta Y$, linearly displaced in the Z axis direction by $\Delta Z$, and that the gyro rotor 20 is rotationally displaced around the X axis by $\Delta\phi$, then in correspondence to the equation (11), the electrostatic capacities of respective capacitors are expressed by the following equation (40):

$$C_{2A}=C_0(1+\Delta Y+\Delta Z+\Delta\phi)$$

$$C_{2B}=C_0(1+\Delta Y-\Delta Z-\Delta\phi)$$

$$C_{4B}=C_0(1-\Delta Y+\Delta Z-\Delta\phi)$$

$$C_{4B}=C_0(1-\Delta Y-\Delta Z+\Delta\phi) \quad (40)$$

Expressing the displacements $\Delta X$, $\Delta Y$, $\Delta\phi$ by the electrostatic capacities of the capacitors in correspondence to the aforementioned equation (12), we have:

$$\Delta Y=(\tfrac{1}{4}C_0)(C_{2A}+C_{2B}-C_{4A}-C_{4B})$$

$$\Delta\phi=(\tfrac{1}{4}C_0)(C_{2A}-C_{2B}-C_{4A}+C_{4B})$$

$$\Delta Z=(\tfrac{1}{4}C_0)(C_{2A}-C_{2B}+C_{4A}-C_{4B}) \quad (41)$$

Finally, when the gyro rotor 20 is linearly displaced by $\Delta X$ in the X axis direction, linearly displaced by $\Delta Y$ in the Y axis direction, linearly displaced by $\Delta Z$ in the Z axis direction, and rotationally displaced by $\Delta\phi$ around the X axis, the displacement detection AC current $i_p$ is expressed by the following equation (42):

$$i_p=K_I(EX\Delta X+EY\Delta Y+EZ\Delta Z+E\theta\Delta\theta+E\phi\Delta\phi)$$

$$K_I=-8sC_0(C_{FA}+C_{FB})/(8C_0+C_{FA}+C_{FB}) \quad (42)$$

where $K_I$ represents the proportional constant, and s represents the Laplacian operator. The displacement detection AC current $i_p$ is supplied through the resistor 36 with a resistance value R to the preamplifier 35, and thereby converted into the displacement detection AC voltage $V_p$. The displacement detection AC voltage $V_p$ is expressed by the following equation (43):

$$V_p=V_p(X)+V_p(Y)+V_p(Z)+V_p(\theta)+V_p(\phi) \quad (43)$$

Respective terms on the right-hand side of the equation (44) are voltage components corresponding to the displacements $\Delta X$, $\Delta Y$, $\Delta Z$, $\Delta\theta$, $\Delta\phi$, and are expressed by the following equation (44):

$$V_p(X)=K_I EX\Delta X=K_{V1}E_0\omega_1\Delta X \sin(\omega_1 t+\zeta_1)$$

$$V_p(Y)=K_I EY\Delta Y=K_{V2}E_0\omega_2\Delta Y \sin(\omega_2 t+\zeta_2)$$

$$V_p(Z)=K_I EZ\Delta Z=K_{V3}E_0\omega_3\Delta Z \sin(\omega_3 t+\zeta_3)$$

$$V_p(\theta)=K_I E\theta\Delta\theta=K_{V4}E_0\omega_4\Delta\theta \sin(\omega_4 t+\zeta_4)$$

$$V_p(\phi)=K_I E\phi\Delta\phi=K_{V5}E_0\omega_5\Delta\phi \sin(\omega_5 t+\zeta_5) \quad (44)$$

where $K_{V1}$ through $K_{V5}$ represent the constants that are determined by the electrostatic capacities $C_0$, $C_{FA}$, $C_{FB}$ of the capacitors. Study of the equations (43) and (44) shows that the output voltage $V_p$ contains all displacements of the gyro rotor 20 independently. Accordingly, if a desired voltage component is calculated based on the equation (43), then a corresponding displacement can be obtained. When more than two of the linear displacements $\Delta X$, $\Delta Y$, $\Delta Z$, and the rotational displacements $\Delta\theta$, $\Delta\phi$ are superimposed upon each other, it is possible to obtain respective displacements by computing the corresponding voltage components. Further, the equation (44) reveals that the output voltage $V_p$ is amplitude-modulated by the respective displacement detection frequencies $\omega_1$ to $\omega_5$ corresponding to the linear displacements $\Delta X$, $\Delta Y$, $\Delta Z$ and the rotational displacements $\Delta\theta$, $\Delta\phi$.

The rotor driving system in the gyro apparatus according to this embodiment will be described. As shown in FIGS. 20, 21, and 22, the rotor driving system according to this embodiment includes driving electrode portions 200E, 200E' formed on the upper and lower surfaces of the gyro rotor 20, driving electrodes 225, 235 formed on the upper bottom member 22 or the lower bottom member 24 of the gyro case 21, and a rotor driving unit 360. The rotor driving system according to this embodiment supplies drive voltages to the driving electrodes 225, 235 in response to a command signal supplied thereto from a sequence control unit 170 to energize, rotate, and stop the gyro rotor 20.

As shown in FIG. 19B, as described above, the drive electrode portion 200E and the drive electrode 225; the drive electrode portion 200E' and the drive electrode 235 of the gyro rotor 20 are disposed in row on the circumference of the same radius, and composed of a plurality of fan-shaped portions each of which is the same in shape.

The driving electrode portions 200E, 200E' and the drive electrodes 225, 235 according to this embodiment constitute a three-phase electrode. According to this embodiment, the driving electrode portion 200E formed on the upper side of the gyro rotor 20 includes four fan-shaped portions spaced apart from each other by a central angle of 90°, and the driving electrode portion 200E' formed on the lower side of the gyro rotor 20 includes four fan-shaped portions spaced apart from each other by a central angle of 90°.

Concurrently therewith, the drive electrode 225 formed on the upper side of the gyro case 21 includes 12 fan-shaped portions spaced apart from each other by equal central angles, and the drive electrode 235 formed on the lower side of the gyro case 21 includes 12 fan-shaped portions spaced apart from each other by equal central angles. Each of the 12 drive electrodes 225 or 235 consists of four sets of fan-shaped portions, and each set of the fan-shaped portion consists of three fan-shaped portions, i.e., first-phase, second-phase, and third-phase fan-shaped portions.

The fan-shaped portions of the corresponding phase of each set of the drive electrodes 225 or 235 are electrically connected to each other. The four drive electrodes 225 or 235 of the first phase, for example, are electrically connected to each other, the four drive electrodes 225 or 235 of the second phase are electrically connected to each other, and the four drive electrodes 225 or 235 of the third phase are electrically connected to each other.

A three-phase drive voltage is supplied to the three-phase common terminal. The drive voltage may be provided in the form of step-like voltage or pulse voltage. The drive voltage is sequentially switched by the adjacent four fan-shaped portions of the next phase. The drive voltage is switched in synchronism with the rotation of the gyro rotor 20, whereby the gyro rotor 20 is rotated at high speed. Because the rotor cavity portion 26 of the gyro case 21 is held at high vacuum, if the rotational speed of the gyro rotor 20 is increased, then the drive voltage may be cut off or the drive voltage may be supplied constantly.

The driving electrode portions 200E, 200E' and the drive electrodes 225, 235 constituting the three-phase electrode may contain much more fan-shaped portions. Each of the drive electrode portions 200E, 200E' may include five fan-shaped portions, and each of the drive electrodes 225, 235 may include five sets of fan-shaped portions, i.e., 15 fan-shaped portions in correspondence to the five fan-shaped portions.

Referring to FIG. 22, an equivalent circuit of the rotor driving system will be described. The equivalent circuit of the rotor driving system is illustrated on the right-hand side of FIG. 22. As shown in FIG. 22, the driving electrode portion 200E of the gyro rotor 20 and the drive electrode 225 of the gyro case 22 are replaced with the capacitors, and the driving electrode portion 200E' of the gyro rotor 20 and the drive electrode 235 of the gyro case 24 are replaced with the capacitors. Drive DC voltages VR1, VR2, VR3 for rotating the gyro rotor 20 and detection AC voltages ACR1, ACR2, ACR3 for detecting a rotation angle of the gyro rotor 20 are applied to the capacitors.

Figure 23:
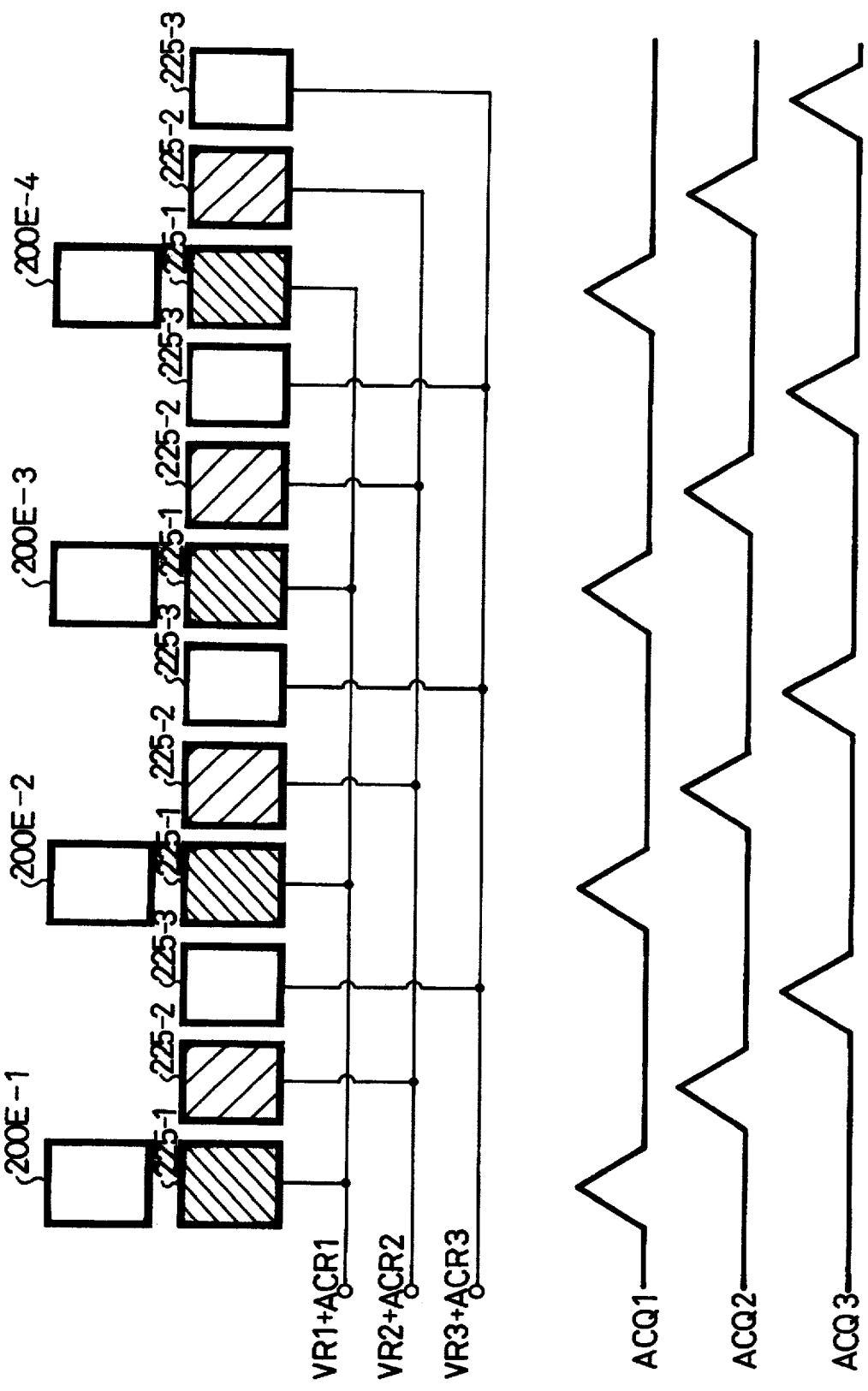
FIG. 23 is a diagram used to explain a manner in which the rotor driving system of the gyro apparatus is operated.

Referring to FIG. 23, operation of the rotor drive motor according to this embodiment will be described in detail. FIG. 23 shows a manner in which the upper driving electrode portion 200E of the gyro rotor 20 and the corresponding upper drive electrode 225 of the gyro case both of which are disposed on the circumference in actual practice are disposed on the straight line.

As shown in FIG. 23, the upper driving electrode portion 200E of the gyro rotor 20 includes four fan-shaped portions 200E-1, 200E-2, 200E-3, 200E-4 spaced apart from each other by a central angle of 90°, and concurrently therewith, the upper drive electrode 225 of the gyro case 22 includes 12 fan-shaped portions. These fan-shaped portions comprises four sets, and each set includes three, i.e., three-phase fan-shaped portions. The first-phase, second-phase, and third-phase fan-shaped portions of each set are denoted by reference numerals 225-1, 225-2, 225-3.

The four fans-shaped portions 225-1 of the first phase are electrically connected to each other, the four fan-shaped portions 225-2 of the second phase are electrically connected to each other, and the four fan-shaped portions 225-3 of the third phase are electrically connected to each other.

A command signal is supplied from a sequence control unit 370 to a rotor driving unit 360, and the drive DC voltages VR1, VR2, VR3 and the detection AC voltages ACR1, ACR2, ACR3 are applied to the three-phase drive electrodes 225-1, 225-2, 225-3 in response to such command signal, respectively.

The drive DC voltages VR1, VR2, VR3 are sequentially applied to the first-phase, second-phase, and third-phase drive electrodes 225-1, 225-2, 225-3 at every predetermined switching time Δt, whereby the gyro rotor 20 is rotated about the central axis, i.e., spin axis by 360 degrees/12=30 degrees at every switching time Δt.

FIG. 23 shows a waveform diagram on its lower side, and this waveform diagram shows waveforms of rotation angle detection currents generated in the displacement detection electrodes 226, 236 or corresponding rotation angle detection voltages ACQ1, ACQ2, ACQ3. A rotation angle of the gyro rotor 20 is detected by the rotation angle detection signals ACQ1, ACQ2, ACQ3.

When the drive DC voltage VR1 is applied to the first-phase drive electrode 225-1, for example, the gyro rotor 20 is rotated about the central axis until the four driving electrode portions 200E-1, 200E-2, 200E-3, 200E-4 are aligned with the first-phase drive electrodes 225-1, 225-1, 225-1, 225-1, i.e., the gyro rotor 20 is rotated about the central axis by 30 degrees. Then, when the drive DC voltage VR2 is applied to the second-phase drive electrode 225-2, the gyro rotor 20 is rotated about the central axis until the four driving electrode portions 200E-1, 200E-2, 200E-3, 200E-4 are aligned with the second-phase drive electrodes 225-2, 225-2, 225-2, 225-2, i.e., the gyro rotor 20 is rotated about the central axis by 30 degrees.

Figure 24:
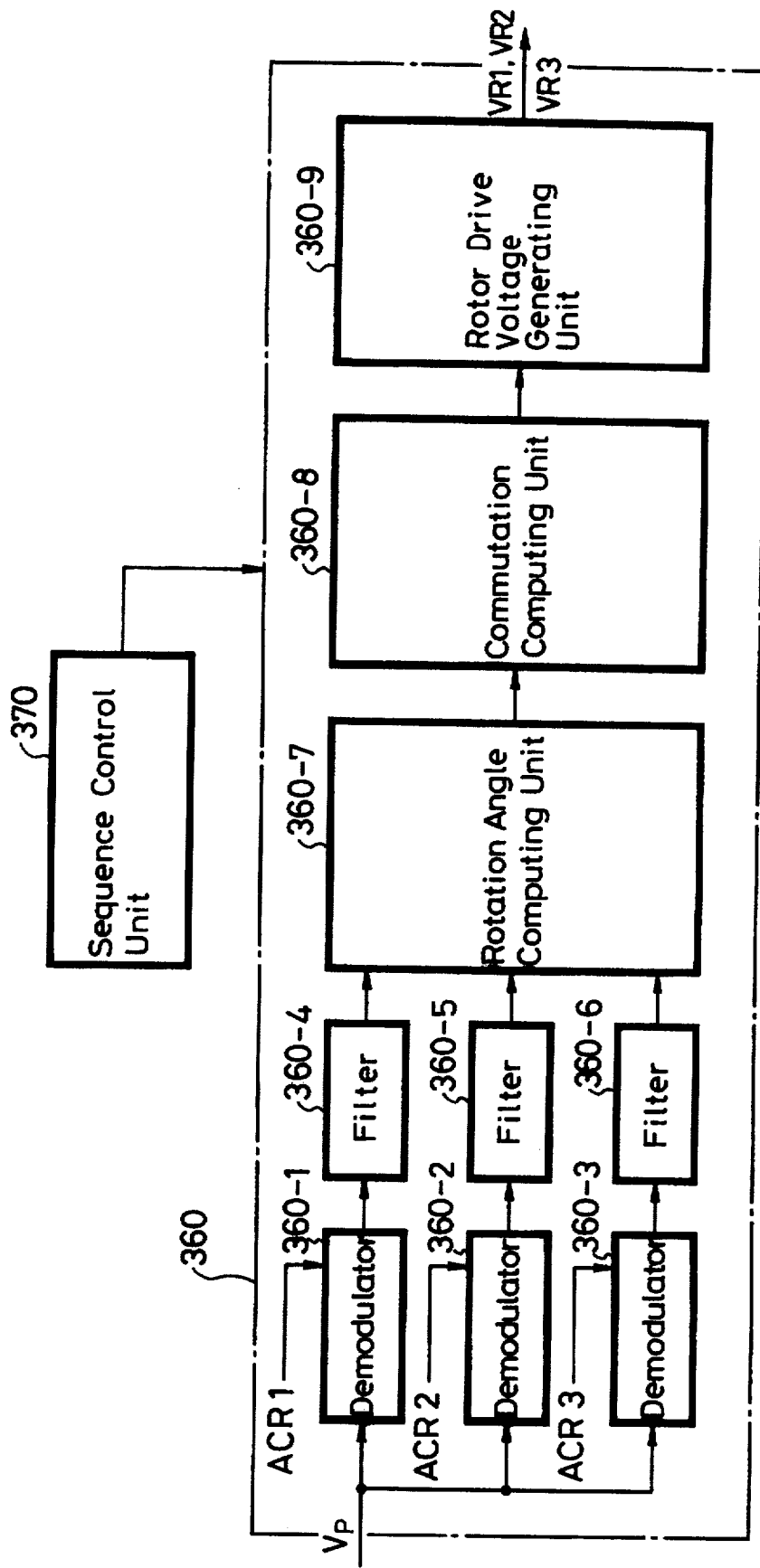
FIG. 24 is a block diagram showing a rotor driving unit of the gyro apparatus according to the second embodiment of the present invention.

Referring to FIG. 24, the rotor drive unit 360 will be described. The displacement detection current $i_p$ generated in the displacement detection electrodes 226, 236 is converted by the displacement detection circuit 35 into the displacement detection voltage $V_p$, and the displacement detection voltage $V_p$ is supplied to the rotor drive unit 360. The displacement detection current $i_p$ includes the rotation angle detection currents ACQ1, ACQ2, ACQ3 shown on the waveform diagrams provided on the lower side of FIG. 23. Therefore, the displacement detection voltage $V_p$ contains a rotation angle detection voltage signal with a waveform shown on the lower side of FIG. 23.

Three demodulators 360-1, 360-2, 360-3 detect the above displacement detection voltage $V_p$ to generate the three rotation angle detection voltages ACQ1, ACQ2, ACQ3 with the waveforms shown on the lower side of FIG. 23. The three demodulators 360-1, 360-2, 360-3 detect the displacement detection voltage $V_p$ based on reference signals ACR1, ACR2, ACR3 each having a predetermined period. Output signals from the demodulators 360-1, 360-2, 360-3 are supplied through filters 360-4, 360-5, 360-6 to a rotation angle computing unit 360-7.

The rotation angle computing unit 360-7 calculates a rotation angle of the gyro rotor 20, i.e., the rotation angle computing unit 360-7 detects a correspondence relationship among the four driving electrode portions 200E-1, 200E-2, 200E-3, 200E-4 and the three-phase drive electrodes 225-1, 225-2, 225-3.

A commutation computing unit 360-8 generates a switching signal based on the rotation angle of the gyro rotor 20. A rotor driving voltage generating unit 360-9 receives the switching signal from the commutation computing unit 360-9, and generates the drive DC voltages VR1, VR2, VR3 which are to be supplied to the three-phase drive electrodes 225-1, 225-2, 225-3.

Operation of the sequence control unit 370 will be described. The sequence control unit 370 includes a start mode, a steady drive mode, and a stop mode, and supplies command signals corresponding to the respective modes to the rotor drive unit 360. In the start mode, the commutation computing unit 360-7 generates a predetermined switching signal or a predetermined switching time signal such that a rotational speed of the gyro rotor 20 is increased. When the rotational speed of the gyro rotor 20 reaches a constant rotational speed, the sequence control unit 370 generates a steady drive mode signal, and supplies the same to the rotor drive unit 360.

In the steady drive mode, the commutation computing unit 360-8 supplies a predetermined switching time signal to the rotor drive voltage generating unit 360-9. In the stop mode, the sequence control unit 370 generates a predetermined switching signal or a predetermined switching time signal such that the rotational speed of the gyro rotor 20 is decreased.

Figure 25:
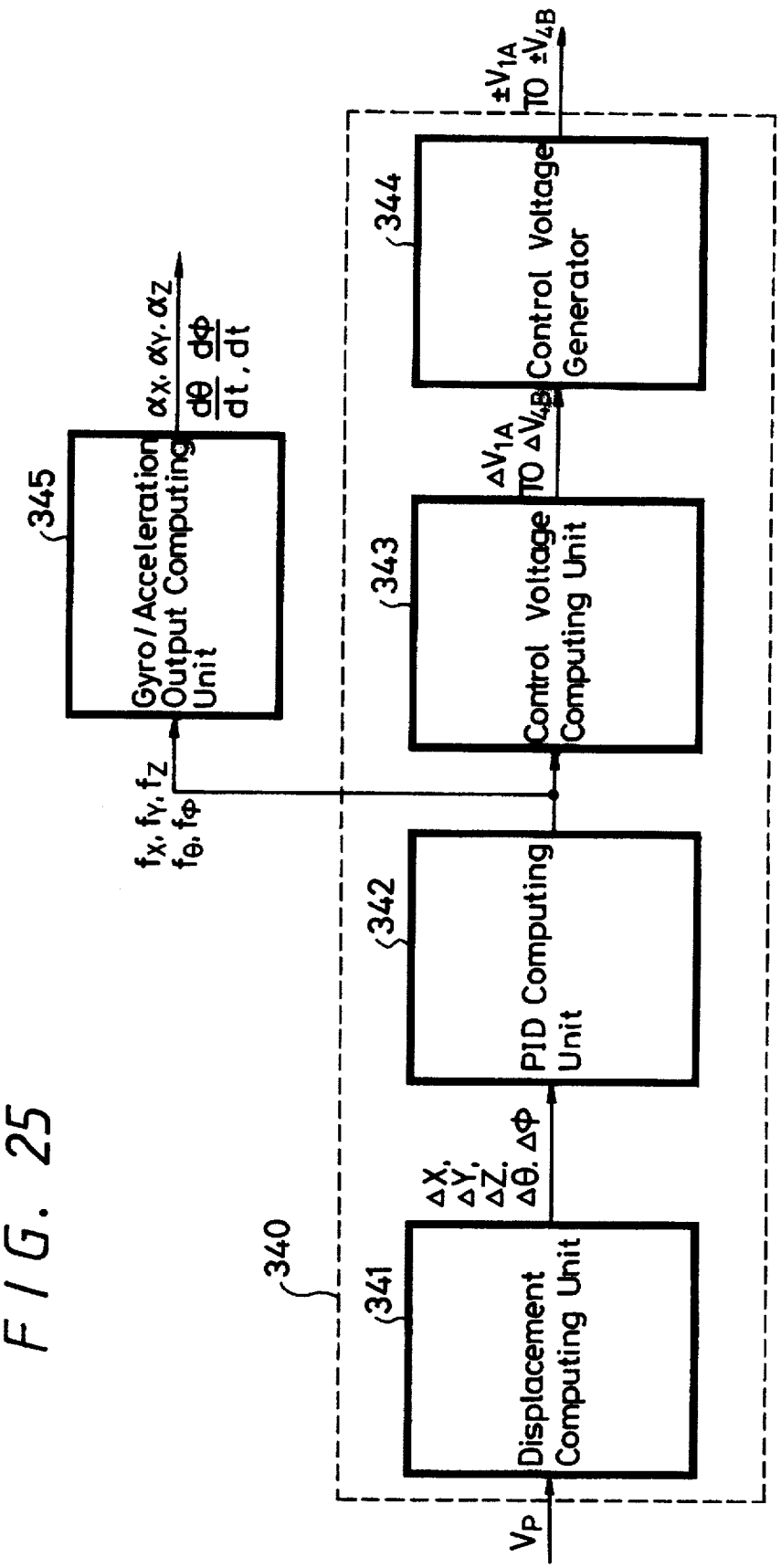
FIG. 25 is a block diagram showing a control computing unit and a gyro/acceleration output computing unit of the gyro apparatus according to the second embodiment of the present invention.

A control computing unit 340 and a gyro/acceleration output computing unit 345 of the gyro apparatus will be described with reference to FIG. 25. As shown in FIG. 25, the control computing unit 340 according to this embodiment includes a displacement computing unit 341 for computing the linear displacements ΔX, ΔY, ΔZ, and the rotational displacements Δϕ based on the output voltage $V_p$ inputted thereto from the preamplifier 35, a PID computing unit 342 for computing the linear accelerations fx, fy, fx and the rotational moments fθ, fϕ applied to the gyro rotor 20 such that the displacement of the gyro rotor 20 is canceled, a control voltage computing unit 343 for computing the changed amounts $A_{1A}$, $A_{1B}$, $A_{2A}$, $A_{2B}$, $A_{3A}$, $A_{3B}$, $A_{4A}$, $A_{4B}$ of the control DC voltages, and a gyro/acceleration output computing unit 344 for generating the control DC voltages $V_{1A}$, $V_{1B}$, $V_{2A}$, $V_{2B}$, $V_{3A}$, $V_{3B}$, $V_{4A}$, $V_{4B}$. The gyro apparatus includes a gyro/acceleration output computing unit 345, and the gyro/acceleration output computing unit 345 receives the accelerations fx, fy, fz and the rotational moments fθ, fϕ outputted thereto from the control computing unit 340, and calculates gyro outputs $α_x$, $α_y$, $α_z$, dθ/dt, dϕ/dt.

Figure 26:
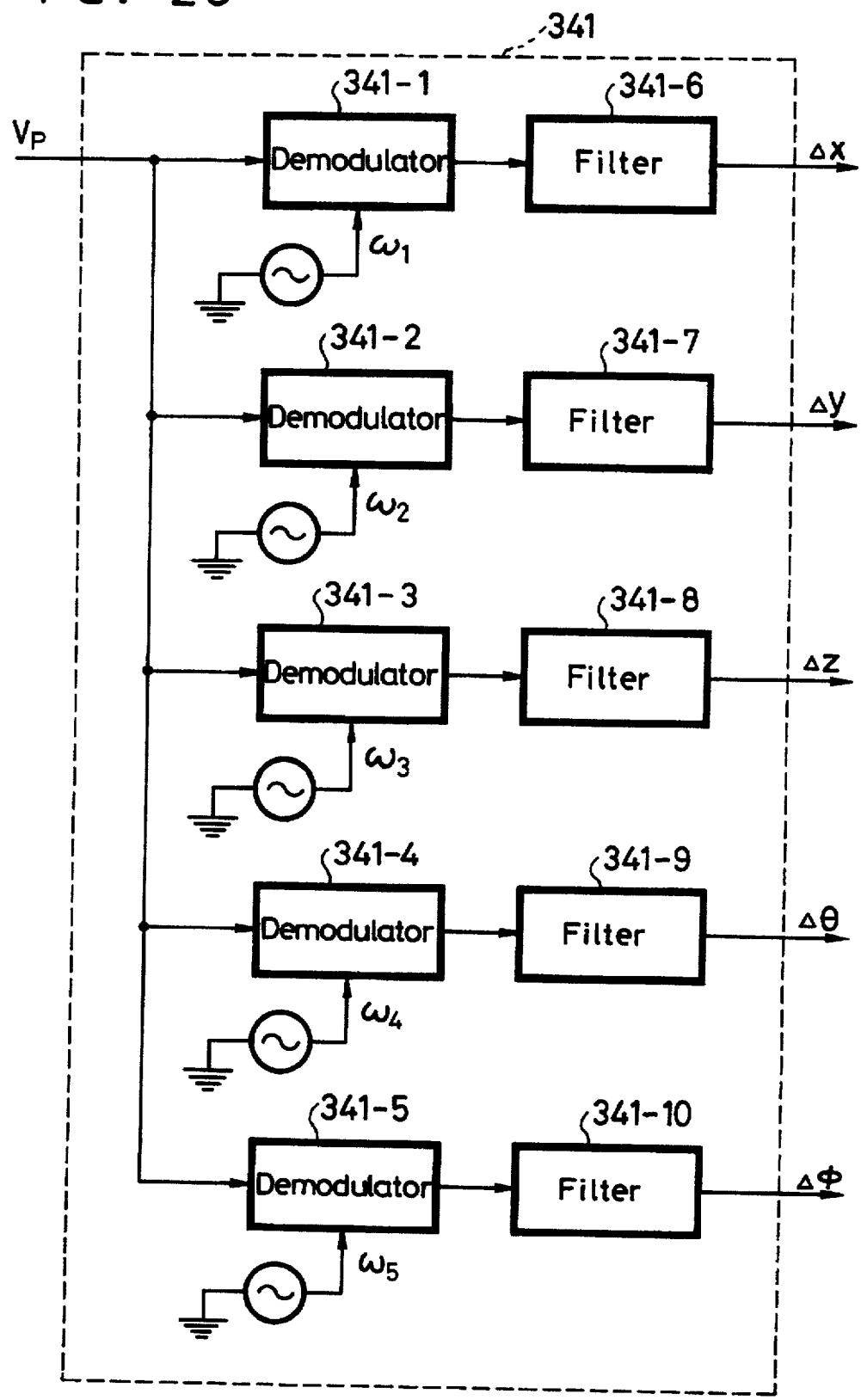
FIG. 26 is a block diagram showing a displacement computing unit of the gyro apparatus according to the second embodiment of the present invention.

The displacement computing unit 341 according to this embodiment will be described with reference to FIG. 26. As shown in FIG. 26, the displacement computing unit 341 according to this embodiment includes a first demodulator 341-1 for obtaining a voltage component $V_p$ (X) of the first equation of the equation (44) by detecting the voltage signal $V_p$ based on the reference signal with frequency $ω_1$, a second demodulator 341-2 for obtaining a voltage component $V_p$ (Y) of the second equation of the equation (44) by detecting the voltage signal $V_p$ based on the reference signal with frequency $ω_2$, a third demodulator 314-3 for obtaining a voltage component $V_p$ (Z) of the third equation of the equation (44) by detecting the voltage $V_p$ based on the reference signal with frequency $ω_3$, a fourth demodulator 341-4 for obtaining a voltage component $V_p$ (θ) of the fourth equation of the equation (44) by detecting the voltage $V_p$ based on the reference signal with frequency $ω_4$, and a fifth demodulator 341-5 for obtaining a voltage component $V_p$ (ϕ) of the fifth equation of the equation (44) by detecting the voltage $V_p$ based on the reference signal with frequency $ω_5$.

Filters 341-6, 341-7, 341-8, 341-9, 341-10 for reducing ripple from the demodulators 341-1 through 341-5 are connected to the output sides of the demodulators 341-1, 341-2, 341-3, 341-4, 341-5.

The output voltages of the filters 341-6 through 341-10 express the linear displacements ΔX, ΔY, ΔZ and the rotational displacements Δθ, Δϕ. The displacement signals are supplied to the PID computing unit 342 and the control voltage computing unit 343.

The PID computing unit 342 according to this embodiment will be described with reference to FIG. 27. The PID computing unit 342 according to this embodiment includes five PID calculators 342-1, 342-2, 342-3, 342-4, 342-5, and each of the PID calculators 342-1, 342-2, 342-3, 342-4, 342-5 calculates the linear accelerations fx, fy, fz and the rotational moments fθ, fϕ based on the linear displacements ΔX, ΔY, ΔZ, and the rotational displacements Δθ, Δϕ inputted thereto.

FIG. 27 show, in block form, the first PID calculator 342-1. As shown in FIG. 27, the first PID calculator 342-1 comprises a differentiation unit 342-1A for differentiating the inputted linear displacement ΔX, a proportioning unit 342-1B for proportioning the inputted linear displacement ΔX, an integrating unit 342-1C for integrating the inputted linear displacement ΔX, and an adding unit 342-1D for adding these calculated results. The output signal from the adding unit 342-1D is the output signal of the PID calculator 342-1. In FIG. 27, S denotes a Laplacian operator, $K_p$ denotes the proportional constant, and $T_D$ and $T_I$ denote differentiation time constant, and integration time constant, respectively.

Other three PID calculators included in the PID computing unit 342 according to this embodiment, i.e., second, third, fourth, and fifth PID calculators 342-1 may be similar in arrangement to the first PID calculator 342-1 shown in FIG. 27.

The output signals fx, fy, fz, fθ, fϕ of the PID calculator 342 are supplied to the control voltage computing unit 343, and the gyro/acceleration output computing unit 345. The output signals of the integration units 342-1C through 342-5C, instead of the output signals fx, fy, fz, fθ, fϕ from the adding units 342-1D through 342-5D, may be supplied to the gyro/acceleration output computing unit 345.

Arrangement and operation of the control voltage computing unit 343 will be described with reference to FIGS. 28A, 28B. The control voltage computing unit 343 according to this embodiment calculates changed amounts $ΔV_1$ through $ΔV_8$ of the control DC voltage based on the linear accelerations fx, fy, fz and the rotational moments fθ, fϕ. According to this embodiment, the forces fx, fy, fz and the torques fθ, fϕ that should be applied to the gyro rotor 20 are calculated in such a manner that the displacement of the gyro rotor 20 is canceled. Finally, the changed amounts $ΔV_{1A}$ through $ΔV_{4B}$ are calculated from the forces fx, fy, fz, and the torques fθ, fϕ.

A manner in which the input signal to the control voltage computing unit 143 is made dimensionless will be described with reference to FIGS. 28A, 28B. As shown in FIG. 28A, let it be assumed that the circumferential portion 221A of the electrostatic supporting electrode of the gyro case 21 and the corresponding electrode portion 200A of the gyro rotor 20 is a schematic capacitor. The circumference portion 221A of the electrostatic supporting electrode is designed to have a radius of curvature which is larger or smaller than the radius of the corresponding electrode portion 200A by a distance $δ_2$ (e.g., $δ_2=r_1-r_2=L/2=p/4$ where $r_1$ is a radius of curvature of electrode portions and $r_2$ is a radius of electrode of the gyro rotor), and the overlapping portion of the circumference portion 221A and the electrode portion 200A serves as the capacitor.

Assuming that the above capacitor is disposed at the position of radius r, the radial width is L, the circumferential width is B, and that the clearance is δ, then the dimensionless linear displacements ΔX, ΔY, ΔZ, and the rotational displacements Δθ, Δϕ is effected by the following equation (45):

$$ΔX_N=ΔX/L$$

$$ΔY_N=ΔY/L$$

$$ΔZ_N=ΔZ/δ$$

$$Δθ_N=Δθ/(δ/r)$$

$$Δϕ_N=Δϕ/(δ/r) \quad (45)$$

where suffix N designates the dimensionless amount.

A manner in which the linear accelerations fx, fy, fz and the rotational moments fθ, fϕ are made dimensionless will be described with reference to FIG. 28B. The linear accelerations fx, fy, fz are made dimensionless by the following equation (46):

$$Fx=fx(C_0V_0^2/L)^{-1}$$

$$Fy=fy(C_0V_0^2/L)^{-1}$$

$$Fz=fz(C_0V_0^2/\delta)^{-1}$$

$$T\theta=f\theta(rC_0V_0^2/\delta)^{-1}$$

$$T\phi=f\phi(rC_0V_0^2/\delta)^{-1} \qquad (46)$$

where $C_0$ is the electrostatic capacity obtained when the displacement of the gyro rotor 20 is zero, and which is expressed as $C_0=\epsilon BL/\delta$ by use of dielectric constant $\epsilon$, $V_0$ is the control DC voltage obtained when the displacement of the gyro rotor 20 is zero, r is the radius, and $\delta$ is the spacing between the electrodes.

Then, the changed amounts $\Delta V_{1A}$ through $\Delta V_{4B}$ of the control DC voltages are calculated from the dimensionless forces Fx, Fy, Fz, and torques T$\theta$, T$\phi$.

Let us consider the changed amounts $\Delta V_{1A}$, $\Delta V_{1B}$, and $\Delta V_{3A}$, $\Delta V_{3B}$ of the control DC voltages $\pm V_{1A}$, $\pm V_{1B}$ and $\pm_{3A}$, $\pm V_{3B}$ applied to the first and third electrostatic supporting electrodes 221, 223. Each of the four changed amounts $\Delta V_{1A}$, $\Delta V_{1B}$, and $\Delta V_{3A}$, $\Delta V_{3B}$s can be expressed by the three dimensionless forces Fz, Fz and the torque T$\theta$. Similarly, let us consider the changed amounts $\Delta V_{2A}$, $\Delta V_{2B}$ and $\Delta V_{4A}$, $\Delta V_{4B}$ of the control DC voltages $\pm V_{2A}$, $\pm V_{2B}$, and $\pm V_{4A}$, $\pm V_{4B}$ that should be applied to the second and fourth electrostatic electrodes 222, 224. Each of the four changed amounts $\Delta V_{2A}$, $\Delta V_{2B}$, and $\Delta V_{4A}$, $\Delta V_{4B}$ can be expressed by the three forces Fy, Fz and torque T$\phi$.

Accordingly, there is provided one more condition for obtaining the four changed amounts $\Delta V_{1A}$, $\Delta V_{1B}$, and $\Delta V_{3A}$, $\Delta V_{3B}$, $\Delta V_{2A}$, $\Delta V_{2B}$, and $\Delta V_{4A}$, $\Delta V_{4B}$:

$$\Delta V_{1A}+\Delta V_{1B}+\Delta V_{3A}+\Delta V_{3B}=0$$

$$\Delta V_{2A}+\Delta V_{2B}+\Delta V_{4A}+\Delta V_{4B}=0 \qquad (47)$$

The first equation of the equation (47) reveals that the sum of the changed amounts of the control DC voltages in the portions along the XZ plane of the gyro rotor 20, i.e., in the first and third portions $P_1$, $P_3$ is zero. Also, the second equation of the equation (47) reveals that the sum of the changed amounts of the control DC voltages in the portions along the YZ plane of the gyro rotor 20, i.e., in the second and fourth portions $P_2$, $P_4$ iS zero. If the above-mentioned condition is set, then undesirable electric charges can be prevented from being flowed to the gyro rotor 20, and at the same time, the values of the changed amounts $\Delta V_{1A}$ through $\Delta V_{4B}$ of 8 control DC voltages can be determined uniquely.

Then, the changed amounts $\Delta V_{1A}$ through $\Delta V_{4B}$ of the control DC voltages are calculated based on the dimensionless forces Fx, Fy, Fz and torques T$\theta$, T$\phi$, and computing equations are expressed as:

$$\Delta V_{1A}=(V_0/4)(Fx+Fz/2+T\theta)$$

$$\Delta V_{1B}=(V_0/4)(Fx-Fz/2-T\theta)$$

$$\Delta V_{3A}=(V_0/4)(-Fx+Fz/2-T\theta)$$

$$\Delta V_{3B}=(V_0/4)(-Fx-Fz/2+T\theta)$$

$$\Delta V_{2A}=(V_0/4)(Fy+Fz/2+T\phi)$$

$$\Delta V_{2B}=(V_0/4)(Fy-Fz/2-T\phi)$$

$$\Delta V_{4A}=(V_0/4)(-Fy+Fz/2-T\phi)$$

$$\Delta V_{4B}=(V_0/4)(-Fy-Fz/2+T\phi) \qquad (48)$$

The control voltage generator 344 generates the control DC voltages $V_{1A}$, $V_{1B}$, $V_{2A}$, $V_{2B}$, $V_{3A}$, $V_{3B}$, $V_{4A}$, $V_{4B}$ that are to be supplied to the four pairs of electrostatic supporting electrodes 221, 231, 222, 232, 223, 233, 224, 234. The above control DC voltages are expressed by the following equation (49):

$$V_{1A}=V_0+\Delta V_{1A}$$

$$V_{1B}=V_0+\Delta V_{1B}$$

$$V_{2A}=V_0+\Delta V_{2A}$$

$$V_{2B}=V_0+\Delta V_{2B}$$

$$V_{3A}=V_0+\Delta V_{3A}$$

$$V_{3B}=V_0+\Delta V_{3B}$$

$$V_{4A}=V_0+\Delta V_{4A}$$

$$V_{4B}=V_0+\Delta V_{4B} \qquad (49)$$

where $V_0$ represents the reference voltage, $V_{1A}$ and $V_{1B}$ represent the control DC voltages that are applied to the first pair of electrostatic supporting electrodes 221, 231, $V_{2A}$ and $V_{2B}$ represent the control DC voltages that are applied to the second pair of electrostatic voltages 222, 232, $V_{3A}$, $V_{3B}$ represent the control DC voltages that are applied to the third pair of electrostatic supporting electrodes 223, 233, and $V_{4A}$, $V_{4B}$ represent the control DC voltages that are applied to the fourth pair of electrostatic supporting electrodes 224, 234.

Forces that act on the gyro rotor 20 in actual practice will be obtained next. The equations (1) through (9) and corresponding descriptions also are established in this embodiment. Electrostatic forces acting on the four portions $P_1$, $P_2$, $P_3$, $P_4$ of the gyro rotor 20 are proportional to the differences between them and the control DC voltages $V_{1A}$, $V_{1B}$, $V_{2A}$, $V_{2B}$, $V_{3A}$, $V_{3B}$, $V_{4A}$, $V_{4B}$ applied to the corresponding four pairs of electrostatic supporting electrodes 221, 231, 222, 232, 223', 233, 224, 234.

$$Fz1=K_z(V_{1A}-V_{1B})$$

$$Fz2=K_z(V_{2A}-V_{2B})$$

$$Fz3=K_z(V_{3A}-V_{3B})$$

$$Fz4=K_z(V_{4A}-V_{4B}) \qquad (50)$$

where $K_z$ is the constant that is determined depending on the shape of the capacitor composed of the electrostatic supporting electrodes of the gyro case 21 and the electrode portions of the gyro rotor 20. A resultant force of electrostatic forces acting on the gyro rotor 20 is a sum of electrostatic forces acting on the four portions $P_1$, $P_2$, $P_3$, $P_4$.

$$\hat{F}_z=K_z(V_{1A}-V_{1B}+V_{2A}-V_{2B}+V_{3A}-V_{3B}+V_{4A}-V_{4B}) \qquad (51)$$

As described above, the electrostatic supporting electrodes of the gyro case 21 are designed to have a radius of curvature which is larger or smaller than the radius of the corresponding electrode portions of the gyro rotor 20 (e.g., $r_1-r_2=L/2=p/4$ where $r_1$ is a radius of curvature of electrode portions and $r_2$ is a radius of the corresponding electrode of the gyro rotor), whereby the X-axis and Y-axis forces are applied to the gyro rotor 20. X-axis direction forces acting on the first and third portions $P_1$, $P_2$ of the gyro rotor 20 are expressed by the following equation (52):

$$Fx1=K_x(V_{1A}+V_{1B})$$

$$FX2 = K_x(V_{3A} + V_{3B}) \quad (52)$$

The X-axis direction force acting on the gyro rotor 20 is a difference between the forces acting on the first and third portions $P_1$ and $P_3$ as given by the following equation (53):

$$fx = Fx1 - Fx2 = K_x(V_{1A} + V_{1B} - V_{3A} - V_{3B}) \quad (53)$$

Similarly, the Y-axis direction force acting on the gyro rotor 20 is a difference between the forces acting on the second and fourth portions $P_2$ and $P_4$ as given by the following equation (54):

$$z,3 = Fy1 - Fy2 = K_y(V_{2A} + V_{2B} - V_{4A} - V_{4B}) \quad (54)$$

The above mentioned argument is established when the electrostatic forces Fz1, Fz3 of the same direction act on the first and third portions $P_1$, $P_3$ of the gyro rotor 20 and when the electrostatic forces Fz2, Fz4 of the same direction act on the second and fourth portions $P_2$, $P_4$ of the gyro rotor 20. When electrostatic forces Fz1, Fz3 of opposite directions act on the first and third portions $P_1$, $P_3$ of the gyro rotor 20, there is generated a torque T$\theta$ by which the gyro rotor 20 is rotated about the Y axis. Similarly, when electrostatic forces of opposite directions act on the second and fourth portions $P_2$, $P_4$ of the gyro rotor 20, there is generated a torque T$\phi$ by which the gyro rotor 20 is rotated about the X axis. The torques T$\theta$, T$\phi$ are expressed by the following equation (55):

$$T\theta = (Fz3 - Fz1)r$$

$$T\phi = (fz4 - Fz2)r \quad (55)$$

Figure 29:
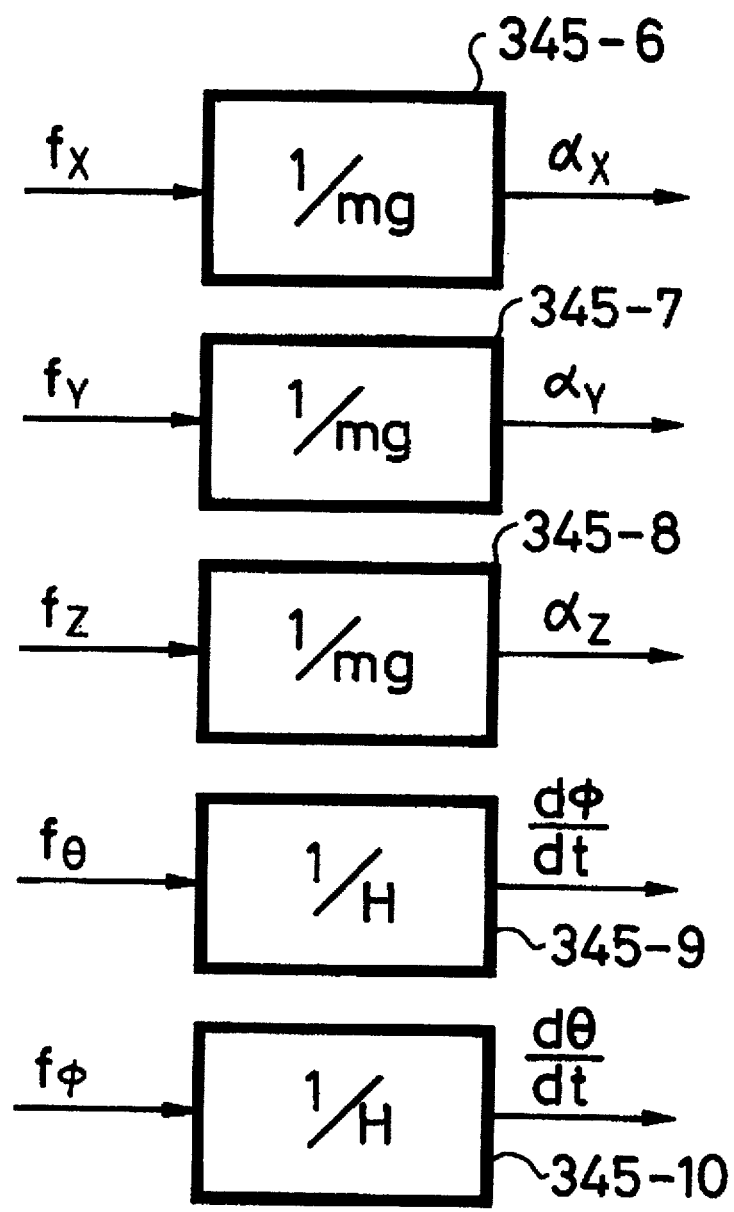
FIG. 29 is a block diagram used to explain operation of the gyro/acceleration output computing unit of the gyro apparatus according to the second embodiment of the present invention.

Arrangement and operation of the gyro/acceleration output computing unit 345 according to this embodiment will be described with reference to FIG. 29. The gyro/acceleration output computing unit 345 according to this embodiment generates the external accelerations and the angular velocities expressed by the following equation (56):

$$\alpha_x = fx/mg$$

$$\alpha_y = fy/mg$$

$$\alpha_z = fz/mg$$

$$d\theta/dt = f\phi/H$$

$$d\phi/dt = f\theta/H \quad (56)$$

where m represents the mass of the gyro rotor 20, g represents the gravitational acceleration, and H represents the spin angular momentum of the gyro rotor 20.

When the external acceleration d$\theta$/dt of Y axis acts on the gyro apparatus, the gyro case 21 is rotationally displaced around the Y axis. The gyro rotor 20 is torqued around the X axis by the torque T$\phi$. The gyro rotor 20 is rotationally displaced around the Y axis due to precession, and the Y axis rotational displacement of the gyro rotor 20 relative to the gyro case 21 is canceled. When the X axis external angular velocity d$\phi$/dt acts on the gyro apparatus, the gyro rotor 20 is torqued around the Y axis by the torque T$\theta$. Then, the gyro rotor 20 is rotated around the X axis due to precession, and the X axis rotational displacement of the gyro rotor 20 relative to the gyro case 21 is canceled out.

According to the second embodiment, the FET is used as the displacement detecting circuit and such FET is disposed adjacent to the displacement detection electrodes. There is then the advantage that a stable displacement detection AC current with less error can be detected.

Furthermore, according to the present invention, since the position of the gyro rotor 20 is controlled by the active-type control system, there is the advantage that the position of the gyro rotor 20 can be controlled accurately and easily. In particular, upon activation, the gyro rotor 20 can be easily floated and supported at a predetermined position.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. In an acceleration detection-type gyro apparatus including a gyro case having a Z axis extended along a central axis direction, and an X axis and a Y axis extended in the directions perpendicular to said Z axis, a disk-like gyro rotor being supported within said gyro case by an electrostatic supporting force in order not to contact with said gyro case, said disk-like gyro rotor having a spin axis extended in said central axis direction, electrode portions formed on both surfaces of said gyro rotor, at least three pairs of electrostatic supporting electrodes disposed in an inner surface of said gyro case such that said electrostatic supporting electrodes are opposed to and spaced apart from said electrode portions formed on both surfaces of said gyro rotor, said electrostatic supporting electrodes being spaced apart from each other with an equal central angle, and a rotor driving system for rotating said gyro rotor about said spin axis at high speed, said gyro apparatus characterized by:

said electrode portions of said gyro rotor each having a plurality of annular portions disposed concentrically at a predetermined radial pitch, each of said annular portions having the same radial width;

each of said electrostatic supporting electrodes having a pair of comb-shaped portions spaced apart from each other, each of said comb-shaped portions including a plurality of circumference portions extended in the circumferential direction and concentrically disposed at the same radial pitch as said predetermined radial pitch, each of said circumference portions having the same radial width, and connection portions for connecting said circumference portions, said circumference portions of said pair of comb-shaped portions being arranged alternately;

each of said circumference portions of said comb-shaped portions of said electrostatic supporting electrodes having a radial width equal to each radial width of said annular portions of said electrode portions of said gyro rotor, each of said circumference portions of said comb-shaped portions of said electrostatic supporting electrodes having a radius of curvature which is greater or smaller than a radius of corresponding annular portions of said electrode portions of said gyro rotor;

mechanism control circuits for outputting displacement indicating signals for indicating X axis direction, Y axis direction and Z axis direction linear displacements and Y axis and X axis rotational displacements and for applying control DC voltages to generate electrostatic supporting forces and displacement detection AC voltages to detect displacements of said gyro rotor to said at least three pairs of electrostatic supporting electrodes under the condition that said control DC voltages and said displacement detection AC voltages are superimposed upon each other;

a control computing unit for receiving said displacement indicating signals outputted from said mechanism control circuits, computing correction amounts of said control DC voltages such that linear displacements and rotational displacements of said gyro rotor are canceled out, and feeding said computed correction amounts back to said mechanism control circuits; and a gyro/acceleration output computing unit for computing a gyro output based on an output signal supplied thereto from said control computing unit.

2. A gyro apparatus as claimed in claim 1, wherein each radial width of said circumference portions of said comb-shaped portions of said electrostatic supporting electrodes and each radial width of said annular portions of said electrode portions of said gyro rotor are equal to ½ of said predetermined pitch, and a difference between said radius and said radius of curvature is equal to ¼ of said predetermined pitch.

3. A gyro apparatus as claimed in claim 1 or 2, wherein said displacement indicating signal outputted from each of said mechanism control circuits contains a component proportional to an electrostatic capacity of a capacitor formed by said electrode portions of said gyro rotor and said corresponding electrostatic supporting electrodes.

4. A gyro apparatus as claimed in claim 1, wherein said control computing unit includes a displacement computing unit for computing a linear displacement and a rotational displacement of said gyro rotor, a PID computing unit for computing forces and rotational moments applied to said gyro rotor, and a control voltage computing unit for computing a correction amount of said control DC voltage.

5. A gyro apparatus as claimed in claim 1, wherein said gyro/acceleration output computing unit computes a gyro output based on an output signal inputted thereto from said PID computing unit of said control computing unit.

6. A gyro apparatus as claimed in claim 1, wherein said electrostatic supporting electrode includes four pairs of electrostatic electrodes, and said four pairs of electrostatic supporting electrodes are circumferentially spaced apart from each other at a central angle of 90 degrees.

7. A gyro apparatus as claimed in claim 6, wherein said control computing unit computes linear displacements and rotational displacements of said gyro rotor by use of said four pairs of displacement indicating signals outputted from each of said four pairs of mechanism control circuits corresponding to said four pairs of electrostatic supporting electrodes based on the following equation:

$$\Delta X = Kx(P_{1A}+P_{1B}-P_{3A}-P_{3B})$$

$$\Delta Y = Ky(P_{2A}+P_{2B}-P_{4A}-P_{4B})$$

$$\Delta Z = Kz(P_{1A}+P_{2A}+P_{3A}+P_{4A}-P_{1B}-P_{2B}-P_{3B}-P_{4B})$$

$$\Delta\theta = K\theta(P_{1A}-P_{1B}-P_{3A}+P_{3B})$$

$$\Delta\phi = K\phi(P_{2A}-P_{2B}-P_{4B}+P_{4B})$$

where $\Delta X$, $\Delta Y$, $\Delta Z$ represent the linear displacements of X axis, Y axis, and Z axis of said gyro rotor, $\Delta\theta$, $\Delta\phi$ represent the Y axis and X axis rotational displacements of said gyro rotor, kx, ky, kz, k$\theta$, k$\phi$ represent the constants, and $P_{1a}$, $P_{1B}$, $P_{2A}$, $P_{2B}$, $P_{3A}$, $P_{3B}$, $P_{4A}$, $P_{4B}$ represent the displacement signals from the first, second, third, fourth pairs of mechanism control circuits.

8. A gyro apparatus as claimed in claim 6, wherein said control DC voltages applied to first and second comb-shaped portions of each of said electrostatic supporting electrodes are the same in magnitude and inverse in polarity.

9. A gyro apparatus as claimed in claim 6, wherein $\Delta V_{1A}$, $\Delta V_{1B}$ and $\Delta V_{3A}$, $\Delta V_{3B}$ assume correction amounts of said control DC voltages applied to first and third pairs of electrostatic supporting electrodes of said four pairs of electrostatic supporting electrodes, and $\Delta V_{2A}$, $\Delta V_{2B}$ and $\Delta V_{4A}$, $\Delta V_{4B}$ assume correction amounts of said control DC voltages applied to second and fourth pairs of electrostatic supporting electrodes of said four pairs of electrostatic supporting electrodes, the following relationships are satisfied:

$$\Delta V_{1A}+\Delta V_{1B}+\Delta V_{3A}+\Delta V_{3B}=0$$

$$\Delta V_{2A}+\Delta V_{2B}+\Delta V_{4A}+\Delta V_{4B}=0$$

10. A gyro apparatus as claimed in claim 6, wherein when $\Delta V_{1A}$, $\Delta V_{1B}$ and $\Delta V_{3A}$, $\Delta V_{3B}$ assume correction amounts of said control DC voltages applied to said first and third pairs of electrostatic supporting electrodes, and $\Delta V_{2A}$, $\Delta V_{2B}$ and $\Delta V_{4A}$, $\Delta V_{4B}$ assume correction amounts of said control DC voltages applied to said second and fourth pairs of electrostatic supporting electrodes, said correction amounts are expressed by the following equation:

$$\Delta V_{1A}=V_0(A_{11}\cdot Fx+A_{12}\cdot Fz/2+A_{13}\cdot T\theta)$$

$$\Delta V_{1B}=V_0(A_{21}\cdot Fx+A_{22}\cdot Fz/2+A_{23}\cdot T\theta)$$

$$\Delta V_{3A}=V_0(A_{31}\cdot Fx+A_{32}\cdot Fz/2+A_{33}\cdot T\theta)$$

$$\Delta V_{3B}=V_0(A_{41}\cdot Fx+A_{42}\cdot Fz/2+A_{43}\cdot T\theta)$$

$$\Delta V_{2A}=V_0(B_{11}\cdot FY+B_{12}\cdot Fz/2+B_{13}\cdot T\phi)$$

$$\Delta V_{2B}=V_0(B_{21}\cdot FY+B_{22}\cdot Fz/2+B_{23}\cdot T\phi)$$

$$\Delta V_{4A}=V_0(B_{31}\cdot FY+B_{32}\cdot Fz/2+B_{33}\cdot T\phi)$$

$$\Delta V_{4B}=V_0(B_{41}\cdot FY+B_{42}\cdot Fz/2+B_{43}\cdot T\phi)$$

where $V_0$ represents the constant, Fx, Fy, Fz represent the dimensionless amounts of the forces to be applied to the gyro rotor, T$\theta$, T$\phi$ represent the dimensionless amounts of the torques to be applied to the gyro rotor, and coefficients of Fx, Fy, Fz and T$\theta$, T$\phi$ are elements of actuator compensating matrix, and expressed by the following equation:

$$A_{11}=(\tfrac{1}{4})(1-2\Delta Z_N-2\Delta\theta_N)$$

$$A_{12}=(\tfrac{1}{4})(1-\Delta X_N-\Delta\theta_N)$$

$$A_{13}=(\tfrac{1}{4})(1-\Delta X_N-\Delta Z_N)$$

$$A_{21}=(\tfrac{1}{4})(1+2\Delta Z_N+2\Delta\theta_N)$$

$$A_{22}=(-\tfrac{1}{4})(1-\Delta X_N+\Delta\theta_N)$$

$$A_{23}=(-\tfrac{1}{4})(1-\Delta X_N+\Delta Z_N)$$

$$A_{31}=(-\tfrac{1}{4})(1-2\Delta Z_N+2\Delta\theta_N)$$

$$A_{32}=(\tfrac{1}{4})(1+\Delta X_N+\Delta\theta_N)$$

$$A_{33}=(-\tfrac{1}{4})(1+\Delta X_N-\Delta Z_N)$$

$$A_{41}=(-\tfrac{1}{4})(1+2\Delta Z_N-2\Delta\theta_N)$$

$$A_{42}=(-\tfrac{1}{4})(1+\Delta X_N-\Delta\theta_N)$$

$$A_{43}=(\tfrac{1}{4})(1+\Delta X_N+\Delta Z_N)$$

$$B_{11}=(\tfrac{1}{4})(1-2\Delta Z_N-2\Delta\phi_N)$$

$$B_{12}=(\tfrac{1}{4})(1-\Delta Y_N-\Delta\phi_N)$$

$$B_{13}=(\tfrac{1}{4})(1-\Delta Y_N-\Delta Z_N)$$

$$B_{21}=(\tfrac{1}{4})(1+2\Delta Z_N-2\Delta\phi_N)$$

$$B_{22}=(-\tfrac{1}{4})(1-\Delta Y_N-\Delta\phi_N)$$

$$B_{23}=(-\tfrac{1}{4})(1-\Delta Y_N+\Delta Z_N)$$

$$B_{31}=(-\tfrac{1}{4})(1-2\Delta Z_N+2\Delta\phi_N)$$

$$B_{32}=(\tfrac{1}{4})(1+\Delta Y_N+\Delta\phi_N)$$

$$B_{33}=(-\tfrac{1}{4})(1+\Delta Y_N-\Delta Z_N)$$

$$B_{41}=(-\tfrac{1}{4})(1+2\Delta Z_N-2\Delta\phi_N)$$

$$B_{42}=(-\tfrac{1}{4})(1+\Delta Y_N-\Delta\phi_N)$$

$$B_{43}=(\tfrac{1}{4})(1+\Delta Y_N+\Delta Z_N)$$

where $\Delta X_N$, $\Delta Y_N$, $\Delta Z_N$ represent the dimensionless amounts of X axis direction, Y axis direction, and Z axis direction linear displacements of the gyro rotor, and $\Delta\theta_N$, $\Delta\phi_N$ represent the dimensionless amounts of the Y axis and X axis rotational displacements of the gyro rotor.

11. A gyro apparatus as claimed in claim 1, wherein said rotor drive system includes rotor driving electrode portions formed on both surfaces of said gyro rotor, rotor driving electrodes disposed in opposing relation to and spaced apart from said rotor driving electrode portions, and rotor drive AC voltage circuits for applying a rotor driving AC voltage to said rotor driving electrodes, said rotor driving electrode portions including a plurality of electrode portions disposed along the circumferential direction in row and spaced apart from each other, said rotor driving electrodes including a plurality of electrodes disposed along a circumferential direction in row and spaced apart from each other.

12. A gyro apparatus as claimed in claim 1, wherein said gyro rotor is made of a conductive material, and said electrode portions are protruded portions formed on both surfaces of said gyro rotor.

13. A gyro apparatus as claimed in claim 12, wherein said gyro rotor is made of single crystal silicon.

14. A gyro apparatus as claimed in claim 1, wherein said gyro case includes an upper bottom member and a lower bottom member made of an insulating material, said electrostatic supporting electrodes being formed as thin metal films attached to the inner surfaces of said upper bottom member and said lower bottom member.

15. A gyro apparatus as claimed in claim 14, wherein said upper bottom member and said lower bottom member of said gyro case are made of glass.

16. A gyro apparatus as claimed in claim 14, wherein said electrostatic supporting electrodes are formed by thin film forming technique including vacuum deposition, ion plating and photo-fabrication.

17. A gyro apparatus as claimed in claim 14, wherein said gyro case includes a spacer disposed between said upper bottom member and said lower bottom member, and said spacer is connected to said upper bottom member and said lower bottom member by anodic bonding.

18. A gyro apparatus as claimed in claim 1, wherein said gyro case has a discharge stopper attached thereto, and said stopper functions to limit a displacement of said gyro rotor, and to discharge static electricity accumulated in said gyro rotor to the outside.

19. A gyro apparatus as claimed in claim 1, wherein said gyro case has a concave portion with a getter stored therein, and said concave portion is communicated with the inside of said gyro case through a passage.

* * * * *

UNITED STATES PATENT AND TRADEMARK OFFICE
CERTIFICATE OF CORRECTION

PATENT NO. : 5,698,783
DATED : December 16, 1997
INVENTOR(S) : Murakoshi, et al.

It is certified that error appears in the above-identified patent and that said Letters Patent are hereby corrected as shown below:

Claim 7, column 47, line 52 (5th equation):

change "$\Delta\phi = K\phi(P_{2B} - P_{4B} + P_{4B})$" to --$\Delta\phi = K\phi(P_{2B} - P_{4A} + P_{4B})$--

Claim 10, column 48, line 67 (16th equation):

change "$B_{21} = (\frac{1}{4})(1 + 2\Delta Z_N - 2\Delta\phi_N)$" to --$B_{21} = (\frac{1}{4})(1 + 2\Delta Z_N + 2\Delta\phi_N)$--

Claim 10, column 49, line 1:

change "$B_{22} = (-\frac{1}{4})(1 - \Delta Y_N - \Delta\phi_N)$" to --$B_{22} = (-\frac{1}{4})(1 - \Delta Y_N + \Delta\phi_N)$--

Signed and Sealed this

Tenth Day of March, 1998

Attest:

BRUCE LEHMAN

Attesting Officer

Commissioner of Patents and Trademarks